(12) United States Patent
Nielsen et al.

(10) Patent No.: US 9,646,275 B2
(45) Date of Patent: May 9, 2017

(54) METHODS AND APPARATUS FOR ASSESSING RISKS ASSOCIATED WITH LOCATE REQUEST TICKETS BASED ON HISTORICAL INFORMATION

(71) Applicant: CertusView Technologies, LLC, Palm Beach Gardens, FL (US)

(72) Inventors: Steven E. Nielsen, North Palm Beach, FL (US); Curtis Chambers, Palm Beach Gardens, FL (US); Jeffrey Farr, Royal Palm Beach, FL (US); Greg Block, Juno Beach, FL (US)

(73) Assignee: CertusView Technologies, LLC, West Palm Beach, FL (US)

( * ) Notice: Subject to any disclaimer, the term of this patent is extended or adjusted under 35 U.S.C. 154(b) by 0 days.

(21) Appl. No.: 14/259,843

(22) Filed: Apr. 23, 2014

(65) Prior Publication Data
US 2014/0236656 A1    Aug. 21, 2014

Related U.S. Application Data

(63) Continuation of application No. 12/840,467, filed on Jul. 21, 2010, which is a continuation of application No. 12/823,028, filed on Jun. 24, 2010.
(Continued)

(30) Foreign Application Priority Data

Jun. 23, 2010    (CA) ...................................... 2706195

(51) Int. Cl.
*G06Q 10/00*    (2012.01)
*G06Q 10/06*    (2012.01)

(52) U.S. Cl.
CPC ......... *G06Q 10/0635* (2013.01); *G06Q 10/06* (2013.01); *G06Q 10/063* (2013.01); *G06Q 10/0633* (2013.01); *G06Q 10/063118* (2013.01)

(58) Field of Classification Search
CPC ......... G06Q 10/0635; G06Q 10/06311; G06Q 10/0631
(Continued)

(56) References Cited

U.S. PATENT DOCUMENTS 4,208,653 A    6/1980    Abe
4,251,813 A    2/1981    Carre
(Continued)

FOREIGN PATENT DOCUMENTS

CA    2388572    5/2001
CA    2510111    7/2004
(Continued)

OTHER PUBLICATIONS

US 8,583,461, 11/2013, Nielsen et al. (withdrawn)
(Continued)

*Primary Examiner* — Susanna M Meinecke Diaz
(74) *Attorney, Agent, or Firm* — Cooley LLP

(57) ABSTRACT

Locate and/or marking operations involve detecting and/or marking a presence or an absence of at least one underground facility within a dig area, wherein at least a portion of the dig area is planned to be excavated or disturbed during excavation activities. One or more attributes of a locate and/or marking operation requested in a locate request ticket are assessed to provide one or more ticket assessment outcomes. Ticket information is obtained from the locate request ticket, and historical information (e.g., historical damage reports, historical records of previously completed locate request tickets) is selected and analyzed based on the
(Continued)

ticket information so as to assign at least one risk designation to the ticket. The risk designation(s) is/are transmitted and/or stored so as to facilitate clearing the locate request ticket and/or dispatching a locate technician to perform the locate and/or marking operation.

28 Claims, 21 Drawing Sheets

Related U.S. Application Data

(60) Provisional application No. 61/220,491, filed on Jun. 25, 2009.

(58) Field of Classification Search
USPC ..................................... 705/7.28, 7.14, 7.12
See application file for complete search history.

(56) References Cited

U.S. PATENT DOCUMENTS

| | | | |
|---|---|---|---|
| 4,455,509 A | 6/1984 | Crum et al. |
| 4,970,683 A | 11/1990 | Harshaw |
| 5,267,147 A | 11/1993 | Harshaw |
| 5,399,844 A | 3/1995 | Holland |
| 5,454,074 A | 9/1995 | Hartel |
| 5,490,089 A | 2/1996 | Smith et al. |
| 5,546,445 A | 8/1996 | Dennison et al. |
| 5,576,973 A | 11/1996 | Haddy |
| 5,918,565 A | 7/1999 | Casas |
| 5,920,312 A | 7/1999 | Wagner et al. |
| 5,920,846 A | 7/1999 | Storch et al. |
| 6,169,517 B1* | 1/2001 | Eslambolchi et al. ... 342/357.31 |
| 6,262,720 B1 | 7/2001 | Jeffrey |
| 6,286,763 B1 | 9/2001 | Reynolds et al. |
| 6,421,725 B1 | 7/2002 | Vermilyea et al. |
| 6,430,562 B1 | 8/2002 | Kardos et al. |
| 6,512,312 B1 | 1/2003 | Herkenrath et al. |
| 6,526,526 B1 | 2/2003 | Dong et al. |
| 6,587,851 B1 | 7/2003 | Ditcharo |
| 6,684,250 B2 | 1/2004 | Anderson |
| 6,751,553 B2 | 6/2004 | Young |
| 6,751,554 B1 | 6/2004 | Asher et al. |
| 6,753,891 B1 | 6/2004 | Chohan |
| 6,845,148 B1 | 1/2005 | Beamon |
| 6,898,435 B2 | 5/2005 | Milman |
| 6,915,211 B2 | 7/2005 | Kram et al. |
| 6,938,048 B1 | 8/2005 | Jilk et al. |
| 6,941,514 B2 | 9/2005 | Bradford |
| 6,958,690 B1* | 10/2005 | Asher et al. .................. 340/531 |
| 6,980,929 B2 | 12/2005 | Aronstam et al. |
| 6,981,001 B1 | 12/2005 | Reddick et al. |
| 7,003,443 B2 | 2/2006 | Ford et al. |
| 7,003,475 B1 | 2/2006 | Friedland et al. |
| 7,016,855 B2 | 3/2006 | Eaton |
| 7,111,318 B2 | 9/2006 | Vitale et al. |
| 7,289,890 B2 | 10/2007 | Mitchell |
| 7,340,037 B1 | 3/2008 | Jean |
| 7,372,247 B1 | 5/2008 | Giusti et al. |
| 7,392,486 B1 | 6/2008 | Gyde |
| 7,433,830 B2 | 10/2008 | Ingman |
| 7,469,247 B2 | 12/2008 | Cossins et al. |
| 7,626,496 B1 | 12/2009 | Asher et al. |
| 7,640,105 B2 | 12/2009 | Nielsen et al. |
| 7,773,095 B1* | 8/2010 | Badrak et al. ................. 345/619 |
| 7,898,940 B2* | 3/2011 | Asher ................. H04L 41/0686 370/216 |
| 7,986,246 B2 | 7/2011 | Angelis et al. |
| 8,060,304 B2 | 11/2011 | Nielsen et al. |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,416,995 B2 | 4/2013 | Nielsen et al. |
| 8,457,893 B2 | 6/2013 | Nielsen et al. |
| 8,463,487 B2 | 6/2013 | Nielsen et al. |
| 8,467,932 B2 | 6/2013 | Nielsen et al. |
| 8,467,969 B2 | 6/2013 | Nielsen et al. |
| 8,468,206 B2 | 6/2013 | Nielsen et al. |
| 8,473,148 B2 | 6/2013 | Nielsen et al. |
| 8,473,209 B2 | 6/2013 | Nielsen et al. |
| 8,476,906 B2 | 7/2013 | Nielsen et al. |
| 8,478,523 B2 | 7/2013 | Nielsen et al. |
| 8,478,524 B2 | 7/2013 | Nielsen et al. |
| 8,478,525 B2 | 7/2013 | Nielsen et al. |
| 8,478,617 B2 | 7/2013 | Nielsen et al. |
| 8,478,635 B2 | 7/2013 | Nielsen et al. |
| 8,480,332 B2 | 7/2013 | Miller |
| 8,484,300 B2 | 7/2013 | Nielsen et al. |
| 8,532,341 B2 | 9/2013 | Nielsen et al. |
| 8,532,342 B2 | 9/2013 | Nielsen et al. |
| 8,540,141 B2 | 9/2013 | Petrich et al. |
| 8,543,651 B2 | 9/2013 | Nielsen et al. |
| 8,543,937 B2 | 9/2013 | Nielsen et al. |
| 8,549,084 B2 | 10/2013 | Nielsen et al. |
| 8,560,164 B2 | 10/2013 | Nielsen et al. |
| 8,566,737 B2 | 10/2013 | Nielsen et al. |
| 8,572,193 B2 | 10/2013 | Nielsen et al. |
| 8,577,707 B2 | 11/2013 | Nielsen et al. |
| 8,583,264 B2 | 11/2013 | Nielsen et al. |
| 8,583,372 B2 | 11/2013 | Nielsen et al. |
| 8,589,201 B2 | 11/2013 | Nielsen et al. |
| 8,589,202 B2 | 11/2013 | Nielsen et al. |
| 8,600,526 B2 | 12/2013 | Nielsen et al. |
| 8,600,848 B2 | 12/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,620,572 B2 | 12/2013 | Nielsen et al. |
| 8,620,587 B2 | 12/2013 | Nielsen et al. |
| 8,620,616 B2 | 12/2013 | Nielsen et al. |
| 8,620,726 B2 | 12/2013 | Nielsen et al. |
| 8,626,571 B2 | 1/2014 | Nielsen et al. |
| 8,630,463 B2 | 1/2014 | Nielsen et al. |
| 8,644,965 B2 | 2/2014 | Nielsen et al. |
| 8,700,325 B2 | 4/2014 | Nielsen et al. |
| 8,903,643 B2 | 12/2014 | Nielsen et al. |
| 2001/0014877 A1 | 8/2001 | Defrancesco |
| 2002/0029161 A1 | 3/2002 | Brodersen |
| 2002/0032028 A1 | 3/2002 | Kaupe |
| 2002/0032693 A1 | 3/2002 | Chiou |
| 2002/0038076 A1 | 3/2002 | Sheehan et al. |
| 2002/0055870 A1 | 5/2002 | Thomas |
| 2002/0138543 A1 | 9/2002 | Teng et al. |
| 2002/0143596 A1 | 10/2002 | Carmody |
| 2002/0153134 A1 | 10/2002 | Newman |
| 2002/0161604 A1 | 10/2002 | Kardos et al. |
| 2002/0184068 A1 | 12/2002 | Krishnan et al. |
| 2002/0184235 A1 | 12/2002 | Young |
| 2002/0188562 A1 | 12/2002 | Igarashi |
| 2003/0004776 A1 | 1/2003 | Perrella et al. |
| 2003/0065805 A1 | 4/2003 | Barnes |

(56) References Cited

U.S. PATENT DOCUMENTS

| | | |
|---|---|---|
| 2003/0110184 A1 | 6/2003 | Gibson et al. |
| 2003/0130820 A1 | 7/2003 | Lane, III |
| 2003/0177051 A1 | 9/2003 | Driscoll et al. |
| 2003/0200130 A1 | 10/2003 | Kall et al. |
| 2003/0216949 A1 | 11/2003 | Kram et al. |
| 2004/0059588 A1 | 3/2004 | Burritt |
| 2004/0128613 A1 | 7/2004 | Sinisi |
| 2004/0236620 A1* | 11/2004 | Chauhan et al. ............... 705/9 |
| 2005/0027733 A1 | 2/2005 | Donahue |
| 2005/0033620 A1 | 2/2005 | Gloor et al. |
| 2005/0055233 A1 | 3/2005 | Wenzlau et al. |
| 2005/0102173 A1 | 5/2005 | Barker et al. |
| 2005/0182638 A1 | 8/2005 | Odent et al. |
| 2005/0240649 A1 | 10/2005 | Elkington |
| 2006/0015475 A1 | 1/2006 | Birkner |
| 2006/0020417 A1* | 1/2006 | Koch .................. G01C 17/28 702/150 |
| 2006/0026020 A1* | 2/2006 | Waite et al. ................. 705/1 |
| 2006/0085133 A1 | 4/2006 | Young |
| 2006/0085396 A1 | 4/2006 | Evans |
| 2006/0087402 A1 | 4/2006 | Manning |
| 2006/0091888 A1 | 5/2006 | Holman et al. |
| 2006/0235741 A1 | 10/2006 | Deaton et al. |
| 2006/0245572 A1 | 11/2006 | Asher |
| 2006/0282280 A1* | 12/2006 | Stotz et al. ................. 705/1 |
| 2007/0083517 A1 | 4/2007 | Prince et al. |
| 2007/0116185 A1 | 5/2007 | Savoor |
| 2007/0129817 A1 | 6/2007 | Cadiz |
| 2007/0219722 A1 | 9/2007 | Sawyer, Jr. |
| 2007/0299689 A1 | 12/2007 | Jones et al. |
| 2008/0021762 A1 | 1/2008 | Coon et al. |
| 2008/0021863 A1 | 1/2008 | Evans |
| 2008/0096610 A1 | 4/2008 | Shin et al. |
| 2008/0180319 A1 | 7/2008 | Islam |
| 2008/0228529 A1 | 9/2008 | Willson |
| 2008/0288267 A1 | 11/2008 | Asher |
| 2008/0294988 A1 | 11/2008 | Nicholas |
| 2008/0311928 A1 | 12/2008 | Millard |
| 2009/0064171 A1 | 3/2009 | Davis et al. |
| 2009/0132269 A1 | 5/2009 | Perrill |
| 2009/0201311 A1 | 8/2009 | Nielsen et al. |
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0088031 A1 | 4/2010 | Nielsen et al. |
| 2010/0088134 A1 | 4/2010 | Nielsen et al. |
| 2010/0088164 A1 | 4/2010 | Nielsen et al. |
| 2010/0090700 A1 | 4/2010 | Nielsen et al. |
| 2010/0117654 A1 | 5/2010 | Nielsen et al. |
| 2010/0149964 A1* | 6/2010 | Asher ........................ 370/216 |
| 2010/0153151 A1 | 6/2010 | Toenjes |
| 2010/0161359 A1* | 6/2010 | Asher .................. G06Q 10/06 705/7.28 |
| 2010/0188088 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0205536 A1 | 8/2010 | Nielsen et al. |
| 2010/0228588 A1 | 9/2010 | Nielsen et al. |
| 2010/0245086 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0263591 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0093306 A1 | 4/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |
| 2015/0009608 A1 | 1/2015 | Nielsen et al. |
| 2015/0149242 A1 | 5/2015 | Nielsen et al. |
| 2015/0170089 A1 | 6/2015 | Nielsen et al. |
| 2015/0185778 A1 | 7/2015 | Nielsen et al. |
| 2015/0193717 A1 | 7/2015 | Nielsen et al. |
| 2015/0234819 A1 | 8/2015 | Nielsen et al. |

(56) References Cited

U.S. PATENT DOCUMENTS

| | | | |
|---|---|---|---|
| 2015/0243054 A1 | 8/2015 | Nielsen et al. | |
| 2015/0253449 A1 | 9/2015 | Nielsen et al. | |
| 2015/0269500 A1 | 9/2015 | Nielsen et al. | |
| 2015/0339607 A1 | 11/2015 | Nielsen et al. | |

FOREIGN PATENT DOCUMENTS

| | | |
|---|---|---|
| CA | 2579081 | 4/2008 |
| CA | 2623761 | 10/2008 |

OTHER PUBLICATIONS

Stout et al. "Process Devised for Monitoring Leak Threats Using GIS." Pipeline & Gas Journal, vol. 236, No. 2, pp. 32-37, Feb. 2009.*
Griffin, Jeff. "Reducing Damage to Underground Utilities." Underground Construction, p. 31(3), Jan. 2005.*
"Underground Utility Line Protection Act." Retrieved from: [URL: http://www.pa1call.org/PA811/Public/POCS_Content/Resource_Center/Act_287.aspx], signed on Oct. 9, 2008 and made effective on Oct. 9, 2008.*
Dockter, L., Development of an Underground Utility Damage Prevention Plan (UUDPP) for Company XYZ, The Graduate College, University of Wisconsin-Stout, 2008, http://www2.uwstout.edu/content/lib/thesis/2008/2008dockterl.pdf.
Office Action dated Apr. 8, 2014 from U.S. Appl. No. 12/837,368.
Office Action dated Apr. 15, 2014 from U.S. Appl. No. 12/840,467.
Office Action dated May 5, 2014 from U.S. Appl. No. 12/837,385.
360 Scheduling, 360 Operations Guide 4.9.6 User Guide, 360 Technologies Ltd., Nottingham, UK, 2005-2008, 46 pages.
360 Scheduling, 360 Schema Interface 4.9.6 User Guide, 360 Technologies Ltd., Nottingham, UK, 2005-2008, 257 pages.
CGA, Common Ground Alliance, Best Practices, Version 1.0, Apr. 2003, 93 pages.
CGA, Common Ground Alliance, Best Practices, Version 3.0, Mar. 2006, 100 pages.
CGA, Common Ground, Study of One-Call Systems and Damage Prevention Best Practices, Aug. 1999, 262 pages.
City of Birmingham, "Permit Inquiry System," Available Mar. 27, 2009, Retrieved on Mar. 18, 2013 from <<http://permits.informationbirmingham.com/>>, 7 pages.
U.S. Appl. No. 13/943,350, filed Jul. 16, 2013, Nielsen et al.
Doyle, K., UGI Utilities: Delivering enhanced service, Energy Digital, http://www.energydigital.com/company-report/ugi-utilities-delivering-enhanced-service (original publication date unknown), retrieved Aug. 1, 2011, 3 pages.
Engica, "Q4 Permit System," Dec. 2003, http://www.engica.com/DS_0302_Permit_Broc.pdf, 19 pages.
InMaps Develops Critical Database Link to Keep UGI Automation on Track, Holderness, NH, Sep. 2006, http://www.inmaps.com/InMaps-develops-critical-database-link-to-keep-ugi-automation-on-track, 1 page.
International Search Report and Written Opinion, Application No. PCT/US2010/001821, Sep. 7, 2010.
International Search Report and Written Opinion, Application No. PCT/U52010/00334, Oct. 27, 2011.
International Search Report, Application No. PCT/U52011/45198, Sep. 22, 2011.
Muller et al., "A Simulation-Based Work Order Release Mechanism for a Flexible Manufacturing System," Dec. 1990, IEEE Article, pp. 599-602.
Notice of Allowance dated Dec. 16, 2013 from U.S. Appl. No. 12/704,485.
Office Action dated Jul. 29, 2013 from U.S. Appl. No. 12/704,485.
Office Action dated Jan. 31, 2012 from U.S. Appl. No. 12/837,330.
Office Action dated Feb. 24, 2014 from Canadian Application No. 2,692,110.
Office Action dated Feb. 29, 2012 from U.S. Appl. No. 12/704,485.
Office Action dated Mar. 13, 2013 from Canadian Application No. 2,706,195.
Office Action dated Mar. 14, 2012 from U.S. Appl. No. 12/837,353.
Office Action dated Mar. 25, 2013 from U.S. Appl. No. 13/186,116.
Office Action dated Mar. 25, 2014 from U.S. Appl. No. 12/837,343.
Office Action dated Mar. 27, 2012 from U.S. Appl. No. 12/837,343.
Office Action dated Mar. 28, 2012 from U.S. Appl. No. 12/703,809.
Office Action dated Mar. 2, 2012 from U.S. Appl. No. 12/837,368.
Office Action dated Mar. 28, 2012 from U.S. Appl. No. 12/837,379.
Office Action dated Mar. 28, 2012 from U.S. Appl. No. 12/840,467.
Office Action dated Mar. 28, 2012 from U.S. Appl. No. 12/840,476.
Office Action dated Mar. 29, 2012 from U.S. Appl. No. 12/840,481.
Office Action dated Apr. 30, 2013 from Canadian Application No. 2,692,110.
Office Action dated May 8, 2012 from U.S. Appl. No. 12/837,385.
Office Action dated May 23, 2013 from U.S. Appl. No. 12/837,343.
Office Action dated Jun. 5, 2013 from U.S. Appl. No. 12/837,368.
Office Action dated Jun. 6, 2012 from U.S. Appl. No. 12/840,461.
Office Action dated Jul. 8, 2010 from Canadian Application No. 2,692,110, filed Feb. 10, 2010.
Office Action dated Jul. 8, 2013 from U.S. Appl. No. 12/840,467.
Office Action dated Jul. 16, 2012 from Canadian Application No. 2,692,110.
Office Action dated Jul. 16, 2013 from U.S. Appl. No. 12/823,028.
Office Action dated Jul. 26, 2013 from Canadian Application No. 2,706,195.
Office Action dated Jul. 30, 2012 from Canadian Application No. 2,706,195.
Office Action dated Sep. 13, 2012 from Australian Patent Application No. 2010214100.
Office Action dated Oct. 8, 2013 from Canadian Application No. 2,692,110.
Office Action dated Oct. 9, 2013 from U.S. Appl. No. 13/186,116.
Office Action dated Oct. 11, 2011 from Canadian Application No. 2,692,110.
Office Action dated Oct. 11, 2011 from Canadian Application No. 2,706,195.
Office Action dated Oct. 12, 2012 from U.S. Appl. No. 12/837,330.
Office Action dated Oct. 24, 2012 from U.S. Appl. No. 12/837,343.
Office Action dated Oct. 24, 2012 from U.S. Appl. No. 12/837,379.
Office Action dated Oct. 31, 2012 from U.S. Appl. No. 12/837,368.
Office Action dated Nov. 7, 2012 from U.S. Appl. No. 12/703,809.
Office Action dated Nov. 8, 2012 from U.S. Appl. No. 12/837,353.
Office Action dated Nov. 21, 2012 from U.S. Appl. No. 12/840,467.
Office Action dated Nov. 21, 2012 from U.S. Appl. No. 12/840,476.
Office Action dated Nov. 21, 2012 from U.S. Appl. No. 12/840,481.
Office Action dated Dec. 5, 2012 from U.S. Appl. No. 12/840,461.
Office Action dated Dec. 7, 2012 from U.S. Appl. No. 12/823,028.
Patent Examination Report No. 1, Australian Application No. 2010263261, Mar. 1, 2013.
Pelican Corp., beforeUdig mobile, http://www.pelicancorp.com/index.php?option=com_content&view=article&id=145&Itemid=133, original publication date unknown, printed Aug. 30, 2011, 1 page.
Pelican Corp., DigSAFE OneCall Key Capabilities, http://www.pelicancorp.com/index.php?option=com_content&view=article&id=104&Itemid=121, original publication date unknown, printed Aug. 30, 2011, 2 pages.
Pelican Corp., DigSAFE Pro Automated Plan Response Server, http://www.pelicancorp.com/index.php?option=com_content&view=article&id=48&Itemid=68, original publication date unknown, printed Aug. 30, 2011, 2 pages.
Pelican Corp., DigSAFE Pro Automation Workflow, http://www.pelicancorp.com/index.php?option=com_content&view=article&id=119&Itemid=124, original publication date unknown, printed Aug. 30, 2011, 2 pages.
Pelican Corp., DigSAFE Pro New and Updated features for version 2.4, http://www.pelicancorp.com/index.php?option=com_content&view=article&id=151&Itemid=91, original publication date unknown, printed Aug. 30, 2011, 2 pages.

(56) References Cited

OTHER PUBLICATIONS

Pelican Corp., How beforeUdig works, http://www.pelicancorp.com/index.php?option=com_content&view=article&id=114&Itemid=105, original publication date unknown, printed Aug. 30, 2011, 1 page.
Pelican Corp., Using beforeUdig, http://www.pelicancorp.com/index.php?option=com_content&view=article&id=115&Itemid=106, original publication date unknown, printed Aug. 30, 2011, 1 page.
permitprospector.com, Dec. 2009, http://web.archive.org/web/20090417141145/http://www.permitprospector.com, 3 pages.
Pickus, J., "Call USA—Automating "Call Before You Dig" Processes for a Major Utility," GITA's Annual Conference on Apr. 25-28, 2004, 19 pages.
Sasaki et al., "Development of 'Intelligent WorkFlow System' Using Know-how Acquired Based on Work Order," Dec. 1997, IEEE, pp. 430-437.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Township of Randolph, "Construction Permits," Available Online Mar. 30, 2009, Retrieved Mar. 19, 2013 from <<http://www.randolphnj.org/townhall/construction_permits/>>, 2 pages.
UGI Utilities Selects KEMA for FLAME Project Implementation, Burlington, Massachusetts, Electric Energy Publications, Inc., Feb. 10, 2004, http://www.eet-d.com/?page=show_news&id=17641, 2 pages.
UGI Utilities, Inc., FLAME Project White Paper, (original publication date unknown), received Aug. 3, 2011, 12 pages.
Virginia Pilot Project, Incorporating GPS Technology to Enhance One-Call Damage Prevention, Phase I—Electronic White Lining Project Report, Nov. 2007, 50 pages.
Weld County: Department of Public Works, "Permits and Applications—Public Works," available online Jun. 7, 2010 at http://www.co.weld.co.us/Departments/PublicWorks/Permits/Applications.html.
Zhang, Y. et al., "Evaluation of Auditory and Visual Feedback on Task Performance in a Virtual Assembly Environment," Presence, vol. 15, No. 6, Dec. 2006.
Office Action dated Sep. 22, 2014 from Canadian Application No. 2,692,110.
Office Action dated Jul. 24, 2014 from Canadian Application No. 2,706,195.
City of Eugene, Department of Public Works, Policies and Procedures, Utility and Right-of-Way Permits, Construction Within and Use of the Public Way, edition Jan. 14, 2004, 60 pages.
Office Action dated Jul. 25, 2014 from U.S. Appl. No. 13/186,116.
Office Action dated Feb. 5, 2015 from Canadian Application No. 2,692,110.
Opinion and Order Following Motion for Judgment on Pleadings, Jan. 21, 2015; Case 2:13-cv-00346-MSD-LRLVAED *CertusView Technologies, LLC* v. *S&N Locating Services*; (Eastern District of Virginia).
Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit A to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-2 to Memorandum of Law in Support of Defendants Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-14 to Memorandum of Law in Support of Defendants Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-15 to Memorandum of Law in Support of Defendants' Motion for Exceptional Case Finding and Attorneys' Fees filed Feb.

(56) References Cited

OTHER PUBLICATIONS 4, 2015; Case 2:13-cv-00346-MSD-TEM; *CertusView Technologies, LLC* v. *S&N Locating Services, LLC et al.*, (Eastern District of Virginia).
Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
CertusView's Response in Opposition to S&N's Motion for Exceptional Case Finding and Attorneys' Fees filed Feb. 27, 2015; Case 2:13-cv-00346-MSD-TEM; *CertusView Technologies, LLC* v. *S&N Locating Services, LLC et al.*, (Eastern District of Virginia).
Reply in Support of Defendants' Motion for Exceptional Case Finding and Attorneys' Fees filed Mar. 9, 2015; Case 2:13-cv-00346-MSD-TEM; *CertusView Technologies, LLC* v. *S&N Locating Services, LLC et al.*, (Eastern District of Virginia).
Memorandum Order regarding Functional Equivalency Objections and Sanctions Objections filed Mar. 11, 2015; Case 2:13-cv-00346-MSD-TEM; *CertusView Technologies, LLC* v. *S&N Locating Services, LLC et al.*, (Eastern District of Virginia).
Office Action dated Mar. 25, 2015 from U.S. Appl. No. 14/063,417.
S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC* v. *S&N Locating Services, LLC et al.*, (Eastern District of Virginia).
CertusView's Objections to the Magistrate Judge's Order (Dkt. No. 248) Allowing S&N's Amended Answer and Counterclaims filed Feb. 2, 2015; Case No. 2:13-cv-346 (MSD) (TEM); *CertusView Technologies, LLC* v. *S&N Locating Services, LLC et al.*, (Eastern District of Virginia).
Office Action dated Mar. 20, 2015 from Canadian Application No. 2,706,195.
Lewis et al., Spatially Enabling Office/Field Workflows at Eastern Municipal Water District, esri Vietnam, 2007, 3 pages.
Office Action dated Mar. 11, 2015 from U.S. Appl. No. 12/837,379.
Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC* v. *S&N Locating Services, LLC et al.*, (Eastern District of Virginia) (Parts 1, 2, 3 and 4).
Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC* v. *S&N Locating Services, LLC et al.*, (Eastern District of Virginia).
CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC* v. *S&N Locating Services, LLC et al.*, (Eastern District of Virginia).
Memorandum Order filed Aug. 7, 2015; Case 2:13-cv-00346-MSD-TEM; *CertusView Technologies, LLC* v. *S&N Locating Services, LLC et al.*, (Eastern District of Virginia).
Examiner's Answer to Appeal Brief dated Aug. 20, 2015 from U.S. Appl. No. 12/840,467.
Office Action dated Aug. 12, 2015 from U.S. Appl. No. 12/840,461.
Examination Report dated Sep. 4, 2015 from Australian Patent Application No. 2014224139.
Common Ground Alliance, Best Practices Version 6.0, Feb. 2009, online: CGA Best Practices Archive; http://www.commongroundalliance.com; 104 pages.
CertusView's Reply in Support of its Motion to Strike and in the Alternative Dismiss S&N's First Amended Answer and Counterclaims (Dkt. No. 253) filed Mar. 2, 2015; *CertusView Technologies, LLC* v. *S&N Locating Services, LLC et al.*, (Eastern District of Virginia).
CertusView's Request for Leave to File a Sur-Reply in Support of its Opposition to Defendants' Motion for Attorney's Fees filed Mar. 18, 2015; *CertusView Technologies, LLC* v. *S&N Locating Services, LLC et al.*, (Eastern District of Virginia).
Defendants' Response to CertusView's Motion to Strike and in the Alternative Dismiss S&N's First Amended Answer and Counterclaims (Dkt. No. 253) filed Feb. 23, 2015; *CertusView Technologies, LLC* v. *S&N Locating Services, LLC et al.*, (Eastern District of Virginia).
Defendants' Response to CertusView's Objections to the Magistrate Judge's Order (Dkt. 248) Allowing S&N's Amended Answer and Counterclaims filed Feb. 17, 2015; Case 2:13-cv-00346-MSD-TEM; *CertusView Technologies, LLC* v. *S&N Locating Services, LLC et al.*, (Eastern District of Virginia).
Defendant's Response to CertusView's Objections to the Magistrate Judge's Order (Dkt. No. 254) Awarding Sanctions on S&N's Motion to Compel filed Feb. 23, 2015; *CertusView Technologies, LLC* v. *S&N Locating Services, LLC et al.*, (Eastern District of Virginia).
Opinion and Order to Plaintiff's Rule 72 Objections to the Magistrate Judge's Jan. 16, 2015 Order Granting Defendants Leave to Amend their Answer and Counterclaims, and on Plaintiff's Motion to Strike and in the Alternative Dismiss S&N's First Amended Answer and Counterclaims, filed May 22, 2015; *CertusView Technologies, LLC* v. *S&N Locating Services, LLC et al.*, (Eastern District of Virginia).
Responsive Expert Report of Dr. Randel Dymond, P.E. to the Expert Report of Mr. Ivan Zatkovich dated Sep. 30, 2014, filed Nov. 13, 2014; *CertusView Technologies, LLC* v. *S&N Locating Services, LLC et al.*, (Eastern District of Virginia).
Bauer, S. et al., "Quantification of groundwater contamination in an urban area using integral pumping tests," Journal of Contaminant Hydrology; vol. 75, Issues 3-4; Dec. 2004, pp. 183-213.
Holder, T. et al., A new approach for source zone characterization: the Neckar Valley study. Groundwater Quality: Remediation and Protection, IAHS Publication, vol. 250, IAHS Press, Wallingford, Oxfordshire, UK, pp. 49-55.
Mike Herbert, Karel Kovar, Universitat Tubingen Geological Institute "Groundwater Quality: Remediation and Projection" IAHS

(56) References Cited

OTHER PUBLICATIONS

Publication No. 250, Proceedings of the GQ conference held in Tubingen, German from Sep. 21-25, 1998.
Office Action dated Jan. 20, 2016 from U.S. Appl. No. 12/840,476.
Office Action mailed Jan. 11, 2016 from U.S. Appl. No. 12/840,481.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Office Action dated May 19, 2015 from Canadian Application No. 2,885,962.
Office Action dated May 15, 2015 from U.S. Appl. No. 13/186,116.
Notice of Filing of Defendants' Second Amended Answer and Counterclaims filed Jun. 12, 2015; Case No. 2:13-cv-346 (MSD) (TEM); *CertusView Technologies, LLC v. S&N Locating Services, LLC et al.*, (Eastern District of Virginia).
S&N Locating Services, LLC's and S&N Communications, Inc.'s Second Amended Answer, Affirmative Defenses, and Counterclaims to Plaintiff's First Amended Complaint filed Jun. 12, 2015; Case No. 2:13-cv-346 (MSD) (TEM); *CertusView Technologies, LLC v. S&N Locating Services, LLC et al.*, (Eastern District of Virginia).
Opinion and Order filed Aug. 2, 2016; Case 2:13-cv-346-MSD-RJK; *CertusView Technologies, LLC v. S&N Locating Services, LLC et al.* (Eastern District of Virginia).
Opinion and Order Denying Plaintiff's Motion for Partial Reconsideration of the Court's Judgment of Patent Ineligibility under 35 U.S.C. § 101 filed 8/10/20116; Case 2:13-cv-346-MSD-RJK; *CertusView Technologies, LLC v. S&N Locating Services, LLC et al.* (Eastern District of Virginia).
Transcript of Bench Trial Proceedings, vol. 1A, pp. 1-89, Mar. 8, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 1B (Afternoon Session), Mar. 8, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 2A, pp. 99-216, Mar. 9, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 2B (Afternoon Session), Mar. 9, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 3A, pp. 429-554, Mar. 10, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 3B, (Afternoon Session), Mar. 10, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 4A (Morning Session), Mar. 11, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 4B, pp. 779-921, Mar. 11, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 5A, pp. 922-1065, Mar. 14, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 5B, (Afternoon Session), Mar. 14, 2016; Case 2:13-cv-346-MSD-RJK; *CertusView Technologies, LLC v. S&N Locating Services, LLC et al.* (Eastern District of Virginia).
Notice of Allowance dated Oct. 13, 2016 from U.S. Appl. No. 14/815,230.
Office Action dated Oct. 5, 2016 from U.S. Appl. No. 12/823,028.
Office Action dated Jul. 7, 2015 from Canadian Application No. 2,739,094.

\* cited by examiner

```
                        Excavation Notice
KD   00005  POCS  12/31/08   20:19:11   2008371309--000 NEW  XCAV  RTN ========= UNDERGROUND UTILITY LINE PROTECTION REQUEST =========
302
Serial Number--[20083771309] - [000]  Channel# -- [2013026] [0313]

Message Type--[NEW] [EXCAVATION] [ROUTINE]
                        304A
County--[BUCKS]              Municipality--[BENSALEM TWP]
Work Site--[100 ST. FRANCIS LN]
        Nearest Intersection--[SMOKY MOUNTAIN HWY]
        Second Intersection--[CHESTNUT HILL]
        Subdivision--[ ]
Location Information-                              Ticket
304B                                                300
        [MARK PERIMETER OF BUILDING]
        Caller Lat/Lon--[ ]
Mapped Type--[P]   Mapped Lat/Lon--
        [35.67696022/-83.7560695]
306
        Map Graphic--[http://www.palcall.org/ViewMap/view.aspx?sn=20083771309]
Type of Work--[INSTL CONDUIT]                Depth:--[18-30IN]
Extent of Excavation--[392FT]   Method of Excavation--[DRILL, TRENCHER]
Street--[ ] Sidewalk--[ ] Pub Prop--[ ] Pvt Prop--[x] Other--[ ]
308
        Lawful Start Dates--[06-Jan-09 Through [15-Jan-09]
        Scheduled Excavation Date--[06-Jan-09] Dig Time--[0700] Duration--[3 DAYS]
                Response Due Date--[05-Jan-09]

Caller--[ANDREW JONES]              Phone--[732-690-8274] Ext--[ ]
Excavator--[JACK SMITH CONSTRUCTION]    Homeowner/Business--[B]
Address--[17 WILLOW RD]
City--[PALMER]     310                     State--[PA] Zip--[18045]
Fax--[610-258-9238]         Email--[JACKSMITHLLC@YAHOO.COM]
Work Being Done For--[VERIZON FTTP AND INFRASOURCE]

Person to Contact--[ANDREW JONES]   Phone--[732-690-8274] Ext--[ ]
Best Time to Call--[ANYTIME ]
                                    312
Prepared--[Dec31-08] at [2019] by [JANE DOE]

Job Number--[8A37020-002]

Remarks--
        [ ]      314

FP 0 FP =W&SA               KC 0  KC =PECO PLMG
KD 0 KD=TWNSND WRTR         XZ 0  XZ =COMCAST CABLE B

Serial Number--[20083771309]-[000]
```

FIG. 3

Work Order
1800

1812    Work Order

Work Order Id: 28955
1802
Ticket Number: 20083771309-000
1814
Scheduled Work Begin Date/Time    04-Jan-2009 9:00AM
Expected Duration:    1 Hour
1808
Due Date: 05-Jan-2009
*Type:*    *Utility Locate*
*Priority:*    *3-ROUTINE*

1804
Dispatch Address:
    Address1:    100 ST. FRANCIS LN
    Address2:
    Address3:
    City: Townsend    State: TN    Zip: 37882
    Nearest Intersection: SMOKY MOUNTAIN HWY
    Second Intersection: [CHESTNUT HILL]

1806
Excavation Information:
    Work Being Done For: VERIZON FTTP AND INFRASOURCE
    *Project Type:*
    Type of Work:    INSTL CONDUIT    Depth    18-30IN
    Extent:    392FT    Method: DRILL, TRENCHER
    Street--[ ]  Sidewalk--[ ]  Pub Prop--[ ]  Pvt Prop--[x]  Other--[ ]

1810
Excavator Infromation:
    Name:    JACK SMITH CONSTRUCTION    Homeowner/Business--[B]
    Address:    17 WILLOW RD
    City:    TOWNSEND    State: TN    Zip: 37882
    FAX #:    610-258-9238    Email: JACKSMITHLLC@YAHOO.COM
Site Information-
    From Address1: 110 ST FRANCIS LN To Address1:
    From Address2:    To Address2:
    From Address3:    To Address3:
    City:    State: TN    Zip: 37882
    Subdivison Name:    Site Marked in White--[Y]

METHODS AND APPARATUS FOR ASSESSING RISKS ASSOCIATED WITH LOCATE REQUEST TICKETS BASED ON HISTORICAL INFORMATION

CROSS-REFERENCE TO RELATED APPLICATION

This application claims a priority benefit, under 35 U.S.C. §120, as a continuation (CON) of U.S. Non-provisional application Ser. No. 12/840,467, entitled "METHODS AND APPARATUS FOR ASSESSING RISKS ASSOCIATED WITH LOCATE REQUEST TICKETS," filed Jul. 21, 2010.

Ser. No. 12/840,467 claims a priority benefit, under 35 U.S.C. §120, as a continuation (CON) of U.S. Non-provisional application Ser. No. 12/823,028, entitled "METHODS AND APPARATUS FOR ASSESSING LOCATE REQUEST TICKETS," filed Jun. 24, 2010.

Ser. No. 12/823,028 claims a priority benefit, under 35 U.S.C. §119(a), to Canadian Application Ser. No. 2706195, entitled "METHODS AND APPARATUS FOR ASSESSING LOCATE REQUEST TICKETS," filed on Jun. 23, 2010.

Ser. No. 12/823,028 claims a priority benefit, under 35 U.S.C. §119(e), to U.S. Provisional Patent Application No. 61/220,491, entitled "METHODS AND APPARATUS FOR ASSESSING FIELD SERVICE OPERATION TICKETS," filed on Jun. 25, 2009.

Each of the above-identified applications is incorporated by reference herein in its entirety.

BACKGROUND

Fixed and mobile computer-based information systems are becoming cheaper, more rugged, and increasingly networked. As a result, technological advances are changing the way businesses collect, analyze, and manage information. For example, certain processes and certain types of equipment and instrumentation are becoming more automatic in nature, especially with regard to the capture and manipulation of data and the conversion of data into useful information.

The area of field service operations is an example of an area that is experiencing growth in information technology. Field service operations may be any operation in which companies dispatch technicians and/or other staff to remote locations in order to perform certain activities, for example, installations, services and/or repairs. Field service operations may exist in industries, such as, but not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a description of the dig area to be excavated or otherwise disturbed.

FIG. 1 illustrates an example in which a locate operation is initiated as a result of an excavator 110 providing an excavation notice to a one-call center 120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground.

Based on this information, the one-call center identifies certain underground facilities that may be affected by the proposed excavation at the work site. For example, one-call centers generally have access to various existing maps of underground facilities in their jurisdiction, referred to as "facilities maps." Facilities maps typically are provided by underground facilities owners within the jurisdiction and show, for respective different utility types, where underground facilities purportedly may be found relative to some geographic reference frame or coordinate system (e.g., a grid, a street or property map, GPS latitude and longitude coordinates, etc.).

Most often, using such facilities maps, a one-call center identifies a significant buffer zone around an identified work site (i.e., based on the address or location information provided by an excavator in the locate request), so as to make an over-inclusive identification of underground utilities that are implicated by the proposed excavation (e.g., to err on the side of caution). This practice of creating a buffer zone around an identified work site with reference to one or more facilities maps commonly is referred to as generating a "polygon" or "polygon map." Based on these generally over-inclusive polygons (and in some instances significantly over-inclusive polygons), the one-call center identifies all of the underground facilities that may fall within the polygon so as to notify the corresponding facility owners and/or their agents of the proposed excavation. Again, it should be appreciated that polygons or polygon maps utilized by one-call centers for this purpose typically embrace a geographic area that includes but goes well beyond the actual work site, and in many cases the geographic area enclosed by a given polygon is significantly larger than the actual dig area in which excavation or other similar activities are planned.

Once facilities implicated by the locate request are identified by a one-call center (e.g., via the polygon process), the one-call center generates a "locate request ticket" (also known as a "locate ticket," or simply a "ticket"). The locate request ticket typically identifies the work site of the proposed excavation and a description of the dig area, typically lists on the ticket all of the underground facilities implicated by the proposed excavation (e.g., by providing a member code for the facility owner of an underground facility that falls within a given polygon), and may also include various other information relevant to the proposed excavation (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner may contract with a locate service provider to receive locate request tickets and perform a locate and marking operation in response to received tickets on their behalf.

More specifically, upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A first step for the locate technician includes utilizing an underground facility "locate device," which is an instrument for detecting facilities that are concealed in some manner, such as cables and pipes that are located underground, to verify the presence or absence of underground facilities indicated in the locate request ticket as potentially present in the dig area (e.g., via the facility owner member codes listed in the ticket). An underground facility locate device is used to detect electromagnetic fields that are generated by a "test" signal provided along a length of a target facility to be identified. Locate devices typically include both a signal transmitter to provide the test signal (e.g., which is applied by the locate technician to a tracer wire disposed along a length of a facility), and a signal receiver which is generally a hand-held apparatus carried by the locate technician as the technician walks around the dig area to search for underground facilities. The signal receiver indicates a presence of a facility when it detects electromagnetic fields arising from the test signal. Conversely, the absence of a signal detected by the receiver of the locate device generally indicates the absence of the target facility.

Subsequently, the locate technician then generally marks the presence (and in some cases the absence) of a given underground facility in the dig area based on the various signals detected (or not detected) using the locate device. For this purpose, the locate technician conventionally utilizes a "marking device" to dispense a marking material on, for example, the surface of the ground along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground.

In some environments, arrows, flags, darts, or other types of physical marks may be used to mark the presence or absence of an underground facility in a dig area, in addition to or as an alternative to a material applied to the ground (such as paint, chalk, dye) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process.

The locate service provider 130 may handle a high volume of locate requests on a daily basis. For example, the locate service provider 130 may have locate offices (or profit centers) in different geographical regions and each locate office may have a hundred or more locate technicians in the field each day. Depending on its size, each locate office may respond to hundreds or even thousands of locate requests on a given day.

The locate service provider 130 may use one or more ticket processing systems to process incoming locate request tickets from the one-call center 120. For example, the ticket processing system may extract identifying information such as a ticket number from an incoming ticket and create a database entry for that ticket number. The database entry may be used throughout the life cycle of the ticket to keep track of pertinent information, such as the status of the ticket (e.g., whether the ticket has been dispatched to a locate technician and, if so, which locate technician).

The ticket processing system may populate the database entry with additional information retrieved from the ticket. For example, if the ticket includes an address for a corresponding work site, the ticket processing system may store the address in an appropriate field in the database entry.

SUMMARY

The inventors have appreciated that, although the Pipeline Safety Reauthorization Act of 1988 requires all states to establish one-call coverage for pipelines, the specific operations and practices of one-call centers may vary from region to region. For example, different jurisdictions may have different regulations regarding ticket content (e.g., the minimum amount of information that must be included in a ticket) and ticket due date (e.g., the deadline by which a locate operation must be performed in response to an incoming ticket).

Also, different one-call centers may obtain information from different sources and package the information into tickets in different manners. For example, depending on the particular excavator who provides an excavation notice and the particular one-call center that accepts and processes the excavation notice, a resulting locate request ticket may identify the location and boundaries of a proposed work site/dig area in a number of different ways, using street addresses, map grids, and/or latitudinal and longitudinal (lat/long) coordinates.

The inventors have appreciated that such disparities in ticket information may have adverse effects on the quality and efficiency of locate operations. For example, inadequate or inaccurate information regarding the work site and/or dig area location may cause delays in locate operations (e.g., a locate technician may be unable to ascertain the exact location and/or boundaries of the work site and/or dig area during a first visit and may need to return to the work site at some later time when improved location information becomes available). These delays may increase the operating costs of a locate service provider and may also increase the risk of damaging underground facilities.

The inventors have further appreciated that conventional ticket processing systems used by locate service providers may have limited assessment capabilities. That is, conventional ticket processing systems may offer limited capabilities in deriving information that is not explicitly included in the incoming tickets. For example, little or no assessment is done to estimate various aspects (or attributes) of a requested locate operation, such as location, scope, time, complexity, risk, value, resource requirements and the like. The lack of information regarding these and other aspects of locate request tickets may lead to various inefficiencies, e.g., in the scheduling of the locate operations and/or the allocation of resources to the locate operations. There may also be an increased risk of damaging underground facilities. As a result, profitability of the locate service providers may be adversely affected.

Thus, the inventors have recognized a need for improved information management, dissemination, and utilization in the locate industry and other field service industries in which mobile technicians are dispatched in response to incoming service requests.

In view of the foregoing, one embodiment of the present invention is directed to an apparatus for assessing one or more attributes of a locate operation requested in a locate request ticket. The apparatus comprises at least one processor programmed to extract ticket information from the locate request ticket at least in part by parsing the locate request ticket; apply one or more business rules to at least some of the ticket information to obtain a ticket assessment outcome for each of the one or more attributes; and dispatch at least one locate technician to perform the locate operation, based at least in part on the ticket assessment outcome for each of the one or more attributes.

Another embodiment is directed to an apparatus for assessing a complexity of one or more locate operations requested in a locate request ticket. The apparatus comprises at least one processor programmed to extract one or more information elements from the locate request ticket, and associate one or more complexity types to the locate request ticket based at least in part on the one or more information elements.

Another embodiment is directed to an apparatus for assessing a level of risk associated with one or more locate operations requested in a locate request ticket. The apparatus comprises at least one processor programmed to extract one or more information elements from the locate request ticket, and determine a risk value associated with the locate request ticket based at least in part on the one or more information elements.

Another embodiment is directed to an apparatus for assessing at least one attribute of a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the apparatus comprising: at least one communication interface; at least one memory to store processor-executable instructions; and at least one processor communicatively coupled to the at least one memory and the at least one communication interface, wherein, upon execution of the processor-executable instructions, the at least one processor: A) obtains ticket information from the locate request ticket at least in part by parsing the locate request ticket; B) applies one or more business rules to at least some of the ticket information to generate at least one ticket assessment outcome for the at least one attribute; and C) controls the at least one communication interface to transmit, and/or controls the at least one memory to store, the at least one ticket assessment outcome so as to facilitate clearing the locate request ticket and/or dispatching at least one locate technician to perform the locate and/or marking operation, based at least in part on the at least one ticket assessment outcome.

Another embodiment is directed to a method, performed in a system comprising at least one processor, at least one memory, and at least one communication interface, for assessing at least one attribute of a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) obtaining ticket information from the locate request ticket at least in part by parsing, via the at least one processor, the locate request ticket; B) applying one or more business rules to at least some of the ticket information, via the at least one processor, to generate at least one ticket assessment outcome for the at least one attribute; and C) transmitting via the at least one communication interface, and/or storing in the at least one memory, the at least one ticket assessment outcome so as to facilitate clearing the locate request ticket and/or dispatching at least one locate technician to perform the locate and/or marking operation, based at least in part on the at least one ticket assessment outcome.

Another embodiment is directed to at least one non-transitory computer-readable storage medium encoded with at least one program including processor-executable instructions that, when executed by a processor, perform a method for assessing at least one attribute of a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) obtaining ticket information from the locate request ticket at least in part by parsing the locate request ticket; B) applying one or more business rules to at least some of the ticket information to generate at least one ticket assessment outcome for the at least one attribute; and C) transmitting and/or storing the at least one ticket assessment outcome so as to facilitate clearing the locate request ticket and/or dispatching at least one locate technician to perform the locate and/or marking operation, based at least in part on the at least one ticket assessment outcome.

Another embodiment is directed to an apparatus for assessing complexity of a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the apparatus comprising: at least one communication interface; at least one memory to store processor-executable instructions; and at least one processor communicatively coupled to the at least one memory and the at least one communication interface, wherein, upon execution of the processor-executable instructions, the at least one processor: A) analyzes ticket information obtained from the locate request ticket; B) assigns at least one complexity designation to the locate request ticket based at least in part on A); and C) controls the at least one communication interface to transmit, and/or controls the at least one memory to store, the at least one complexity designation so as to facilitate clearing the locate request ticket and/or dispatching at least one locate technician to perform the locate and/or marking operation, based at least in part on the at least one complexity designation.

Another embodiment is directed to a method, performed in a system comprising at least one processor, at least one memory, and at least one communication interface, for assessing complexity of a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) analyzing, via the at least one processor, ticket information obtained from the locate request ticket; B) assigning, via the at least one processor, at least one complexity designation to the locate request ticket based at least in part on A); and C) transmitting via the at least one communication interface, and/or storing in the at least one memory, the at least one complexity designation so as to facilitate clearing the locate request ticket and/or dispatching at least one locate technician to perform the locate and/or marking operation, based at least in part on the at least one complexity designation.

Another embodiment is directed to at least one non-transitory computer-readable storage medium encoded with at least one program including processor-executable instructions that, when executed by a processor, perform a method for assessing complexity of a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) analyzing ticket information obtained from the locate request ticket; B) assigning at least one complexity designation to the locate request ticket based at least in part on A); and C) transmitting and/or storing the at least one complexity designation so as to facilitate clearing the locate request ticket and/or dispatching at least one locate technician to perform the locate and/or marking operation, based at least in part on the at least one complexity designation.

Another embodiment is directed to an apparatus for assessing risk associated with a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the apparatus comprising: at least one communication interface; at least one memory to store processor-executable instructions; and at least one processor communicatively coupled to the at least one memory and the at least one communication interface, wherein, upon execution of the processor-executable instructions, the at least one processor: A) analyzes ticket information obtained from the locate request ticket; B) assigns at least one risk designation to the locate request ticket based at least in part on A); and C) controls the at least one communication interface to transmit, and/or controls the at least one memory to store, the at least one risk designation so as to facilitate clearing the locate request ticket and/or dispatching at least one locate technician to perform the locate and/or marking operation, based at least in part on the at least one risk designation.

Another embodiment is directed to a method, performed in a system comprising at least one processor, at least one memory, and at least one communication interface, for assessing risk associated with a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) analyzing ticket information obtained from the locate request ticket; B) assigning at least one risk designation to the locate request ticket based at least in part on A); and C) transmitting and/or storing the at least one risk designation so as to facilitate clearing the locate request ticket and/or dispatching at least one locate technician to perform the locate and/or marking operation, based at least in part on the at least one risk designation.

Another embodiment is directed to at least one non-transitory computer-readable storage medium encoded with at least one program including processor-executable instructions that, when executed by a processor, perform a method for assessing risk associated with a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) analyzing ticket information obtained from the locate request ticket; B) assigning at least one risk designation to the locate request ticket based at least in part on A); and C) transmitting and/or storing the at least one risk designation so as to facilitate clearing the locate request ticket and/or dispatching at least one locate technician to perform the locate and/or marking operation, based at least in part on the at least one risk designation.

Another embodiment is directed to an apparatus for assessing a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the apparatus comprising: at least one communication interface; at least one memory to store processor-executable instructions; and at least one processor communicatively coupled to the at least one memory and the at least one communication interface, wherein, upon execution of the processor-executable instructions, the at least one processor: A) in a first stage of assessment, produces a first assessment outcome at least in part by analyzing at least some ticket information obtained from the locate request ticket; B) in a second stage of assessment, produces a second assessment outcome based at least in part on the first assessment outcome; and C) controls the at least one communication interface to transmit, and/or controls the at least one memory to store, at least one of the first assessment outcome and the second assessment outcome so as to facilitate clearing the locate request ticket and/or dispatching at least one locate technician to perform the locate and/or marking operation.

Another embodiment is directed to a method, performed in a system comprising at least one processor, at least one communication interface, and at least one memory, for assessing a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) in a first stage of assessment performed by the at least one processor, producing a first assessment outcome at least in part by analyzing at least some ticket information obtained from the locate request ticket; B) in a second stage of assessment performed by the at least one processor, producing a second assessment outcome based at least in part on the first assessment outcome; and C) transmitting via the at least one communication interface, and/or storing in the at least one memory, at least one of the first assessment outcome and the second assessment outcome so as to facilitate clearing the locate request ticket and/or dispatching at least one locate technician to perform the locate and/or marking operation.

Another embodiment is directed to at least one non-transitory computer-readable storage medium encoded with at least one program including processor-executable instructions that, when executed by a processor, perform a method for assessing a locate and/or marking operation requested in a locate request ticket, the locate and/or marking operation comprising detecting and/or marking a presence or an absence of at least one underground facility within a dig area, wherein at least a portion of the dig area is planned to be excavated or disturbed during excavation activities, the method comprising: A) in a first stage of assessment, producing a first assessment outcome at least in part by analyzing at least some ticket information obtained from the locate request ticket; and B) in a second stage of assessment, producing a second assessment outcome based at least in part on the first assessment outcome.

Another embodiment is directed to an apparatus for managing information assets used for assessing locate and/or marking operations requested in locate request tickets, each locate and/or marking operation comprising detecting and/or marking a presence or an absence of at least one underground facility within a dig area, wherein at least a portion of the dig area is planned to be excavated or disturbed during excavation activities, the apparatus comprising: at least one communication interface; at least one memory to store processor-executable instructions; and at least one processor communicatively coupled to the at least one memory and the at least one communication interface, wherein, upon execution of the processor-executable instructions, the at least one processor: A) analyzes a record of a completed locate and/or marking operation; and B) updates, based at least in part on A), at least one information asset used for assessing locate and/or marking operations requested in locate request tickets. In one aspect, the at least one information asset comprises at least one business rule to be applied to ticket information to obtain one or more ticket assessment outcomes.

Another embodiment is directed to a method, performed in a system comprising at least one processor and at least one memory, for managing information assets used for assessing locate and/or marking operations requested in locate request tickets, each locate and/or marking operation comprising detecting and/or marking a presence or an absence of at least one underground facility within a dig area, wherein at least a portion of the dig area is planned to be excavated or disturbed during excavation activities, the method comprising: A) analyzing, via the at least one processor, a record, stored in the at least one memory, of a completed locate and/or marking operation; and B) updating, based at least in part on A), at least one information asset stored in the at least one memory and used for assessing locate and/or marking operations requested in locate request tickets. In one aspect, the at least one information asset comprises at least one business rule to be applied to ticket information to obtain one or more ticket assessment outcomes.

Another embodiment is directed to at least one non-transitory computer-readable storage medium encoded with at least one program including processor-executable instructions that, when executed by a processor, perform a method for managing information assets used for assessing locate and/or marking operations requested in locate request tickets, each locate and/or marking operation comprising detecting and/or marking a presence or an absence of at least one underground facility within a dig area, wherein at least a portion of the dig area is planned to be excavated or disturbed during excavation activities, the method comprising: A) analyzing a record of a completed locate and/or marking operation; and B) updating, based at least in part on A), at least one information asset used for assessing locate and/or marking operations requested in locate request tickets. In one aspect, the at least one information asset comprises at least one business rule to be applied to ticket information to obtain one or more ticket assessment outcomes.

For purposes of the present disclosure, the term "dig area" refers to a specified area of a work site within in which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility.

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "locate and marking operation," "locate operation," and "locate" are used interchangeably and refer to any activity to detect, infer, and/or mark the presence or absence of an underground facility. In some instances, the term "marking operation" is used to more specifically refer to that portion of a locate operation in which a marking material and/or one or more marking objects is/are employed to mark a presence or an absence of one or more underground facilities. The term "locate technician" refers to an individual performing a locate operation. A locate operation often is specified in connection with a dig area, at least a portion of which may be excavated or otherwise disturbed during excavation activities.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIG. 3 shows an example of a locate request ticket that may be received by a ticket management system, according to some embodiments of the present disclosure.

FIGS. 18A and 18B shows an example of a work order that may be created from an incoming locate request ticket, according to some embodiments of the present disclosure.

DETAILED DESCRIPTION

I. Overview

Figure 1:
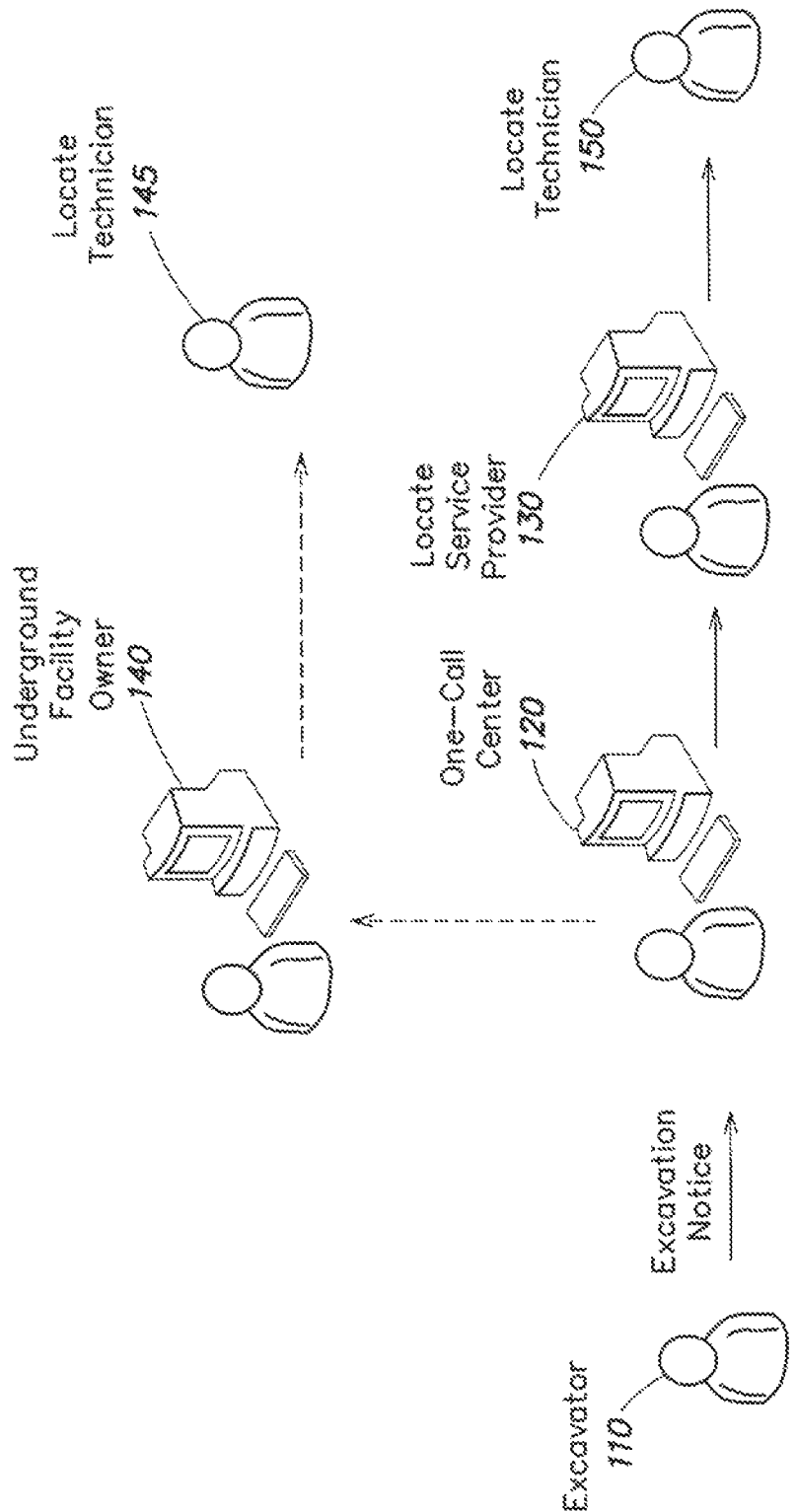
FIG. 1 shows an example in which a locate operation is initiated as a result of an excavator serving an excavation notice to a one-call center.

Various embodiments described herein relate to systems, methods and apparatus for improved information management, dissemination and utilization in field service operations in which mobile technicians are dispatched in response to service requests. In particular, some exemplary embodiments relate to systems, methods and apparatus for automatically and intelligently assessing locate request tickets to provide information that can be used to improve activity scheduling, resource allocation, quality control, and/or regulatory compliance. While the particular example of locate request tickets is provided herein primarily for purposes of illustration, it should be appreciated that the inventive concepts described herein may be more generally applicable to other types of field service operations.

As discussed above, the inventors have appreciated that there is a lack of an established data standard for use when sharing information among various entities in the locate industry, such as excavators, one-call centers, facility owners and locate service providers. As a result, the availability and consistency of data may not be always guaranteed. Accordingly, in some exemplary embodiments, a ticket management system is provided that associates a level of confidence with at least some input data to indicate how reliable the data is. For example, a level of confidence may be assigned to a data unit as it enters the ticket manage system, so that the propagation of unreliable information may be limited. In some embodiments, confidence levels may be used to resolve conflicts, so that information from a more trust-worthy source may be chosen over information from a less trust-worthy source. Additionally, multiple related pieces of information may be compared, and a confidence level may be increased when the related pieces of information are consistent with each other.

In some further embodiments, a ticket management system is provided that includes a ticket assessment engine for analyzing incoming locate request tickets. The ticket assessment engine may be programmed to derive useful information that is not directly available from the tickets themselves. A number of different types of assessments may be performed, including, but not limited to, those listed below. Furthermore, the different types of assessments may be performed in one or more stages, where an assessment outcome from one stage may influence an assessment outcome at a subsequent stage.

Location: In location assessment, various locations of interest may be derived and/or estimated, such as a location of a work site in which excavation activities are planned. In some instances, insufficient location information may be provided in a locate request ticket. For example, a location description may be vague or ambiguous (e.g., a street name without any house numbers). In other instances, multiple conflicting pieces of location information may be given (e.g., a street address and a pair of lat/long coordinates that do not match). In these situations, additional analysis may be needed to ascertain the location of the work site. Other examples of location information that may be assessed include a location of one or more landmarks at or near the work site, a location of one or more dig area indicators provided on a virtual white lines (VWL) image, and the like.

Scope: In scope assessment, any descriptive information regarding a requested locate operation may be analyzed from incoming locate request tickets, such as information describing the extent and/or nature of the requested work. For example, the size of a dig area, as measured in length or in area, may be indicative of the scope of a requested locate operation. The depth of excavation and the number of different facilities to be located may also be relevant.

Complexity: Complexity assessment may identify one or more aspects of a requested locate operation that may influence a manner in which the locate operation is to be conducted. For example, a locate operation may be classified as high complexity when a high profile facility asset (e.g., gas pipes and/or fiber-optic communication cables) is involved or when the work site is in a restricted access area (e.g., a military base or gated community). Such a classification may be used, for example, to determine whether a highly skilled technician and/or particular/special equipment may be required, and/or whether a delay in completing the locate operation is likely.

Time: Various time-related aspects of a requested locate operation may be assessed, such as a deadline by which the locate operation must be completed and/or an expected duration (e.g., an expected amount of time needed to complete the locate operation). In some situations, the expected duration for a requested locate operation may be determined based on its estimated scope (e.g., the number and types of different facilities involved) and/or complexity (e.g., delays due to access restrictions, special skills and/or equipment required, etc.).

Risk: Risk assessment may include estimating a measure of damages in an event of an accident (e.g., when underground facilities are damaged during excavation due to an improperly or inaccurately performed locate and/or marking operation). Examples of damages include, but are not limited to, economic losses, damages to property, environmental damages, and/or personal injuries. Certain intangible losses may also be taken into account, such as loss of customer satisfaction. In some embodiments, a locate service provider may wish to assess a level of potential liability for damages in an accident where the locate service provider is at fault (e.g., failing to complete a locate operation by a required deadline or inadequately performing a location operation). For example, a locate operation involving one or more main utility lines (e.g., water mains serving an entire neighborhood) may be considered high risk, because an accident involving a main utility line may expose the locate service provider to a large range of damages. By contrast, a locate operation involving only service lines (e.g., utility lines leading to a customer's premise) may be considered low risk, because the potential scope of damages may be relatively small in an accident involving a service line.

Value: Value assessment may be performed according to different measures of value. For instance, value assessment may be performed from the perspective of a locate service provider based on business value created by performing a locate operation. In some embodiments, such business value may simply be the revenue collected for the locate operation. In other embodiments, a measure of net profit may be used, where various operating costs may be subtracted from the revenue. For example, a measure of profit may take into account information from one or more contracts established between a locate service provider and a facilities owner (or some other entity contracting with the locate service provider to perform locate operations). Examples of contractual information include, but are not limited to, contractual provisions specifying bonuses and/or penalties for certain tickets. In some further embodiments, a more sophisticated measure such as value at risk may be used.

Resource: Resource assessment may include identifying one or more resources (e.g., equipment and/or personnel) needed to adequately perform a requested locate operation. In some embodiments, resource assessment may identify a personnel skill level or certification required to perform a locate operation. For example, in some jurisdictions, only a technician with gas certification may be dispatched to perform a locate operation involving gas pipes. In another example, personnel skill level may encompass both long term measurements, such as years of experience, and short term measurement, such as recent performance evaluations. In some further embodiments, resource assessment may identify one or more tools and/or pieces of equipment required or recommended for a locate operation. For example, if a locate request ticket indicates that one or more gas facilities are to be located, a gas detection tool may be required or recommended. In some instances, one or more contracts established between a locate service provider and a facilities owner (or some other entity contracting with the locate service provider to perform locate operations) may specify particular tools/equipment requirements for some types of locate operations.

The inventors have appreciated that the assessment outcomes provided by a ticket assessment engine may be used to improve various aspects of the business operations of a locate service provider, such activity scheduling, resource allocation, quality control, and/or regulatory compliance. In some embodiments, the ticket assessment engine may be programmed to provide an estimated measurement, ranking, score, classification and/or some other suitable value for each of the assessment targets listed above, or any other desirable assessment targets. These outcomes may then be input into one or more other components of the ticket management system, for example, an activity scheduling application, a ticket review application for quality control and training, and/or a customer billing application.

The ticket assessment engine may access various information sources in order to produce the desired assessment outcomes. For example, the ticket assessment engine may make use of facility plats available from the facility owners to determine whether certain geographical areas should be classified as high risk or high complexity areas. As another example, the ticket assessment engine may access a database containing past damage reports to determine whether a given excavator has a history of frequent and/or costly damages. As yet another example, the ticket assessment engine may access a database containing information regarding previously completed tickets to search for notes and/or remarks regarding a given geographical location.

The inventors have further appreciated that various types of ticket assessment may be carried out by an entity other than a locate service provider, such as a facilities owner, an excavator, a one-call center, a community (e.g., city, town, village, and/or other form of municipality) and/or an insurance company. These entities may perform ticket assessment based on their own interests and concerns. For instance, in assessing potential damages in an event of an accident, a facilities owner may take into account loss of customer satisfaction due to service interruption, which may in turn lead to economic losses for the facilities owner (e.g., customer canceling service contract). As another example, a facilities owner may assess the complexity of a requested locate and/or marking operation and determine whether it may be desirable to dispatch its own personnel to monitor the operation. In some instances, the facilities owner may even decide to dispatch its own personnel to perform the requested operation, instead of a locate technician dispatched by a locate service provider. As yet another example, a facilities owner or regulatory body may use ticket assessment to identify high risk locate and/or marking operations that may require auditing prior to excavation, to ensure that the locate service provider's technicians have adequately performed the operations.

Following below are more detailed descriptions of various concepts related to, and embodiments of, inventive systems, methods and apparatus for improved information management, dissemination and utilization in field service applications and, in particular, for assessing locate request tickets. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided primarily for illustrative purposes.

Generic terms such as "engine," "application" or "module" may be used herein when referring to one or more of software components of a ticket management system. Such terms should not be interpreted as being limiting in any way. Also, each of the software components described herein may be implemented in any suitable way, for example, as processor-executable instructions stored in at least one physical storage device (e.g., a non-volatile memory device and/or a volatile memory device) of a general purpose computer or some other suitable hardware system. The general purpose computer or hardware system may comprise at least one hardware processor for executing the instructions stored in the physical storage device, and may further comprise at least one input/output (I/O) interface for receiving inputs from input sources or devices and for sending outputs to output recipients or devices. In some embodiments, the hardware processor on which a software component executes may be in a mobile or portable device, such as a mobile telephone, personal digital assistant, a marking device (e.g., for spray painting lines or other marks on the ground), or any other type of mobile or portable device.

II. System Architecture and Components

Figure 2:
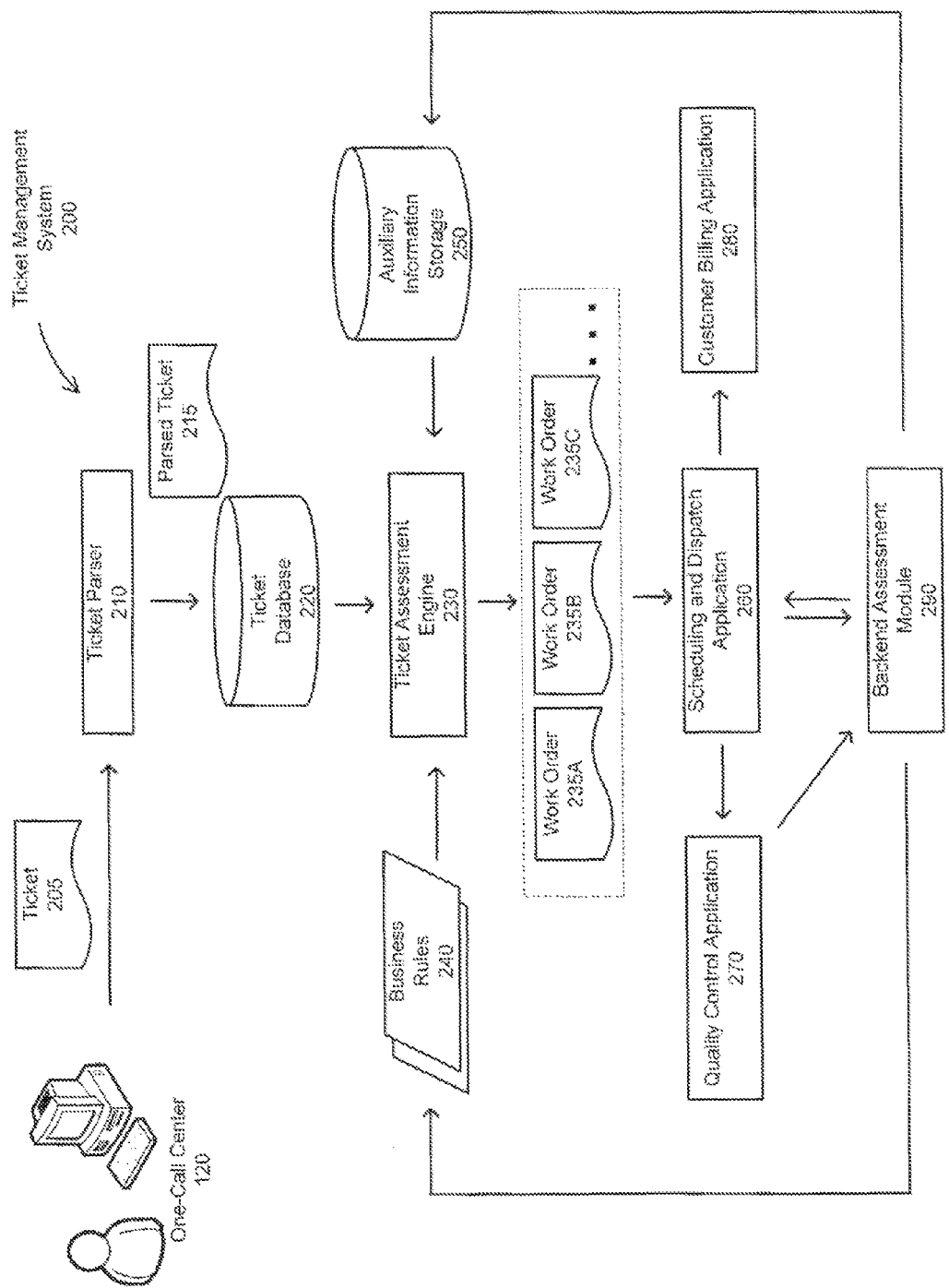
FIG. 2 shows an example of a ticket management system, according to some embodiments of the present disclosure, comprising a number of software components for performing various functions, such as parsing incoming locate request tickets, assessing parsed tickets according to appropriate business rules, and scheduling and dispatching locate technicians to perform locate operations.

FIG. 2 shows an example of a ticket management system 200 comprising a number of software components for performing various functions, such as parsing incoming locate request tickets, assessing parsed tickets according to appropriate business rules, and scheduling and dispatching locate technicians to perform locate operations. Generally, the ticket management system 210 may be a management software application run by a locate service provider, such as the locate service provider 130 shown in FIG. 1, although this is not required.

In the embodiment shown in FIG. 2, the ticket management system 200 receives locate request tickets 205 from one or more suitable sources, such as the one-call center 120 shown in FIG. 1. Each ticket typically includes one or more text strings describing various parameters of the requested locate operation, such as time, location and types of facilities. In some instances, one or more images depicting the work site and/or dig area may also be attached to the ticket. For purposes of the present disclosure, "ticket information" refers generally to any information included in or derived from locate request tickets (e.g., as issued by a one-call center).

Depending on the originating one-call centers, different types of information may be stored in the text portions of the tickets 205 in different formats. Therefore, a ticket parser 210 may be provided, which may be programmed to recognize an origin of a ticket 205 and perform the parsing accordingly to output a parsed ticket 215. The parsed ticket 215 may be created according to a standardized ticket format, which may be any suitable set of rules or conventions for representing and organizing data, designed to facilitate efficient handling of data by various software components. For example, the standardized format may be an Extensible Markup Language (XML) format. Further details regarding ticket parsing are described below in connection with FIG. 5.

In the embodiment shown in FIG. 2, ticket information, which may include one or more of the original ticket 205, the parsed ticket 215, and any images of the work site and/or dig area that may have been attached to or otherwise included with the ticket 205, is stored in a ticket database 220. The ticket database 220 may be any substantially persistent storage of data, for example, a relational database that is created and maintained using a suitable database software. The relational database may store relationships between excavation companies, one-call centers, facility owners, locate service providers, facilities maps, locate request tickets, and the like.

Any stored ticket information, including the parsed ticket 215, along with any associated images, may be retrieved from the ticket database 220 in a suitable manner and supplied to a ticket assessment engine 230 for processing and analysis. In some instances, the ticket assessment engine 230 may identify one or more prerequisite activities that must be completed before the requested locate operation can be undertaken. For example, the ticket assessment engine 230 may determine, based on the received ticket information, that a safety personnel must be dispatched to ensure that a manhole is clear of any hazardous gases before a locate technician may enter the manhole to perform a requested locate operation, or that a vacuum truck is to be dispatched to dig one or more potholes before a locate technician can begin a requested locate operation. Such prerequisite tasks may be performed by different work crews (e.g., with different equipment and/or skill sets) and may be scheduled separately from the requested locate operation.

As another example, the ticket 205 (and hence ticket information derived therefrom) may be related to a so-called "project ticket," which is a request for a locate operation that may encompass an appreciably large linear distance or geographic area, and hence may require a significant number of hours to complete (e.g., the work site may be several miles along a highway, or may include an entire housing development complex). The ticket assessment engine 230 may break up such a project in a suitable manner into multiple work orders (e.g., work orders 235A-C) and assess the ticket information accordingly (e.g., producing separate assessment outcomes for each individual work order). When appropriate, subsequent processing such as scheduling and dispatch may also be performed on a per work order basis.

In the embodiment shown in FIG. 2, the ticket assessment engine 230 applies an appropriate set of business rules 240 to evaluate ticket information. For example, there may be different business rules for assessing each of the following aspects: location, scope, complexity, time, risk, value, and/or resource. Exemplary business rules for some of these aspects are described in greater detail below in connection with FIGS. 9-16 and Tables 1-26. However, it should be appreciated that the present disclosure is not limited to the specific business rules discussed herein. For example, a business rule engine (not shown) may be used to allow business users to dynamically modify existing business rules and/or define new rules.

As discussed above, ticket assessment implemented by the ticket assessment engine 230 may proceed in one or more stages, where an assessment outcome from one stage may be an input to a subsequent stage of assessment. Accordingly, in some embodiments, the ticket assessment engine 230 may comprise one or more modules arranged in multiple stages, where each module may assess a different aspect of the requested locate operation. For instance, in one exemplary embodiment, the ticket assessment engine 230 may comprise multiple modules for assessing, respectively, location, scope, complexity, time, risk, value, and/or resource. Each module may implement a corresponding set of business rules, such as the business rules shown in Tables 1-26, and different modules may implement the corresponding set of business rules at different assessment stages within the engine 230. Examples of a ticket assessment engine 230 based on multiple assessment modules are described in greater detail below in connection with FIGS. 2A and 19.

In applying the business rules 240 to assess the ticket information, the ticket assessment engine 230 may rely on auxiliary input information such as facilities maps, past damage reports, excavator history, traffic, weather, and the like. These pieces of information may be accessed as needed from an auxiliary information storage 250, which may include one or more databases and/or lookup tables. Examples of various types of auxiliary input information used by the ticket assessment engine 230 are described in greater detail below in connection with FIGS. 6-8.

In the embodiment shown in FIG. 2, the ticket assessment engine 230 provides as an exemplary output one or more work orders 235A-C and populates the work order(s) with corresponding "assessment outcomes." An assessment outcome may be a numeric value (which may have any of a variety of possible units of measure, or no particular unit of measure, and may or may not be based on some range or scale), one or more symbols or alpha-character indicators (e.g., Y/N for "yes/no," T/F for "true/false," H/M/L for "high," "medium," "low," etc.), and/or one or more words/phrases. The ticket assessment engine 230 may output one or more assessment outcomes per ticket analyzed, such that a set of assessment outcomes are provided per ticket. As noted above in Section I, exemplary categories of assessment outcomes include, but are not limited to, scope, complexity, duration, risk, value, and resources. The populated work orders may then be forwarded to any number of components in the ticket management system 200. For example, the populated work orders may be forwarded to a scheduling and dispatch application 260, which may allocate an appropriate technician to each work order based on at least some of the assessment outcomes, such as estimated duration, estimated value and/or resource requirements. Alternatively, the populated work orders may be stored in a database that can be accessed by one or more components in the ticket management system 200.

It should be appreciated that the ticket assessment engine 230 may be implemented in any suitable manner, as the present disclosure is not limited in this respect. In some embodiments, the ticket assessment engine 230 may be implemented using Windows Workflow Foundation (WF), which is a Microsoft® technology for defining, executing, and managing workflows. For example, a workflow definition may be loaded for assessment from a .xml file, using rules loaded from a .rules file. When a new ticket is ready for assessment, a new instance of the workflow may be instantiated in a new WF thread. At the completion of successful ticket assessment, the assessment runtime may update the system database with the calculated output and mark the ticket as ready for scheduling.

The ticket assessment outcomes may be used by the scheduling and dispatch application 260 in any suitable manner, as the present disclosure is not limited in this respect. In some embodiments, a value assessment outcome may be used as a weighting factor. For example, a ticket that is assessed as having high value may be weighted to encourage the scheduling and dispatch application 260 to dispatch the ticket ahead of other tickets that are assessed as having lower values. A risk assessment outcome may be used in a similar fashion, to encourage the dispatch of higher risk tickets ahead of lower risk tickets. This may provide for more opportunities for review and quality assessment for the higher risk tickets.

In some further embodiments, a resource assessment outcome may be used by the scheduling and dispatch application 260 as a constraining factor in assigning technicians and/or equipment to tickets. For example, a ticket may be assessed as requiring a gas-certified, skill level 4 (GAS/4) locate technician. This may be used as a hard constraint, so that only locate technicians with GAS/4 or higher certification may be assigned to the ticket. Alternatively, the skill attribute may be used as a soft constraint, so that the ticket may be assigned to a lesser qualified locate technician only if a locate technician with GAS/4 or higher certification is not available. In such a situation, appropriate business rules may be implemented by the scheduling and dispatch application 260 to determine whether any potential negative effects (such as increased risk, increased duration, and/or decreased profitability) are outweighed by the potential benefits of completing the requested locate operation earlier.

In yet some further embodiments, the scheduling and dispatch application 260 may determine, based on one or more ticket assessment outcomes, that it is unnecessary to dispatch any technician to perform a requested locate and/or marking operation. For example, a scope assessment outcome may indicate a number and/or a type of facilities to be located as represented in the locate request ticket. In some instances, amongst the facilities noted in the ticket, there may be no underground facilities implicated (e.g., because the work site is located in a rural area that has only aerial power and phone lines and no underground gas pipes); in this case, the scope assessment outcome may indicate zero facilities of an underground type. As another example, a risk assessment outcome may indicate a low risk associated with the requested locate and/or marking operation (e.g., because all relevant facilities maps suggest that the closest underground facilities are at least some threshold distance away from a specified dig area). In these and similar situations, the locate request ticket may be flagged for an "office clear" (i.e., clearing the ticket without dispatching any locate technician to the work site), which may yield a higher profit margin for the locate service provider than a ticket for which a technician is dispatched. In some embodiments, the office clear may be performed automatically by analyzing the dig area (e.g., its shape, size, and/or location) against one or more relevant facilities maps. Alternatively, the office clear may be performed manually or semi-automatically, where a human operator screens the ticket to confirm that no underground facilities are likely present in the dig area.

When a technician reports the completion of a work order, the scheduling and dispatch application 260 may forward the work order to a quality control application 270, along with any activity logs and/or technician reports. The quality control application 270 may determine whether the work order has been adequately responded to, for example, by checking the activity logs to determine whether every facility type listed on the work order is accounted for. The quality control application 270 may also be programmed to present a user interface through which human supervisors may review the completed work order and determine whether the technician is in need of additional training in any particular area. Examples of manual, semi-automated and automated quality assessment techniques that may be suitable for implementing the quality control application 270 of the ticket management system 200 may be found in one or more of the following references, each of which is incorporated herein by reference:

U.S. patent application Ser. No. 12/493,109, filed on Jun. 26, 2009, entitled "Methods and Apparatus for Quality Assessment of a Field Service Operation;"

U.S. patent application Ser. No. 12/557,732, filed on Aug. 7, 2009, entitled "Methods and Apparatus for Quality Assessment of a Field Service Operation Based on Geographic Information;"

U.S. patent application Ser. No. 12/571,356, filed on Sep. 30, 2009, entitled "Methods and Apparatus for Analyzing Locate and Marking Operations with Respect to Facilities Maps;"

U.S. patent application Ser. No. 12/572,202, filed on Oct. 1, 2009, entitled "Methods and Apparatus for Analyzing Locate and Marking Operations with Respect to Historical Information;"

U.S. patent application Ser. No. 12/568,087, filed on Sep. 28, 2009, entitled "Methods and Apparatus for Generating an Electronic Record of Environmental Landmarks Based on Marking Device Actuations;"

U.S. patent application Ser. No. 12/572,260, filed on Oct. 1, 2009, entitled "Methods and Apparatus for Analyzing Locate and Marking Operations with Respect to Environmental Landmarks;" and U.S. patent application Ser. No. 12/703,809, filed on Apr. 14, 2010, entitled "Marking Apparatus Equipped with Ticket Processing Software for Facilitating Marking Operations, and Associated Methods."

Because of a high volume of work orders processed by a locate service provider, it may in some situations be infeasible for every work order to receive a quality assessment, especially one that requires human review. Accordingly, in some embodiments, one or more assessment outcomes may be used to filter the completed work orders to identify those work orders that may require specific quality assessment involving human review. For instance, a risk assessment outcome may be used to filter out low- or medium-risk work orders, so that only high-risk work orders are submitted for human review. In case a numerical measure of risk is used, a suitable threshold may be selected to identify high-risk work orders. Alternatively, a combination of assessment outcomes may be used for filtering. For example, one or more filtering rules may be applied to any suitable combination of assessment outcomes (e.g., location, scope, complexity, time, risk, value and/or resource) to identify candidate work orders for human review. As a more specific example, a filtering rule may take into account any suitable combination of the following information: one or more types of facilities to be located, client identity (e.g., identity of a facilities owner), type of excavation to be carried out subsequent to the locate operation, excavator identity, damage history for a geographical area encompassing the work site, and damage history associated with the client and/or excavator. Other types of information may also be taken into account, as the inventive concepts described herein relating to filtering are not limited to any specific examples of filtering criteria.

The scheduling and dispatch application 260 may also forward the completed work order to a billing application 280, which may apply various billing rules to calculate a fee to be billed to each customer. For example, the billing application may use the activity logs to determine the amount of time the technician spent on each facility type and compute a fee accordingly to be billed to that facility owner.

In some embodiments, the ticket assessment system 200 may further include a feedback mechanism, such as a backend assessment module 290. As shown in FIG. 2, the backend assessment module 290 may monitor completed work orders received from the scheduling and dispatch application 260 and send appropriate updates to various other components of the ticket management system 200. For example, the backend assessment module 290 may maintain statistical information regarding the completed work orders and provide the statistical information to a business rule engine (not shown), which may update the business rules 240 accordingly. Similarly, the backend assessment module 290 may provide updates to some of the historical information stored in the auxiliary information storage 250.

In some instances, a work order may be closed by a technician for reasons other than having completed the requested location operation. For example, the technician may be unable to gain access to a work site, or may discover significant discrepancy between the dig area description and the actual dig area. The technician may then close the current work order and request that a new work order be generated.

Upon detecting such a situation, the backend assessment module 290 may generate an appropriate new work order, e.g., with more accurate work site and/or dig area information, and submit it to the scheduling and dispatch application 260 for re-dispatch.

Additionally, the backend assessment module 290 may be adapted to receive information from the quality control application 280. For example, upon reviewing a completed work order via the quality control application 280, a human supervisor may discover a significant problem and may determine that a re-mark or re-stake operation is necessary. This information may be provided to the backend assessment module 290, which may generate a new work order accordingly and perform appropriate updates to the information stored in the auxiliary information storage 250.

Figure 2A:
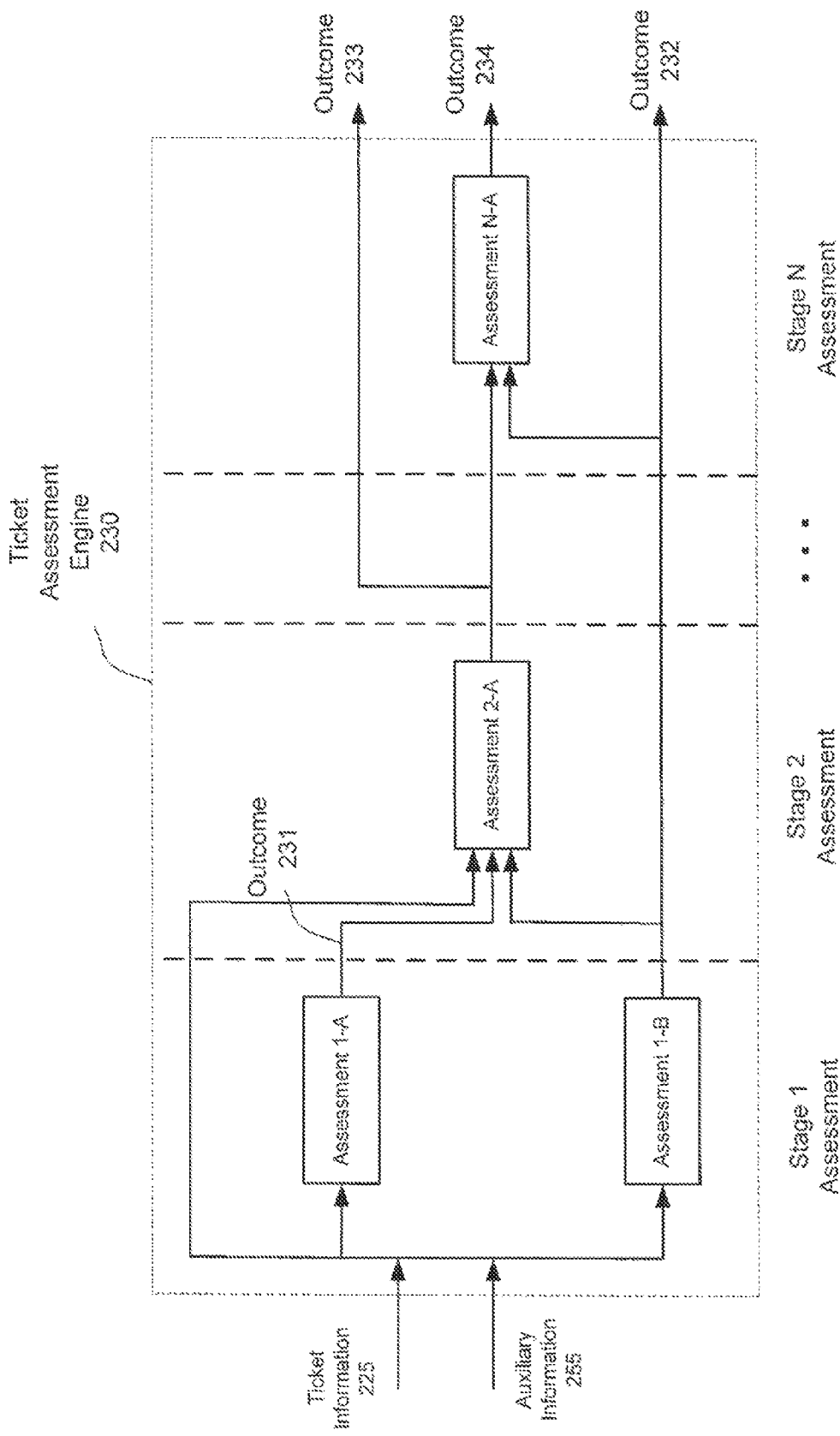
FIG. 2A shows an illustrative implementation of a ticket assessment engine comprising a network of ticket assessment modules arranged in multiple stages.

Turning now to FIG. 2A, an illustrative implementation of a ticket assessment engine (e.g., the ticket assessment engine 230 of FIG. 2) is shown, comprising a network of ticket assessment modules arranged in multiple assessment stages. In this example, there are N different stages of assessment within the assessment engine, numbered 1 through N. Each stage may include one or more assessment modules (e.g., labeled in FIG. 2A as "Assessment 1-A," "Assessment 1-B," "Assessment N-A," etc.), wherein each module comprises a corresponding set of business rules (e.g., business rules 240 in FIG. 2) that are used to assess various elements of ticket information. To this end, each module may receive as input one or more of the following: ticket information 225, auxiliary information 255, (e.g., facilities maps, stored images, historical records, environmental data and/or lookup tables), and/or one or more assessment outcomes from one or more previous stages of assessment.

For instance, as illustrated in FIG. 2A, a first stage assessment (Stage 1 Assessment) may include two modules, Assessment 1-A and Assessment 1-B, each receiving ticket information and auxiliary information as input. Assessment 1-A may produce Outcome 231, which may be fed into a Stage 2 Assessment module, Assessment 2-A. Assessment 1-B may produce Outcome 232, which may also be fed into Assessment 2-A. Furthermore, Outcome 232 may be used at an even later stage of assessment, e.g., at Assessment N-A. Further still, Outcome 232 may be output by the ticket assessment engine as a "final" assessment outcome. In this respect, Outcome 231 produced by Assessment 1-A may be an "intermediate" assessment outcome, in that it is used only internally, by other assessment modules, and is not output by the ticket assessment engine.

In addition to receiving Outcome 231 and Outcome 232, produced respectively by the modules Assessment 1-A and Assessment 1-B, Assessment 2-A may access other information, such as the ticket information 225 input to the ticket assessment engine and/or auxiliary information 255 accessible to the ticket assessment engine. The output of Assessment 2-A, namely, Outcome 233, may be output by the ticket assessment engine as a final outcome, and may be fed into a later stage assessment module, e.g., Assessment N-A. Finally, Assessment N-A may produce Outcome 234 based on inputs from different stages of assessment, e.g., Outcome 232 and Outcome 233.

Although some specific arrangements of assessment modules are shown in FIG. 2A, it should be appreciated that those arrangements are merely illustrative. Other suitable arrangements may also be used, as the present disclosure is not limited in this respect. Also, any suitable types of assessment may be implemented by the assessment modules, including, but not limited to, scope, location, complexity, risk, value, time and/or resource. A more specific illustrate example of a multi-stage ticket assessment engine is discussed in greater detail below, in connection with FIG. 17.

III. Exemplary Locate Request Ticket

FIG. 3 shows an example of a locate request ticket 300 that may be received by the ticket management system 200, for example, via email from the one-call center 120 shown in FIG. 1. The ticket 300 may contain various pieces of information stored in a number of fields, including:

- Ticket number 302. A ticket type (e.g., new, emergency, re-mark or survey) may also be indicated
- Location information 304A (e.g., street address, nearby cross streets, subdivision, city and/or county) and 304B (e.g., lat/long coordinates provided in decimal degrees). Although not shown, location information may also include coordinates for one or more dig area indicators on a VWL image associated with the ticket.
- Excavation information 306, including reason (e.g., installing conduit), scope (e.g., 392 feet), depth (e.g., 18-30 inches), method (e.g., by drill and trencher) and property type (e.g., private property).
- Timing information 308, including scheduled excavation date and time (e.g., Jan. 6, 2008 at 7:00 a.m.), duration of excavation (e.g., 3 days), and due date for the corresponding locate operation request (e.g., Jan. 5, 2008). Although not shown, timing information may also include a scheduled end date and time for the excavation activities, and/or a date and time after which locate marks may expire and a re-mark operation may be needed.
- Excavator information 310, including name, address, contact information such as business and/or mobile phone number, fax number and email address, and the party who contracted the excavator (e.g., as indicated in the "Work Being Done For" field). Although not show, excavator information may also include a user identifier for the excavator (e.g., a login name used by the excavator to create the ticket via a one-call center's web site).
- One-call center information 312, including the date and time at which the ticket was created and the customer service representative who created the ticket. Although not shown, one-call center information may also include a one-call center identification (e.g., an alphanumeric identifier for the one-call center that created the ticket) and/or information identifying a method of entry for the ticket (e.g., by phone or email, or via a web site).
- Member codes 314, indicating the different types of facilities that need to be located and/or the facilities owners that are notified of the ticket.

It should be appreciated that the above list of information elements is merely illustrative, as other combinations of information elements may also be suitable. For example, when preparing a locate request ticket, a one-call center may draw a polygon on a map corresponding to the work site. This polygon may be overlaid onto one or more facilities maps to determine which types of facilities are implicated. For example, a facility type (or owner) may be indicated on the locate request ticket in the member code section 314 if and only if at least one utility line of that type (or owner) touches or intersects with the polygon. In some instances, the one-call center may provide the coordinates for the vertices of the polygon in the locate request ticket, along with other information describing the location and boundaries of the work site and/or dig area.

As another example, the ticket may include locate instructions provided by an excavator who initiated the ticket, which may be in the form of free text. As yet another example, the ticket may include information indicating whether the planned excavation activities include any boring (e.g., on a street, driveway and/or sidewalk) and/or blasting. As yet another example, the ticket may indicate whether a permit has been obtained for a related construction project (e.g., installing a swimming pool or building a foundation for a structure).

In some embodiments, one or more images or graphical representations of the work site and/or dig area may be attached to the ticket 300. For instance, a so-called virtual white lines (VWL) image may be attached, which may contain a digital image of the work site including the dig area (or some other suitable digital data representing the geographic location of the dig area) along with electronic annotations delimiting the dig area.

Figure 4:
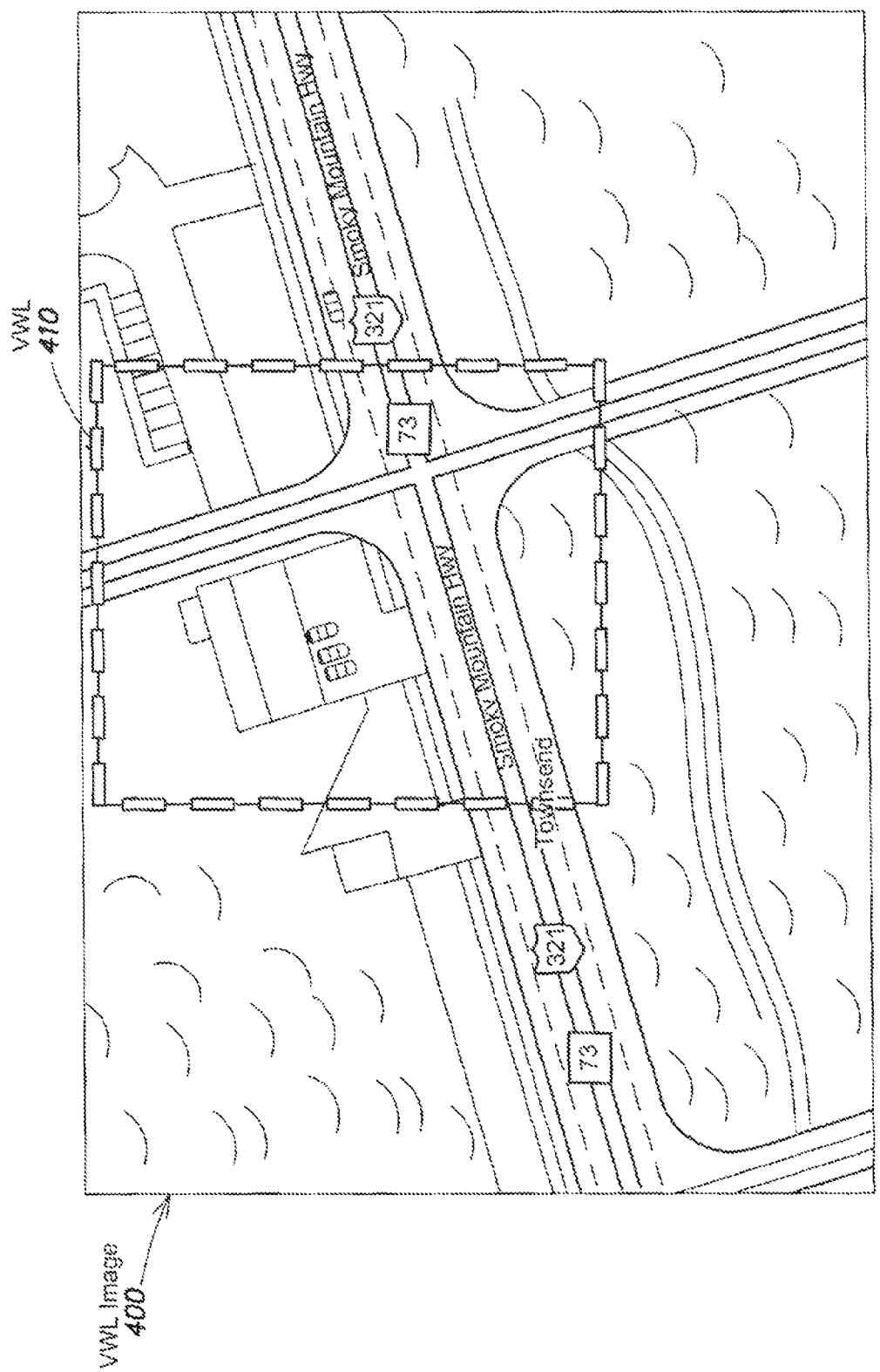
FIG. 4 shows an example of a virtual white lines (VWL) image associated with a ticket received by a ticket management system, according to some embodiments of the present disclosure.

An example of a VWL image 400 is shown in FIG. 4. As shown, the dig area is indicated on an aerial image by a set of dashed lines 410 forming a rectangle. The lines 410 are more generally referred to as "dig area indicators," which may be any electronically generated markings indicating a point, line, path and/or area of the planned excavation.

In some embodiments, the VWL image 400 may be created by the excavator using a suitable VWL application (not shown), such as those described in U.S. patent application Ser. No. 12/050,555 and U.S. Provisional Patent Application No. 61/151,769 and No. 61/151,815, all of which are incorporated by reference herein in their entireties. For example, the excavator may use the VWL application to obtain an aerial image of a geographical location encompassing the planned dig area and use a drawing tool of the VWL application to add the dig area indicators 410 to the aerial image.

IV. Ticket Parsing

As discussed above, locate request tickets originating from different one-call centers may store information in different formats (e.g., different one-call centers may use different commercial software to generate locate request tickets). Therefore, a ticket parsing application, such as the ticket parser 210 shown in FIG. 2, may be used to convert incoming tickets to a standardized format recognized by various components within a ticket management system.

Figure 5:
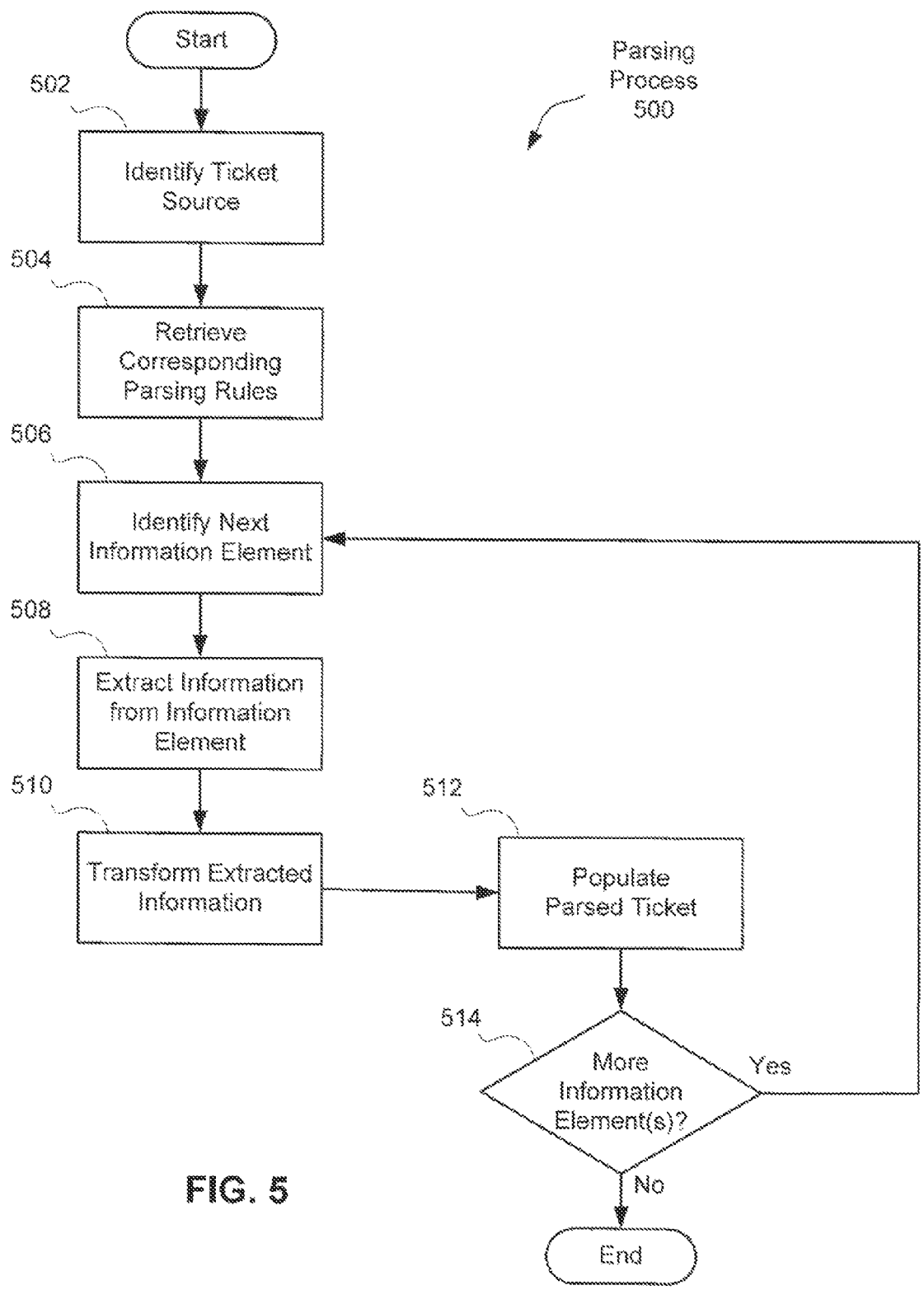
FIG. 5 shows an illustrative process that may be performed by a ticket parsing application to convert an incoming locate request ticket into a parsed ticket, according to some embodiments of the present disclosure.

FIG. 5 shows an illustrative process 500 that may be performed by a ticket parsing application to convert an incoming locate request ticket into a parsed ticket.

At act 502, the ticket parsing application may identify a source or origin of an incoming ticket (e.g., a particular one-call center that generated the incoming ticket). This may be accomplished in a number of different ways. For example, the ticket parsing application may simply search the ticket to determine whether the originating one-call center is identified in the ticket itself. Alternatively, if the ticket is received via email, the ticket parsing application may identify the originating one-call center by examining the sender's email address. As yet another example, the ticket parsing application may search the ticket for some indication of a geographic area to which the work site belongs (e.g., a city or town name) and identify a one-call center serving that geographic area.

At act 504, the ticket parsing application may retrieve or otherwise identify a set of parsing rules corresponding to the one-call center identified at act 502. The parsing rules may allow the ticket parsing application to detect the locations of various information elements within the incoming ticket. In some instances, the information elements may be stored in respective fields in the incoming ticket. There may be a fixed ordering among the various fields, and each field may be a text block (e.g., an alphanumeric character string) of a fixed length. Thus, each field or text block may be found at a corresponding fixed offset from the beginning of the incoming ticket. Alternatively, some of the fields may have variable lengths, and one or more designated markers may be used to demarcate the end of a field (or the beginning of the next field). In that case, the ticket parsing application may locate and process the various fields in a sequential fashion.

At acts 506 and 508, the ticket parsing application may identify an information element (e.g., a text block) that has not be processed and proceed to extract information from the identified information element. For example, for a text block corresponding to an address field, the ticket parsing application may simply copy the entire string from the text block. Some minor transformations may be performed at act 510, such as truncating a street name that exceed a predetermined maximum length. More significant transformations may also be performed. For example, the ticket parsing application may be programmed to recognize alphanumeric codes and/or abbreviations specific to each one-call center and map those codes and/or abbreviations to some suitable standard representations.

At act 512, the ticket parsing application may populate appropriate fields in the parsed ticket with the information obtained at acts 506 and 508. Then, at act 514, the ticket parsing application may determine whether there is at least one unprocessed information element in the incoming ticket. If the determination is positive, the ticket parsing application may return to act 506 to identify a next unprocessed information element. Otherwise, the ticket parsing application may end the process 500, and the parsed ticket may be forwarded to a ticket assessment engine for further processing and analysis.

It should be appreciated that the process 500 for parsing an incoming ticket is merely illustrative. Depending on the one-call centers' actual practices, other processes and methods may also be suitable for converting an incoming locate request ticket to a standardized format.

V. Auxiliary Information Sources

Figure 6:
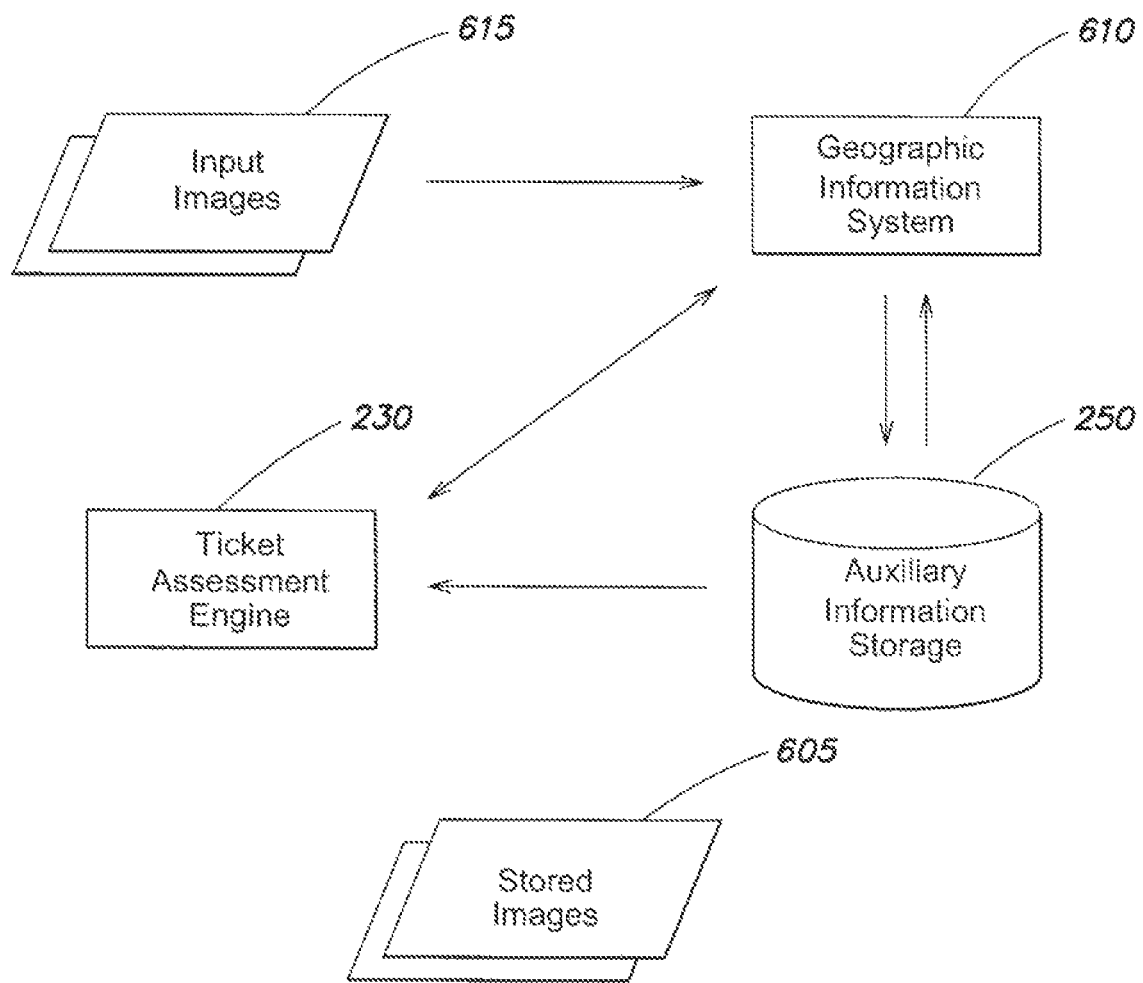
FIG. 6 shows an example in which a ticket assessment engine accesses one or more stored images that have been processed by a geographic information system, according to some embodiments of the present disclosure.

As discussed above in connection with FIG. 2, the ticket assessment engine 230 may access various types of auxiliary information from the auxiliary information storage 250 in order to produce the desired assessment outcomes. For example, as shown in FIG. 6, the assessment engine 230 may retrieve one or more stored images 605 from the auxiliary information storage 250, along with any associated metadata (e.g., geospatial metadata). As discussed in greater detail below, the stored images 605 may be created or modified by a geographic information system (GIS) 610 based on one or more input images 615.

For purposes of the present disclosure, an input image 615 may be represented by any source data that, when processed electronically by a suitable computer system, enables the computer system to display an image on a display device. This source data may be in any of a variety of suitable computer-readable formats, including PDF, JPG, BMP, GIF, PNG and the like.

In some instances, the source data for an image may be generated by scanning a tangible two-dimensional image source, such as paper or cloth. Alternatively, the source data may be generated by an image acquisition device as the result of acquiring a "real-world" scene. Examples of an image acquisition device include a digital camera (either still-frame or video), which may generate pixel information as part of the source data for an image. An image acquisition device may also be a laser scanning device that scans three-dimensional objects to produce coordinate information in a three-dimensional space.

The following is a non-exhaustive list of exemplary input images (or source data) using which the GIS 610 may create or modify the stored images 605.

Manual "free-hand" paper sketches of a geographic area, which may include one or more buildings, natural or man-made landmarks, property boundaries, streets, intersections and/or public works or facilities such as street lighting, signage, fire hydrants, mail boxes, parking meters, etc.

Various maps indicating surface features and/or extents of geographical areas, such as street/road maps, topographical maps, military maps, parcel maps, tax maps, town and county planning maps, polygon maps maintained by one-call centers and/or facility owners, virtual maps, etc.

Facilities maps illustrating installed underground facilities, such as gas, power, telephone, cable, fiber optics, water, sewer, drainage, etc. Street-level features or landmarks (e.g., streets, buildings, aboveground facilities, etc.) may also be indicated in relation to the depicted underground facilities. Facilities maps may be provided in paper and/or electronic form and may be maintained by, for example, one or more facility owners. For example, a gas company may maintain maps of gas lines, a power company may maintain maps of power lines, and so on.

Architectural, construction and/or engineering drawings and virtual renditions of a space/geographic area, including "as built" and/or post-construction drawings.

Land surveys, which are plots produced at ground level using references to fixed points such as the center line of a street to indicate the metes and bounds of a building, parcel, utility, roadway, or other object or installation, as well as other related location data.

Photographic renderings/images, including street level, topographical, satellite, and aerial photographic renderings/images, any of which may be updated periodically to capture changes in a given geographic area over time (e.g., seasonal changes such as foliage density, which may variably impact the visibility of some features in the geographic area).

A grid (e.g., a pattern of horizontal and vertical lines) used as a reference to provide representational geographic information, which may be added as an overlay to an acquired "real world" scene, a drawing, a map, etc.

"Bare" data representing geo-encoded information (e.g. lat/long coordinates identifying one or more points), which may be used to construct a virtual image without having captured any "real-world" scene. Such "bare" data may be in any of a variety of computer-readable formats, including XML.

In accordance with some embodiments, input images or source data such as those listed above may be analyzed and/or manipulated by the GIS 610 shown in FIG. 6. For example, the GIS 610 may be programmed to "geotag" an input image by associating geospatial metadata with features in the input image. The geospatial metadata may include any suitable combination of lat/long coordinates, altitude, bearing, place names, etc. As another example, the GIS 610 may be programmed to create a computer-aided design (CAD) drawing showing aboveground and/or underground facilities installed in a geographic area, and to associate geospatial metadata with at least some of the facilities shown on the drawing. As yet another example, the GIS 610 may be programmed to align two geotagged images, for example, by scaling one or both of the images and aligning one or more reference points. This process is sometimes referred to as "georeferencing," and may be useful in combining one or more facilities maps showing different types of facilities installed in the same geographic area.

Figure 7:
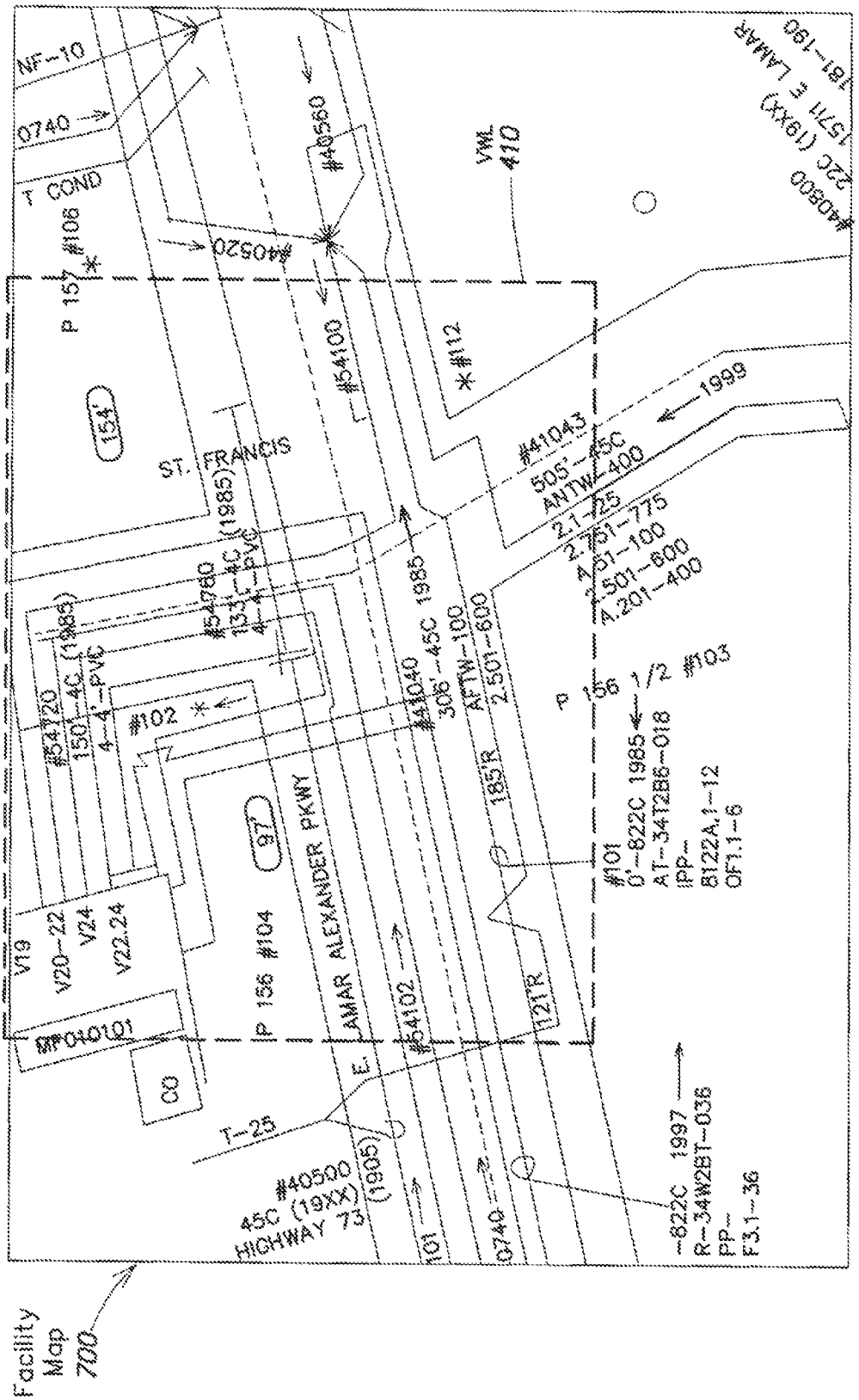
FIG. 7 shows an example of a facilities map with an overlaid VWL image, according to some embodiments of the present disclosure.

Thus, the GIS 610 may provide a framework for manipulating and displaying images in ways that may facilitate a variety of location-related analyses. As shown in FIG. 6, the ticket assessment engine may be adapted to invoke one or more services provided by the GIS 610. For example, the assessment engine may submit a geotagged VWL image (e.g., the VWL image 400 shown in FIG. 4) to the GIS 610 and request that the dig area indicators (e.g., the dig area indicators 410) be shown on a facilities map. Upon receiving the request, the GIS 610 may obtain a relevant facilities map, for example, by retrieving one or more existing maps from the auxiliary information storage 250 and combing them if necessary, or by creating a CAD drawing showing all facilities known to be present in the geographic area shown on the VWL image 400. The GIS 610 may then render the dig area indicators 410 as an overlay on the facilities map based on the geospatial metadata associated with the VWL image and the facilities map. An example of the resulting facilities map 700 with the dig area indicators 410 is shown in FIG. 7.

Images are merely one example of a variety of different types of information that may be used by a ticket assessment engine. Another example is a set of lookup tables, such as the lookup tables 800 shown in FIG. 8. In accordance with some embodiments, the ticket assessment engine may load one or more of these lookup tables and use them to map locate operation attributes to intermediate or final assessment outcomes. The locate operation attributes may be raw attributes directly obtained from locate request tickets, or derived attributes assigned by the ticket assessment engine based on some raw attributes.

Figure 8:
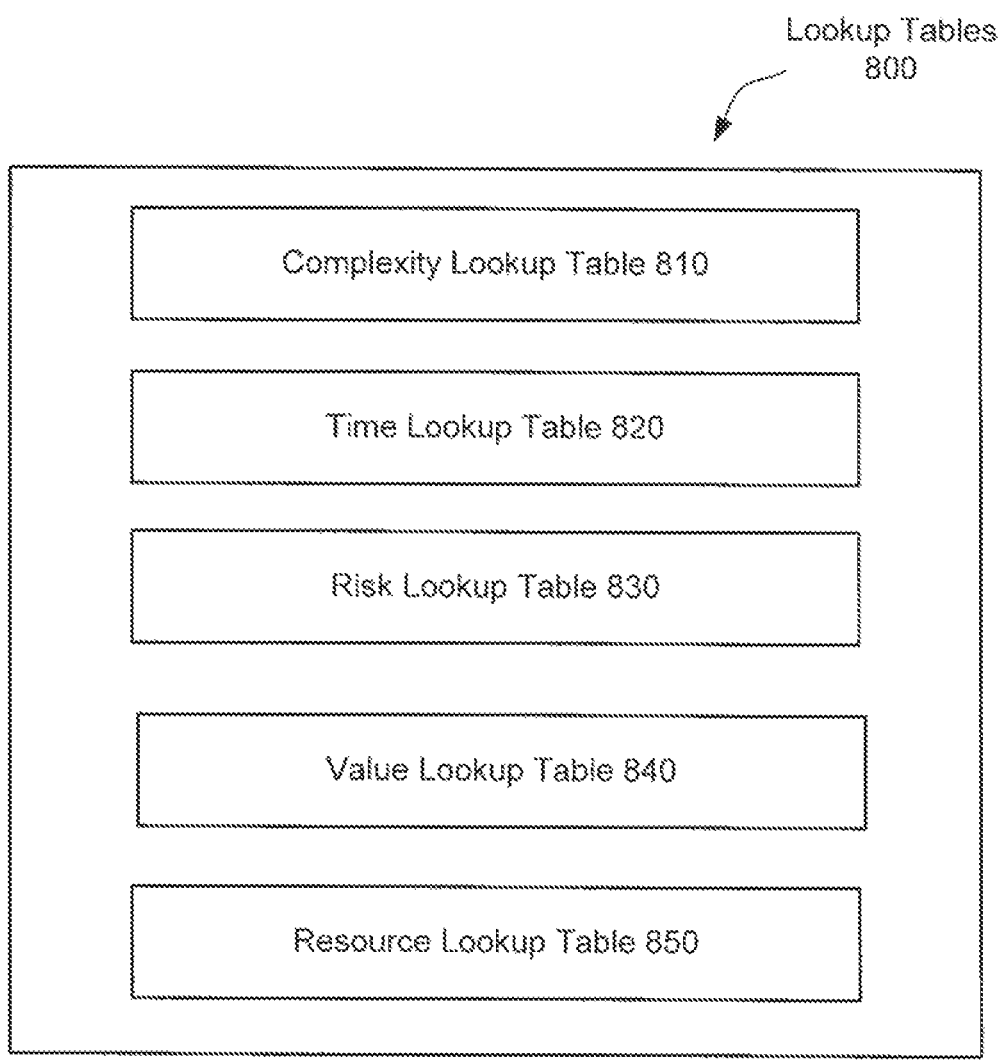
FIG. 8 shows an illustrative set of lookup tables that may be used by a ticket assessment engine, according to some embodiments of the present disclosure.

In the exemplary embodiment shown in FIG. 8, the lookup tables 800 include a complexity lookup table 810, a time lookup table 820, a risk lookup table 830, a value lookup table 840 and a resource lookup table 850.

The complexity lookup table 810 may be used to assign a suitable measure of complexity to a requested locate operation, and may be indexed with a variety of different locate operation attributes. For example, the complexity look up table 810 may map the number of facilities to be located and/or each individual facility type (e.g., gas, cable, electric, water, etc.) to a suitable complexity level (e.g., high, medium or low). As another example, the complexity lookup table 810 may map work site details such as high traffic or restricted access to corresponding complexity reason codes that are recognized by various components within a ticket management system (e.g., the ticket management system 200 shown in FIG. 2).

Similar to the complexity lookup table 810, the time lookup table 820 and the risk lookup table 830 may be used, respectively, to assign an estimated duration and a suitable measure of risk to a requested locate operation. For example, the time look up table 820 may map each individual facility type (e.g., gas, cable, electric, water, etc.) to a duration estimate per unit length or unit area, and the risk lookup table 830 may map each individual facility type to a suitable risk score. Additionally, the time lookup table 820 and the risk lookup table 830 may, respectively, map work site details such as high traffic or restricted access to corresponding scaling factors for increasing or decreasing a duration estimate and a risk score.

The value lookup table 840 may be used to associate a value to a requested locate operation. The value may be simply the expected revenue to be collected for the work performed, or some other suitable measure of value such as net profit (e.g., revenue less cost) or value at risk. In some embodiments, the value lookup table 840 may correlate complexity with value (e.g., mapping high complexity to high value, medium complexity to medium value, and low complexity to low value), where the complexity level is determined at least in part using the complexity lookup table 810. In some further embodiments, the value look up table 840 may map each individual facility type (e.g., gas, cable, electric, water, etc.) to a value estimate, which may be a flat rate or a rate per unit length. In yet some further embodiments, the value lookup table 840 may map ticket types (e.g., emergency, short notice, re-mark, etc.) to corresponding adjustment values for increasing or decreasing a value. For example, extra fees may be collected for an emergency locate operation, while a re-mark operation may not be billed to a customer if the locate service provider is at fault (e.g., the locate service provider did not adequately respond to the locate request ticket during a first visit, which was already billed to the customer).

The resource lookup table 850 may used to determine any equipment requirements and/or technician certification and/or minimum skill level requirements for a requested locate operation. For example, locate technician skill levels may be ranked from 1-10, with 10 being the most skilled. The resource lookup table 850 may map high complexity to skill levels 8-10, medium complexity to skill levels 4-7, low complexity to skill levels 1-3, where the complexity level is determined at least in part using the complexity lookup table 810. As another example, the resource look up table 850 may map each individual facility type (e.g., gas, cable, electric, water, etc.) to one or more technician certifications (e.g., gas-certified, cable-certified, electric-certified, water-certified, etc.). As yet another example, the resource lookup table 850 may map each individual facilities type (e.g., gas) to one or more required or recommended tools or pieces of equipment (e.g., a gas detection tool).

It should be appreciated that the set of lookup tables 800 is provided herein for purposes of illustration only. For example, although lookup tables may provide quick access to data, other types of data structures may also be used to store the information contents described above. Also, a ticket assessment engine may access other types of information contents in addition to, or instead of, those described above. For example, in determining a risk level associated with a requested locate operation, a ticket assessment engine may access historical records of previously completed locate request tickets to determine whether there is a high concentration of past damage reports within the proximity of the currently requested locate operation. A historical record of a previously completed locate request ticket may also store information collected during the corresponding locate and/or marking operation. For example, the record may store an actual duration of the operation and/or actual durations of various tasks that are part of the operation. The record may further indicate whether an accident occurred during subsequent excavation (e.g., whether one or more underground facilities were damaged during excavation).

As another example, a ticket assessment engine may access records pertaining to excavation companies and/or individual excavators. Such records may contain information such as excavation company name and address, individual excavator name and address, excavator type (e.g., pool installer, landscaper, construction company, facility installer, etc), and/or damage history. In some embodiments, a ticket assessment engine may use the excavator type information and the damage history information to assess the level of risk associated with a currently requested location operation. For example, the ticket assessment engine may return a high risk classification for a requested locate operation when a corresponding excavation company and/or individual excavator has a significant history of damaging facilities. The ticket assessment engine may further increase a technician skill level requirement for the requested locate operation, as a way to ensure accurate marking and reduce risk.

VI. Location Assessment

As discussed above, location information provided in a locate request ticket may in some instances be incomplete and/or inaccurate. For example, the address for the work site may be vague or ambiguous (e.g., a street name without any house numbers), or multiple conflicting pieces of location information may be given (e.g., a street address and a pair of lat/long coordinates that do not match). In these situations, additional analysis may be needed to increase the level of confidence that a locate technician is being dispatched to the correct location. For example, additional location information may be extracted from a textual description of the work site that is included in the ticket, and/or from one or more virtual white lines (VWL) images associated with the ticket.

Figure 9:
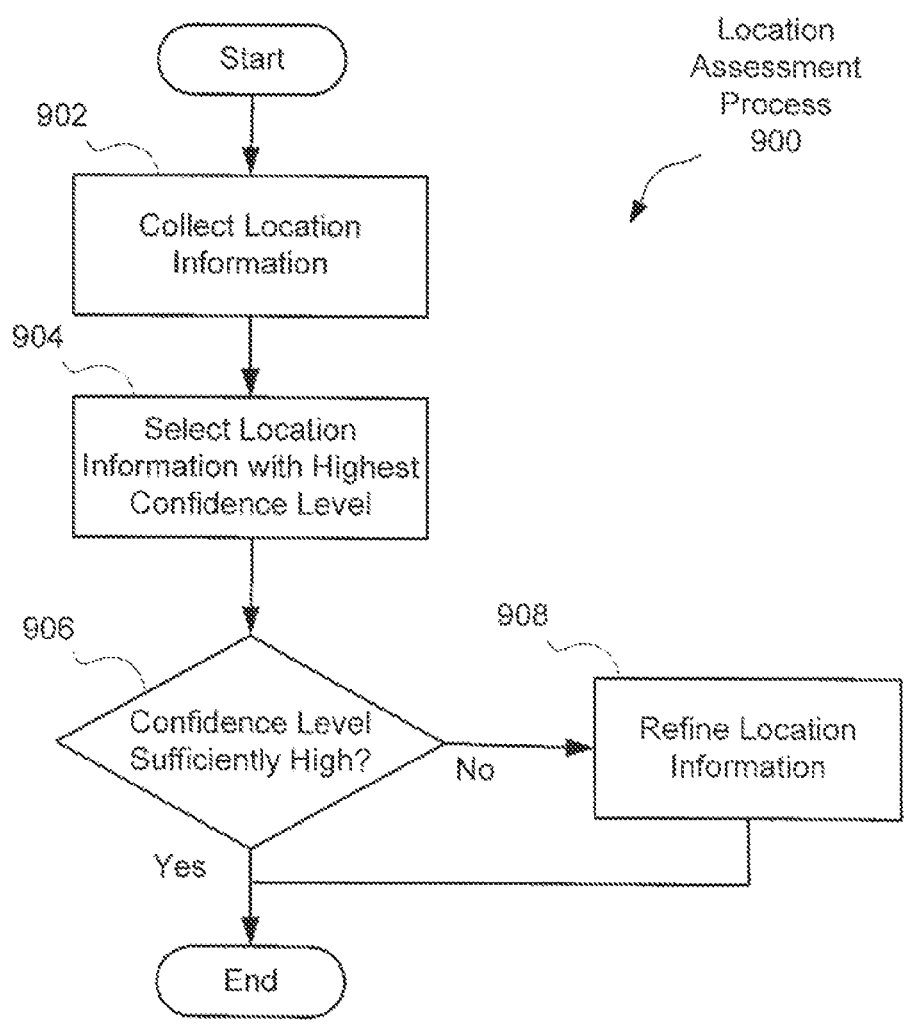
FIG. 9 shows an illustrative process that may be performed by a ticket assessment engine to selecting the best available location information and refine the location information when necessary, according to some embodiments of the present disclosure.

FIG. 9 shows an illustrative process 900 that may be performed by a ticket assessment engine to selecting the best available location information and refine the location information when necessary.

At act 902, the ticket assessment engine may collect one or more pieces of location information from a locate request ticket (e.g., the parsed ticket 215 as shown in FIG. 2). For example, the ticket assessment engine may extract from the ticket a work site address, coordinates for vertices of a polygon generated by the originating one-call center, and/or any VLW images attached to the ticket. In some instances, the ticket may additionally contain portions of free text (e.g., in a "Remarks" field recording an excavator's description of the dig area and/or the reason for excavation). The ticket assessment engine may be programmed to intelligently extract location information from these portions of free text, for example, by searching for relevant phrases such as "next to," "across from," "near," etc. Alternatively, the ticket assessment engine may prompt a human user to read the portions of free text and manually enter any relevant location information.

At act 904, the ticket assessment engine may select a piece of location information from the multiple pieces of location information collected at act 902. This selection may be based on levels of confidence, that is, the ticket assessment engine may select the piece of location information that is deemed the most trustworthy or reliable. In some embodiments, a geotagged VWL image may be considered the most reliable among all types of location information. As such, it may be selected whenever available. If a geotagged VWL image is not available, then a complete address (e.g., with city, street name and house number) may be selected over other pieces of location information, such as a one-call center polygon. If neither a geotagged VWL image nor a complete address is available, then coordinates for the centroid of a one-call center polygon may be computed and reverse-geocoded to obtain an address.

The ticket assessment engine may also perform one or more consistency checks on the collected location information. For example, the ticket assessment engine may reverse-geocode at least some of the available coordinates to determine if the coordinates correspond to a point that falls within the city, county, and/or state indicated on the ticket.

At act 906, the ticket assessment engine may determine whether the location information selected at act 904 has a sufficiently high confidence level. If the determination is positive, then the process 900 ends and the selected location information may be recorded and used throughout the rest of the assessment process carried out by the ticket assessment engine. If the determination is negative, the ticket assessment engine may make a best-effort attempt at refining the location information at act 908.

Figure 10:
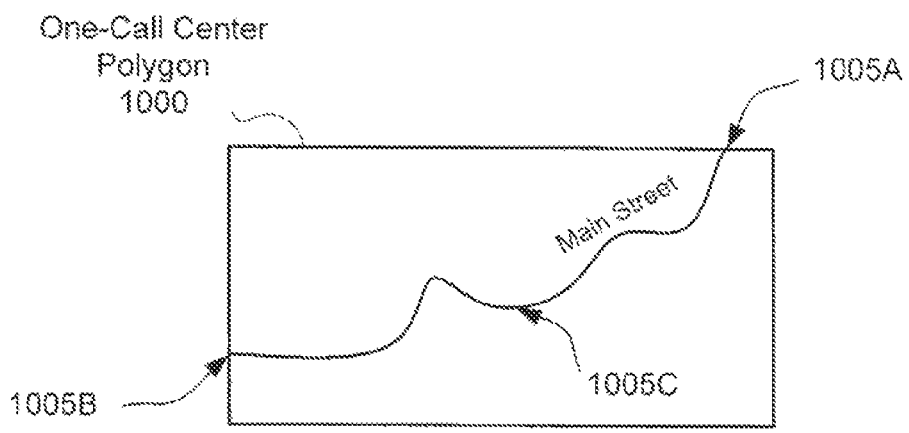
FIG. 10 illustrates an exemplary method for refining location information, according to some embodiments of the present disclosure.

FIG. 10 illustrates an exemplary method for refining location information. In this example, a street name (e.g., "Main Street") is available, but without a house number. A one-call center polygon 1000 is also available. The ticket assessment engine may programmed to determine the coordinates for the points 1005A and 1005B, at which Main Street intersects the one-call center polygon 1000. These coordinates may then be reverse-geocoded to obtain an address range on Main Street that falls within the one-call center polygon 1000. If the address range is sufficiently small, the ticket assessment engine may simply select the address range as the prevailing location information. If, however, the address range is too large, the ticket assessment engine may narrow it down by computing the centroid of the one-call center polygon 1000 and selecting one or more addresses 1005C that are closest to the computed centroid.

It should be appreciated that the various rules and methods described above in connection with FIGS. 9 and 10 are merely illustrative, as other rules and methods may also be used to select, verify and/or refine location information. Also, the ticket assessment engine may invoke the services of a geographic information system (e.g., the GIS 610 shown in FIG. 6) to perform any of the computational tasks described above.

VI. Scope Assessment

In assessing the scope of a locate request ticket, a ticket assessment engine may determine the nature and amount of work to be done in response to the ticket. The result of scope assessment may be used in a number of subsequent assessment processes, such complexity, time, risk, value and/or resource requirements. For example, during scope assessment, the number and types of facilities to be located may be determined or verified, which may in turn be used to determine complexity (e.g., whether a high profile facility type is involved), time (e.g., an estimated duration for each facility type), risk (e.g., whether a high risk facility, such as gas, is involved), value (e.g., an estimated revenue to be collected for each facility type) and/or resource requirements (e.g., certification requirements for each facility type).

In some instances, a one-call center may compile some form of ticket scope information and include the information in a locate request ticket. For example, a one-call center may generate a polygon and determine, based on the polygon, which facility types are to be listed on the ticket. However, such information from one-call centers may not always be accurate, and therefore it may be desirable to independently generate and verify ticket scope information.

Figure 11:
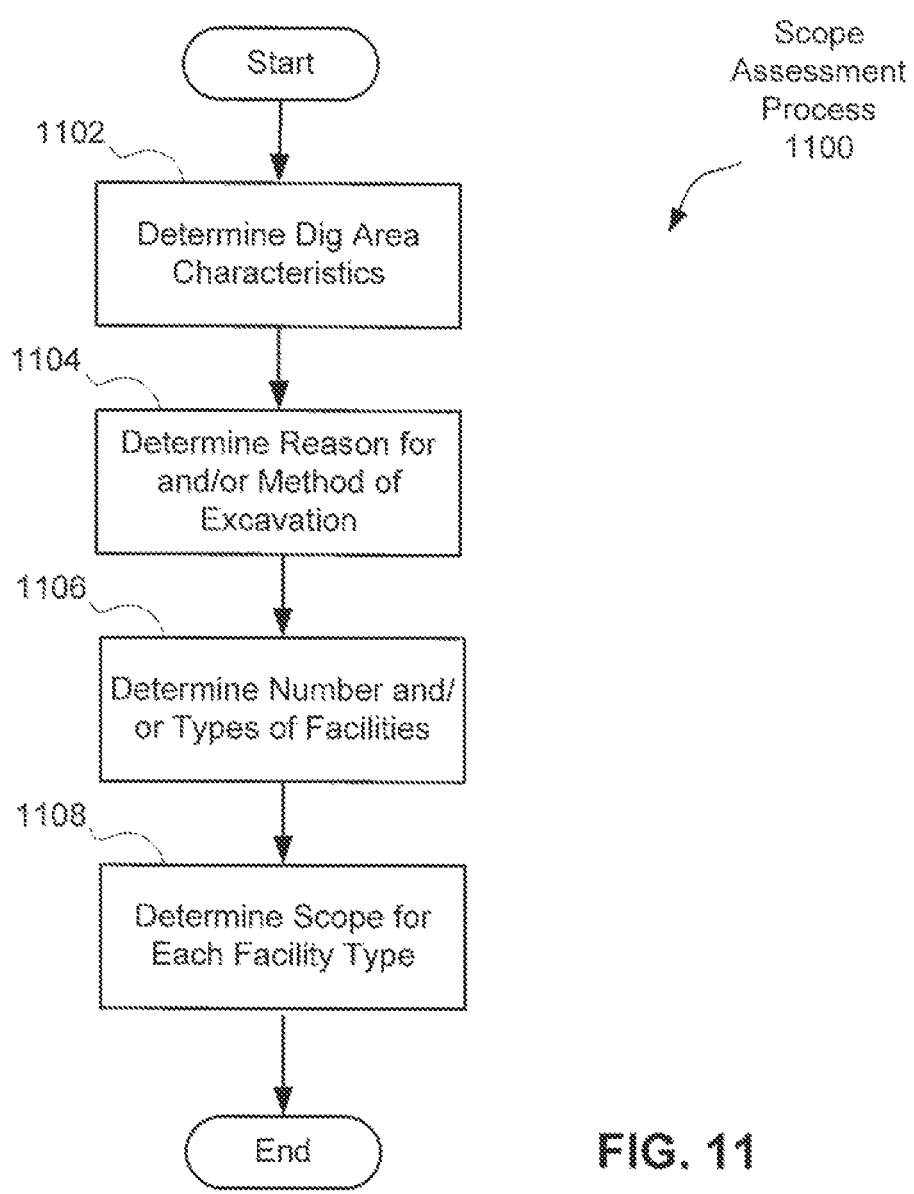
FIG. 11 shows an illustrative process that may be performed by a ticket assessment engine to assess the scope of a locate request ticket, according to some embodiments of the present disclosure.

FIG. 11 shows an illustrative process 1100 that may be performed by a ticket assessment engine to assess the scope of a locate request ticket.

At act 1102, the ticket assessment engine may extract various pieces of information from the ticket to determine at least one characteristic of the planned dig area (e.g., size, shape and/or boundaries). For example, if a geotagged VWL image is available, the ticket assessment engine may determine the dig area boundaries based on the dig area indicators and the geospatial metadata associated with the VWL image. As discussed above, the ticket assessment engine may associate a higher level of confidence to the VWL image, compared to a polygon generated by the one-call center. Therefore, in some embodiments, the VWL image may be used in lieu of the one-call center polygon in determining ticket scope.

The ticket assessment may also use other types of information during act 1102. In some embodiments, the ticket assessment engine may search for scope information in one or more free text portions of the ticket. For example, the ticket assessment engine may be programmed to search for keywords related to landmarks (e.g., sidewalk, playground, etc.) and/or directions (e.g., north, east, south, west, etc.). If one or more keywords are found, the ticket assessment engine may prompt a human user to read the free text and enter any additional scope information.

At act 1104, the ticket assessment engine may determine the reason for and/or method of excavation, which may be used to determine other scope-related parameters such as excavation depth and/or dig area size.

The reason for excavation may sometimes be given explicitly in the ticket. For example, as shown in FIG. 3, the ticket 300 may indicate under the excavation information 306 and the excavator information 310 that a conduit is being installed for a telephone company. In other situations, the reason for excavation may be found in a free text description given by the excavator, and the ticket assessment engine may search for informative keywords or key phrases in the free text description. For example, words such as "pool" and "mailbox" may be commonly used when describing the reason for excavation, and the ticket parsing application may be programmed to recognize these words and extract relevant portions of the free text. In some further situations, the reason for excavation may be inferred based on excavator information. For instance, if the excavator is a plumbing company, the reason for excavation is likely to be installing water and/or sewer lines. On the other hand, if the excavator is a pool contractor, the reason for excavation is likely to be installing a swimming pool.

In some embodiments, the excavation information may indicate a method of excavation, which may be helpful in estimating the extent of the excavation activities. Certain methods of excavation, such as blasting and/or boring, may be more likely to cause accidents compared to other methods. For example, where blasting is planned, it may be desirable to include in the dig area a circular area of a certain radius centered at the planned location of blasting. As another example, where boring is planned, it may be desirable to include in the dig area all areas within a certain distance from the planned locations of boring. The particular radius and/or distance may be selected based on a number of different factors, e.g., government regulations, contractual obligations, insurance requirements, industry best practices, and/or the locate service provider's risk tolerance levels.

At act 1106, the ticket assessment engine may determine or verify the number and types of facilities to be located. Alternatively, the ticket assessment engine may verify the list of one-call center members (or facilities owners) who are notified of the ticket. As discussed above, it may be desirable to independently verify this type of information, even though it may be already provided by the one-call center.

The ticket assessment may use a variety of auxiliary information (e.g., as stored in the auxiliary information storage 250 shown in FIG. 2) in determining or verifying the number and types of facilities to be located. For example, the ticket assessment engine may access one or more facilities maps illustrating installed underground facilities and street-level landmarks. In some instances, the facilities maps may be geotagged, which may enable overlaying a polygon or dig area indicators onto the facilities maps (e.g., as shown in FIG. 7) to determine whether one or more items on the facilities maps fall within the dig area or are sufficiently close to the dig area.

Continuing to act 1108, the ticket assessment engine may determine scope information for each individual facility type determined at act 1106. For example, the ticket assessment engine may compare the dig area boundaries (e.g., as indicated by dig area indicators or a polygon) against a respective facilities map. This may facilitate subsequent time estimation (e.g., different facility types may have different duration estimates per unit length or unit area). It may also facilitate billing after the ticket has been completed (e.g., some facility owners may be billed on a per ticket basis, while other facility owners may be billed per unit of work performed).

Although detailed examples of scope-related analyses are described above in connection with FIG. 11, it should be appreciated that the inventive concepts disclosed herein are not limited to any specific implementations. For example, to the extent that the analyses are independent from each other, they may be performed in any suitable order (e.g., not necessarily in the order presented in FIG. 11). As a more specific example, the determination of excavation reason and/or method at act 1104 may be carried out prior to, or concurrently with, the determination of dig area characteristics at act 1102. Other variations may also be possible.

V. Complexity Assessment

In various embodiments, a ticket may be considered more or less complex for a number of different reasons, such as the number and types of facilities to be located, work site characteristics and/or some other suitable combination of factors. Therefore, complexity assessment may very broadly encompass any types of analysis to categorizes and/or annotate a ticket in such a way that facilitates subsequent handling of the ticket. For example, the outcomes of complexity assessment may be presented in any suitable manner (e.g., using numerical scores and/or user-defined categories), and may inform any other assessment process, such as time, risk, value or resource requirements. Furthermore, complexity assessment may take into account any suitable input information, such as information directly available from a ticket, or information derived based on the ticket and/or other auxiliary information.

Figure 12:
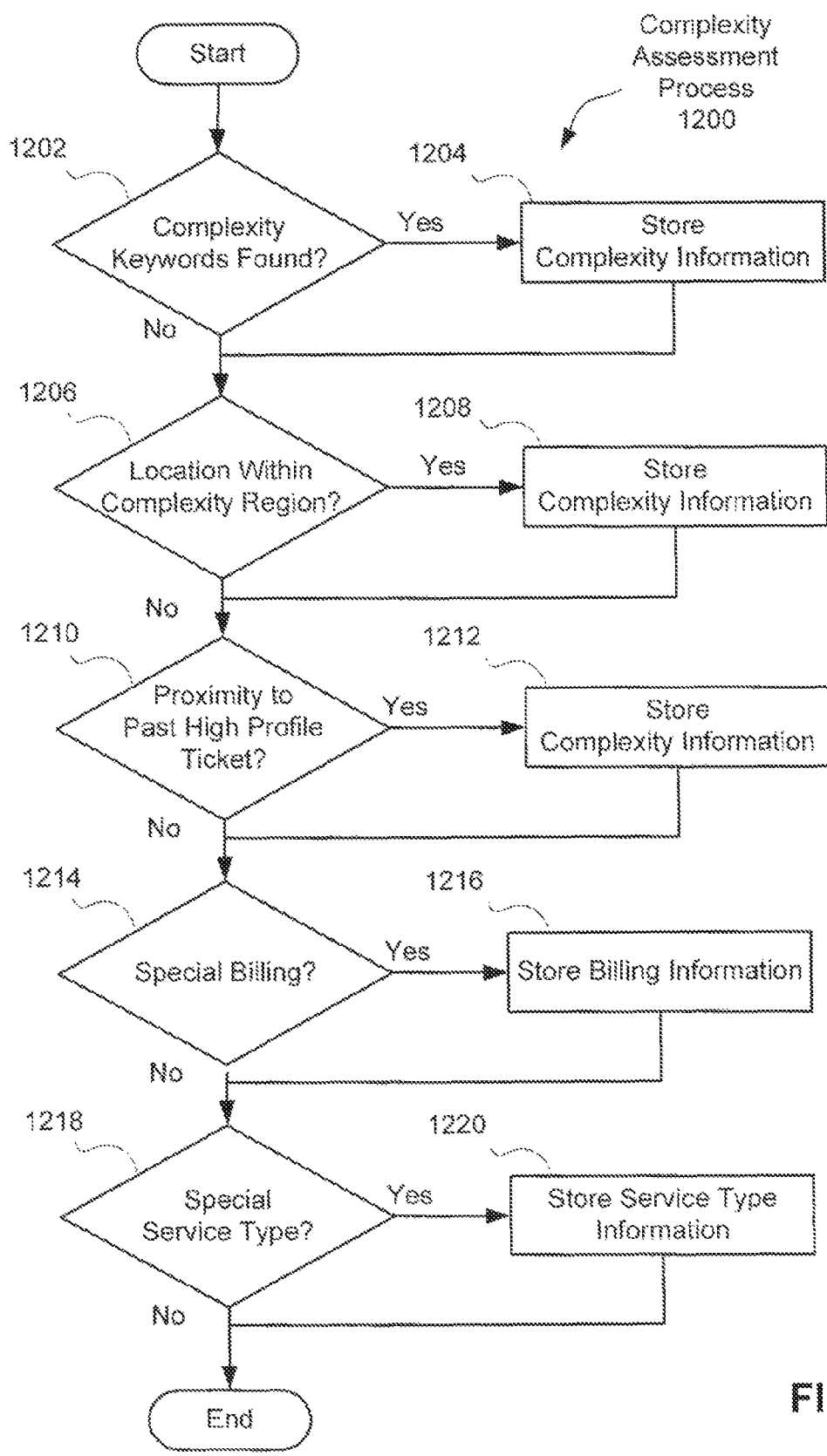
FIG. 12 shows an illustrative process that may be performed by a ticket assessment engine to assess the complexity of a locate request ticket, according to some embodiments of the present disclosure.

FIG. 12 shows an illustrative process 1200 that may be performed by a ticket assessment engine to assess the complexity of a locate request ticket, in accordance with some embodiments.

At act 1202, the ticket assessment engine may perform a keyword search on the ticket to look for any keywords that may trigger a complexity designation. For example, service contracts with some facility owners may include special requirements for the handling of certain types of "high profile" facilities (e.g., gas pipes and/or fiber optic cables), and a locate service provider may receive higher compensation for complying with these special requirements. A locate service provider may also have internal regulations designating certain facilities as being "high profile." This may be done, for example, for risk management purposes. Thus, when the ticket assessment engine detects the presence of one or more high profile facility types (e.g., gas or fiber optic), the ticket may be put into a complexity category of "high profile." Additionally, one or more reason codes and/or descriptions may be given to indicate why the ticket has been categorized under "high profile."

In some embodiments, the designation of "high profile" may also take into account a location of the work site. For example, although telephone and/or electric facilitates may not ordinarily be considered "high profile," one or more sections of these facilities may be designated as such because they serve a special area, such as a hospital or military base. (This may be the case even if the work site itself is outside the special area.) Accordingly, the ticket assessment engine may use the work site location in conjunction with one or more facilities maps to determine whether any facilities to be located serve one or more special areas. If so, the ticket may be put into the "high profile" category along with an appropriate reason code and/or description.

Continuing with FIG. 12, the ticket assessment engine records, at act 1204, the complexity category assigned to the locate request ticket during act 1202, along with any reason codes and/or descriptions. This recording may be done in any suitable manner that allows the assigned complexity category to be later accessed using some information associated with the ticket. For example, the ticket assessment engine may store the assigned category in a database entry that can be indexed using a ticket serial number. Alternatively, the ticket assessment engine may insert the assigned complexity category into a work order created for the ticket (e.g., work orders 235A-C shown in FIG. 2).

At act 1206, the ticket assessment may determine whether the work site falls within some complexity region. For example, the ticket assessment engine may access a data storage (e.g., the auxiliary information storage 250) to obtain a set of polygons representing, respectively, a set of predetermined complexity regions. Each of the polygons may be specified by the set of coordinates for its vertices, and may be associated with a complexity category indicating why the region has been designated as a complexity region. A more detailed description of the complexity category may also be provided.

The ticket assessment engine may then geocode an address of the work site and determine whether the resulting coordinates fall within any of the complexity regions represented by the polygons. If the coordinates do fall within at least one complexity region, the ticket assessment engine may proceed to act 1208 to store the corresponding complexity category and/or complexity category description.

It should be appreciated that the polygons representing complexity regions may be generated in a number of different ways, as the present disclosure is not limited in this respect. For example, a geographical information system (e.g., the GIS 610 shown in FIG. 6) may be used to analyze one or more facilities maps, either alone or in combination, to identify any geographical area with a high concentration of underground facilities. As another example, some commercially available digital map data may contain information delimiting various geographical regions of interest, such as highways, railroad tracks, parks, hospitals, military bases, schools, gated communities, zoning parcels, etc. A geographical information system may be used to automatically assign complexity categories to some of these regions. The corresponding delimitation information may then be extracted from the digital map data and used to compute polygons.

Additionally, a geographical information system may be adapted to allow a human user to manually define a complexity region. For example, a supervisory personnel may, based on local knowledge, designate a certain geographic area as a complexity region and provide an appropriate description (e.g., the area may be known to have defective tracer wires along a certain type of facility, which may increase the difficulty in locating that type of facility). The geographic information system may present a graphic user interface to allow the supervisory personnel to electronically mark the boundaries of the complexity region.

Returning to FIG. 12, the ticket assessment engine may determine at act 1210 whether the work site is in the proximity of a past ticket categorized as "high profile." For example, the ticket assessment engine may search a database of past tickets to determine whether the work site is within a given radius (e.g. 100 yards) of a past ticket with a "high profile" designation. If so, the ticket assessment engine may assign the complexity category "high profile potential" to the current ticket and record a reason code "historical high profile" at act 1212.

At act 1214, the ticket assessment engine may determine whether the locate request ticket is subject to special billing rules. For example, the ticket assessment engine may determine whether the ticket has a linear scope of 0.5 miles or greater (e.g., as determined during the scope assessment process 1100), or whether the work site is at a remote location that requires extended travel. Additionally, the ticket assessment engine may search one or more text fields (e.g., locate instructions, remarks and/or excavation type description) for keywords that might be relevant for billing. Then the ticket assessment engine may consult one or more billing tables to determine whether any special billing rules apply to the current ticket. For example, at act 1216, the ticket assessment engine may set a hourly status indicator to "true," indicating that the ticket should be billed per unit of work performed, rather than at a flat rate.

It should be appreciated that the billing tables used by the ticket assessment engine may contain information that is specific to a particular geographic area. For example, different facility owners serving different geographical areas may be billed at different rates using different methods. Therefore, multiple billing tables may be prepared and selected for use based on the geographic areas in which the locate service provider is operating.

Proceeding to act 1218, the ticket assessment engine may determine a service type (e.g., "emergency," "short notice," "re-mark," "re-stake," or "re-note") by performing a keyword search. The search may taken into account common abbreviations such as "shrt" for "short." If a relevant keyword is found, the ticket assessment engine may record the corresponding service type at act 1220. This information may be used, for example, during the scheduling and dispatch process to determine a due date or deadline for the ticket. It may also be used in determining an appropriate fee to be billed to a customer.

As discussed in connection with FIG. 2, some of the above-described functionalities relating to complexity assessment may be expressed via a set of business rules (e.g., one or more of business rules 240 shown in FIG. 2). An exemplary set of complexity assessment business rules is summarized in Table 2 below (BR-001 through BR-005) and described in greater detail in Tables 3-7.

VI. Time Assessment

As discussed above, various time-related aspects of a locate request ticket may be assessed, such as a due date of the ticket, an estimated duration of the requested locate operation and/or an expiration date of locate marks.

In some embodiments, the time at which a locate request ticket is generated (e.g., when an excavator notifies a one-call center regarding planned excavation activities) may be used to estimate one or more deadlines. For example, depending on a service type associated with the ticket (e.g., emergency, short notice, re-mark, etc.), a locate service provider may have more or less time to respond to the ticket. As a more specific examples, the locate service provider may be required (e.g., by government regulations and/or locate contract provisions) to respond to an emergency ticket within a short window of time (e.g., two to four hours after the ticket is generated), whereas normal tickets may be completed within a longer window of time (e.g., 48 or 72 hours after the ticket is generated).

The time of ticket generation may also be used to determine when the locate marks placed by a technician at the work site will expire. For instance, in some jurisdictions, an excavator may be required by law or regulation to request a "re-mark" operation if the planned excavation activities are not completed within a certain period of time (e.g., on the order of days, such as seven or 14 days) after the original ticket is generated. In response to such a request, a new (but related) work order may be created to dispatch a locate technician to the work site to repeat the locate operation and/or refresh the locate marks previously placed (e.g., by spraying more paint on the ground at previously marked locations). If the planned excavation activities are not completed within a longer period of time (e.g., on the order of weeks, such as three or four weeks), the ticket itself may be said to have expired, and the excavator may be required by law or regulation to initiate a new locate request ticket.

In some further embodiments, the duration of a locate request ticket (i.e., the amount of time worked by a locate technician to complete the requested locate operation) may be estimated using statistical information collected from previously complete locate request tickets. For example, a ticket assessment engine may access a historical average and/or standard deviation for tickets of a certain type (e.g., tickets having a certain combination of features). This information may then be used to establish an adjustment and/or scaling factor to be applied to future tickets of the same type (e.g., having the same combination of features).

Figure 13:
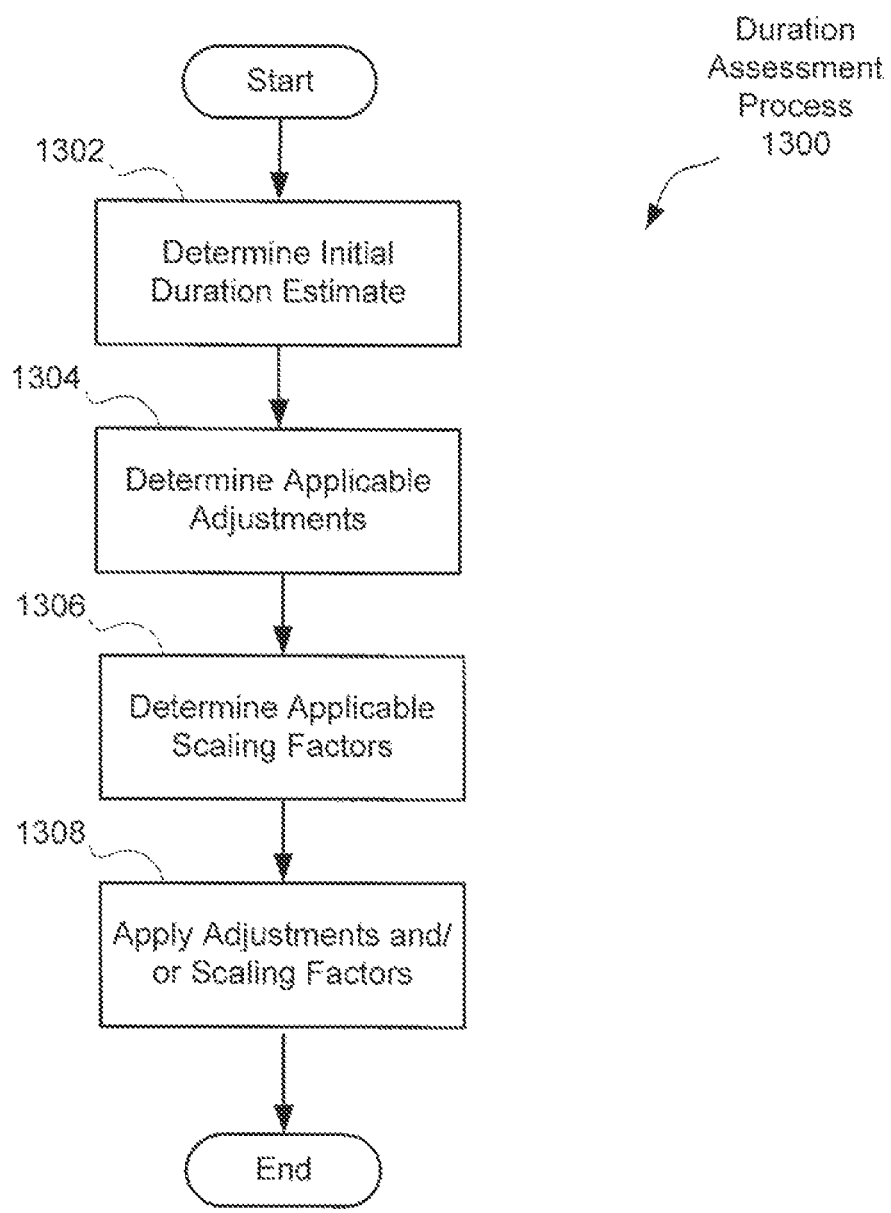
FIG. 13 shows an illustrative process that may be performed by a ticket assessment engine to estimate the duration of a locate request ticket, according to some embodiments of the present disclosure.

FIG. 13 shows an illustrative process 1300 that may be performed by a ticket assessment engine to estimate the duration of a locate request ticket, in accordance with some embodiments.

At act 1302, the ticket assessment engine may establish an initial duration estimate, for example, based on the total number of facilities to be located (e.g., as determined or verified during the scope assessment process 1100). More specifically, if the ticket is an N-locate ticket (i.e., there are N different types of facilities to be located), the ticket assessment engine may obtain the historical average duration for all previously complete N-locate tickets. Alternatively, the ticket assessment engine may obtain the standard deviation in addition to the average, and determine a duration estimate such that, with high probability, at least a desired percentage (e.g., 95 percents) of all N-locate tickets will have a duration not exceeding the duration estimate. Such an estimate may be computed using any known techniques, such as Chebychev's inequality.

In addition to the number of facilities types to be located, other ticket characteristics may also be used to determine a subset of previously completed tickets based on which a historical average duration is computed. For example, a historical average duration may be computed for all previously completed tickets located within a certain geographical area (e.g., as specified by a geofence). As another example, a historical average duration may be computed for all previously completed tickets having one or more common types of facilities (e.g., gas, cable, water, electric, etc.). As yet another example, a historical average duration may be computed for all previously completed tickets having a suitable combination of ticket characteristics, such as all tickets completed within the past three months in a specified city or neighborhood.

At act 1304, the ticket assessment engine may, based on a number of different factors, determine on or more adjustments to be applied to the initial duration estimate established at act 1302. For example, an adjustment may be assigned to each facility type based on observed averages. More specifically, if an N-locate ticket having a first facility type (e.g., gas) is on average 4 minutes longer than an N-locate ticket not having the first facility type, then an adjustment of 4 minutes may be assigned to the facility type "Gas." On the other hand, if an N-locate ticket having a second facility type (e.g., sewer) is on average 3 minutes shorter than an N-locate ticket not having the second facility type, then an adjustment of −3 minutes may be assigned to the facility type "Sewer."

As another example, an adjustment may be determined based on complexity region type (e.g., as determined at during act 1206 shown in FIG. 12). More specifically, it may have been observed that an average ticket having a complexity region type "Gated" (e.g., the work site is within a gated community requiring some form of access approval, such as an access code) is 15 minutes longer than an overall average. Then an adjustment of 15 minutes may be assigned to all tickets having a complexity region type "Gated." Alternatively, an appropriate adjustment may be chosen to guarantee that, with high probability, all tickets with complexity region type "Gated" will have a duration not exceeding the average duration plus the adjustment. Such an adjustment may be chosen using any known techniques using standard deviation information.

Similarly, adjustments may be determined for other complexity region types, such as military base (e.g., 35 minutes, due to strict verification procedures for access permits) and/or regions with aerial power lines (e.g., −10 minutes, because aerial power lines may be located without special equipment).

At act 1306, various scaling factors may be established for the duration estimate. For example, if a ticket is determined to be high profile with a certain reason code (e.g., as in act 1202 shown in FIG. 12), the reason code may be used to index an appropriate scaling factor. In some embodiments, the scaling factor may be 1.15 for a high profile ticket with no reason code given, 1.38 for the reason code "Fiber Optic," and 1.23 for reason code "HCPhone" (or high capacity phone line).

A similar, but not necessarily identical, set of scaling factors may be chosen for tickets with high profile potential under reason code historical high profile (e.g., as determined in act 1210 shown in FIG. 12). For example, the scaling factors for no reason code, reason code "Fiber Optic" and reason code "HCPhone" may be, respectively, 1.08, 1.3 and 1.18.

Other complexity designations may also be used to establish scaling factors. For example, if a ticket's hourly status indicator is set to "true" (e.g., as in act 1214 shown in FIG. 12), the corresponding duration estimate may be scaled based on an estimated size of the dig area (e.g., in length or in area). More specifically, the scaling factor may be obtained by dividing the length of the dig area by a base value (e.g., 0.5 miles), or by dividing the area of the dig area by a base value (e.g. 10000 square feet). Similarly, the service type of a ticket (e.g., as determined in act 1218 shown in FIG. 12) may be used to look up a corresponding scaling factor, such as 1.23 for emergency and 1.82 for short notice. On the other hand, a scaling factor of less than 1 (e.g., 0.9, 0.8, or 0.6) may be used for a re-mark or re-note operation, assuming the same technician who performed the previous operation is dispatched to perform the re-mark or re-note, in which case the technician may be more efficient during the subsequent visit because he is already familiar with the work site.

It should be appreciated that all of the scaling factors may be determined based on average and/or standard deviation information using techniques similar to those described above for establishing adjustments. Other techniques may also be possible, such as manual optimizations.

Proceeding to act 1308, any adjustments determined at act 1304 and scaling factors determined at act 1306 may be applied in a suitable manner to the initial duration estimate determined at act 1302. For example, all adjustments may be applied (e.g., added to the duration estimate), and then all scaling factors may be applied (e.g., multiplied with the duration estimate). Other methods may also be possible, such as breaking down the duration estimate into different components (e.g., one for each facility type) and applying appropriate adjustments and/or scaling factors to the individual components, in addition to, or instead of applying adjustments and/or scaling factors to the overall duration estimate.

Although time assessment is performed on the basis of a locate request ticket in the above described example, it should be appreciated that the present disclosure is not so limited. Rather, time assessment may be performed with respect to any suitable unit of work, which may be larger or smaller than a locate operation corresponding to a locate request ticket. For instance, in various embodiments, time assessment may be performed with respect to a collection of related locate operations, or with respect to one or more tasks within a single locate operation. Examples of tasks include, but are not limited to, traveling to a work site, reviewing a ticket in preparation for the corresponding locate operation, reviewing a relevant map, equipment preparation, locating one or more facilities, marking one or more facilities, preparing documentation (e.g., electronically or on paper) upon completion of a ticket, and/or preparing for departure from work site. Where appropriate, each of these tasks may be further broken down into subtasks, for example, based on facility type.

As with complexity assessment, some or all of the above-described functionalities relating to time assessment may be expressed via a set of business rules (e.g., one or more of business rules 240 shown in FIG. 2). An exemplary set of time assessment business rules is summarized in Table 2 below (BR-006 through BR-012) and described in greater detail in Tables 8-14.

VII. Risk Assessment

In various embodiments, risk assessment may include estimating the extent of potential damages (e.g., economic losses, property and/or environmental damages, personal injuries, etc.) in the event of an accident during subsequent excavation. Additionally, or alternatively, risk assessment may include estimating a likelihood that an accident would occur given a set of circumstances (e.g., as described in a locate request ticket and/or inferred therefrom).

Risk assessment may be of interest to different entities associated with locate and/or marking operations. For instance, a locate service provider may wish to assess a level of potential liability for damages in an accident where the locate service provider is at fault (e.g., failing to complete a locate operation by a required deadline or inadequately performing a location operation). On the other hand, a facilities owner may wish to assess the extent of potential damage (e.g., the number of customers who may experience service interruption and/or costs for repairing damaged facilities). If the scope of potential damages is sufficiently large, the facilities owner may decide to dispatch an in-house locate technician to perform a locate operation, instead of contracting the operation to a locate service provider. As another example, the facilities owner may determine that more stringent safety procedures may be appropriate where personal injuries are likely (e.g., where a work site is located in a populous area, such as near a school or a shopping mall), and therefore may also decide to dispatch its own team of locate technicians for a better quality guarantee.

In some embodiments, the risk associated with a locate request ticket may be represented as a numerical score (e.g., a number between 1 and 100) or a broad category (e.g., high, medium or low). As discussed in greater detail below, the score or category may be determined based on historical data, such as the frequency and extent of damage among a certain class of previously completed tickets. This risk measure may be used to flag some of the incoming tickets for special consideration and/or handling. For example, it may be required that a high risk ticket be handled only by a technician with a high level of skill. Alternatively, or additionally, a high risk ticket may require supervisory review after completion, to check for any errors that may have been made by the technician performing the requested locate operations. In this manner, risk assessment may reduce the likelihood of accidents, and may thereby improve the profitability of the locate service provider's operations.

Figure 14:
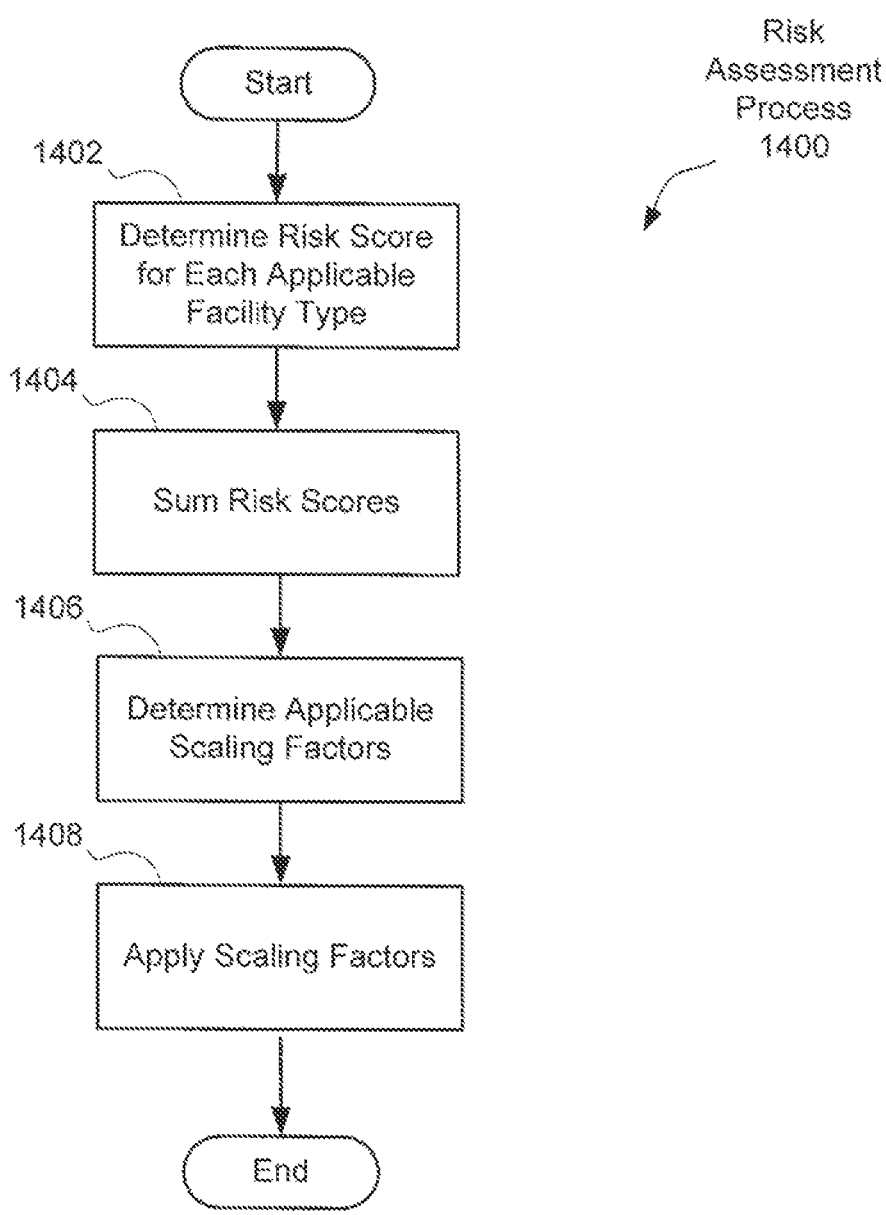
FIG. 14 shows an illustrative process that may be performed by a ticket assessment engine to compute a risk measurement associated with a locate request ticket, according to some embodiments of the present disclosure.

FIG. 14 shows an illustrative process 1400 that may be performed by a ticket assessment engine to compute a risk measurement (e.g., a numerical score or category) associated with a locate request ticket, in accordance with some embodiments.

At act 1402, a risk score may be established for each facility type to be located. For example, gas, electric and water may be assigned a risk score of 2.5, 0.7 and 0.2 respectively. These scores may be determined based on a number of different factors, such as the frequency of damages related to a facility type (e.g., the percentage of gas locates that resulted in damage reports) and the extent of damages related to a facility type (e.g., the average monetary value of claims resulting from damages to gas pipes). Finer distinctions may also be made, such as assigning different risk scores based on attributes of facilities of the same type. For example, damages to water mains may result in very high claim amounts (e.g., streets may collapse due to a ruptured water main), while damages to water lines leading a customer's premise may be minor and easy to repair. As another example, the diameters of gas pipes may be taken into account, where thicker pipes may be associated with lower gas pressure and may be more at risk for explosions.

At act 1404, the various risk scores determined at act 1402 may be summed to obtain an overall risk score for the ticket. Then, at act 1406, one or more appropriate scaling factors may be determined for adjusting the overall risk score. For example, the ticket assessment engine may access a database of past damage reports to determine whether the work site and/or dig area for the current ticket is within a given radius (e.g., 500 yards) of one or more past damage reports and, if so, computes the total amount of claims from all of the damage reports within this radius. This total amount may in turn be used to lookup an appropriate scaling factor for the risk score, for example, as shown in Table 16 below.

In addition to damage reports, scaling factors may, in some embodiments, be determined based on proximity to one or more mis-locates. A mis-locate is said to have occurred when an error in connection with a locate and/or marking operation is discovered (e.g., during subsequent excavation), although the error may not have manifested itself as an accident. In some further embodiments, proximity to one or more past trouble tickets may also be used in determining a scaling factor. Trouble tickets may include any previously completed tickets whose records indicate one or more operational irregularities. For example, a past ticket may be designated as a trouble ticket if the technician dispatched to the work site had difficulty locating a certain type of facilities and had to call his supervisor for special instructions.

As another example, the ticket assessment engine may determine whether the excavator who submitted the excavation notice corresponding to the current ticket has a significant history of damages. This history can be measured in a number of different ways. For example, an average damage amount (e.g., in dollar value) per excavation (or locate operation) may be computed for at least some of the excavators for whom historical information is available. The average may be computed over a certain time frame (e.g., the past six months, or one, two, three, five or ten year). The average across different excavators may also be computed.

Then the ticket assessment engine may compare a particular excavator's average damage amount against the average across all excavators, for example, by expressing the former as a percentage of the latter. This percentage may be used to look up a corresponding scaling factor for the overall risk score of the ticket (e.g., as shown in Table 17 below).

Alternatively, or additionally, a damage count (e.g., the number of damage reports irrespective of the dollar amount for each report) may be obtained for each excavator and compared against an average damage count across different excavators, for example, over a certain time frame (e.g., the past six months, or one, two, three, five or ten year). Again, a particular excavator's damage count may be expressed as a percentage of the average damage count, and the percentage may be used to look up an appropriate scaling factor (e.g., as shown in Table 17 below).

Complexity designations such as high profile may also be used to determine one or more appropriate scaling factors for the overall risk score. For example, if a ticket is determined to be high profile with a certain reason code (e.g., as in act 1202 shown in FIG. 12), the reason code may be used to index an appropriate scaling factor. In some embodiments, the scaling factor may be 1.8 for a high profile ticket with no reason code given, 4.0 for the reason code "Fiber Optic," and 2.5 for reason code "HCPhone" (e.g., as shown in Table 18 below).

As another example, if a ticket's hourly status indicator is set to "true" (e.g., as in act 1214 shown in FIG. 12), the corresponding risk estimate may be scaled based on an estimated size of the dig area (e.g., in length or in area). In the embodiment described in Table 20 below, the scaling factor may be obtained by dividing the length of the dig area by a base value (e.g., 0.5 miles), or by dividing the area of the dig area by a base value (e.g. 10000 square feet). Similarly, the service type of a ticket (e.g., as determined in act 1218 shown in FIG. 12) may be used to look up a corresponding scaling factor, such as 2.85 for emergency, 3.46 for 2-hour short notice, and 3.11 for 3-hour short notice (e.g., as shown in Table 19 below).

VIII. Value Assessment

As discussed above, value assessment may be performed according to different measures of value. For instance, value assessment may be performed from the perspective of a locate service provider based on business value created by performing a locate operation. In some embodiments, such business value may simply be the revenue collected for performing the locate operation. Alternatively, or additionally, a measure of net profit may be used, where various operating costs may be subtracted from the revenue.

In some embodiments, a measure of profit may take into account information from one or more contracts established between a locate service provider and a facilities owner (or some other entity contracting with the locate service provider to perform locate operations). Examples of contractual information include, but are not limited to, contractual provisions specifying bonuses and/or penalties for certain tickets. For instance, a locate contract may provide that a penalty (e.g., a suitable percentage of the contract price for performing a locate and/or marking operation) be assessed if the locate service provider fails to meet a deadline specified in a locate request ticket. Accordingly, the value associated with the ticket may be a function of time that has a sharp decline at the specified deadline. As an other example, the locate contract may further provide that a penalty be assessed for each billing period during which the locate service provider fails to timely respond to an excessive number of tickets. Any suitable mechanism may be used to define when a penalty should be assessed, such as a percentage threshold (e.g., more than 5%, 10% or 15% of tickets being completed late). The penalty may also be assessed in any suitable manner, for example, in the form of a fixed percentage (e.g., 1%, 2%, 3% or 5%) applied to all tickets, or with step increases (e.g., penalizing more heavily when a higher percentage of tickets are completed late). Accordingly, the value associated with the current ticket may depend not only on the time at which the requested operation is performed, but also on the number of tickets that have been completed late in the same billing period. For example, if the percentage of tickets that have been completed late in the same billing period is approaching 5%, the decline in value at the ticket deadline may include not only the penalty for missing the deadline of the individual ticket, but also the penalty for missing the deadlines of 5% of the tickets in that billing period.

In some further embodiments, value assessment may be performed from the perspective of an entity other than the locate service provider, such as a facilities owner, an excavator, a one-call center, a community (e.g., city, town, village, and/or other form of municipality) and/or an insurance company. One or more of these entities may perform value assessments based on their interests and concerns. For instance, a facilities owner may measure value in terms of value at risk (e.g., potential costs for repairing damages to facilities and/or restoring services in the event of an accident). Likewise, a community may use a value-at-risk measure, but the potential damages may be different (e.g., repairing property damage and/or environmental cleanup).

Additionally, value need not be restricted to monetary value. It may be any custom defined value, or even a time-varying function. For example, as discussed above, the value estimate may be provided to a scheduling and dispatch application (e.g., the scheduling and dispatch application 260 shown in FIG. 2), which may use the value estimate to prioritize activities. Thus, the value estimate may be used as a means to encourage a desired scheduling behavior. For example, if a ticket falls within a certain geographic area known to have heavy traffic during certain times of day, the value estimate may be defined as a function that has lower value during the periods of heavy traffic and higher values elsewhere. This may encourage the scheduling and dispatch application to avoid dispatching the ticket during the periods of heavy traffic.

Similarly, the ticket assessment engine may access an up-to-date source of weather information and define the value estimate as a time-varying function according to the weather forecast for the work site. For instance, the value estimate function may be defined in such a way that the scheduling and dispatch application is encouraged to avoid dispatching a technician to the work site in weather conditions that may hinder the locating and marking of underground facilities (e.g., rain or snow).

Figure 15:
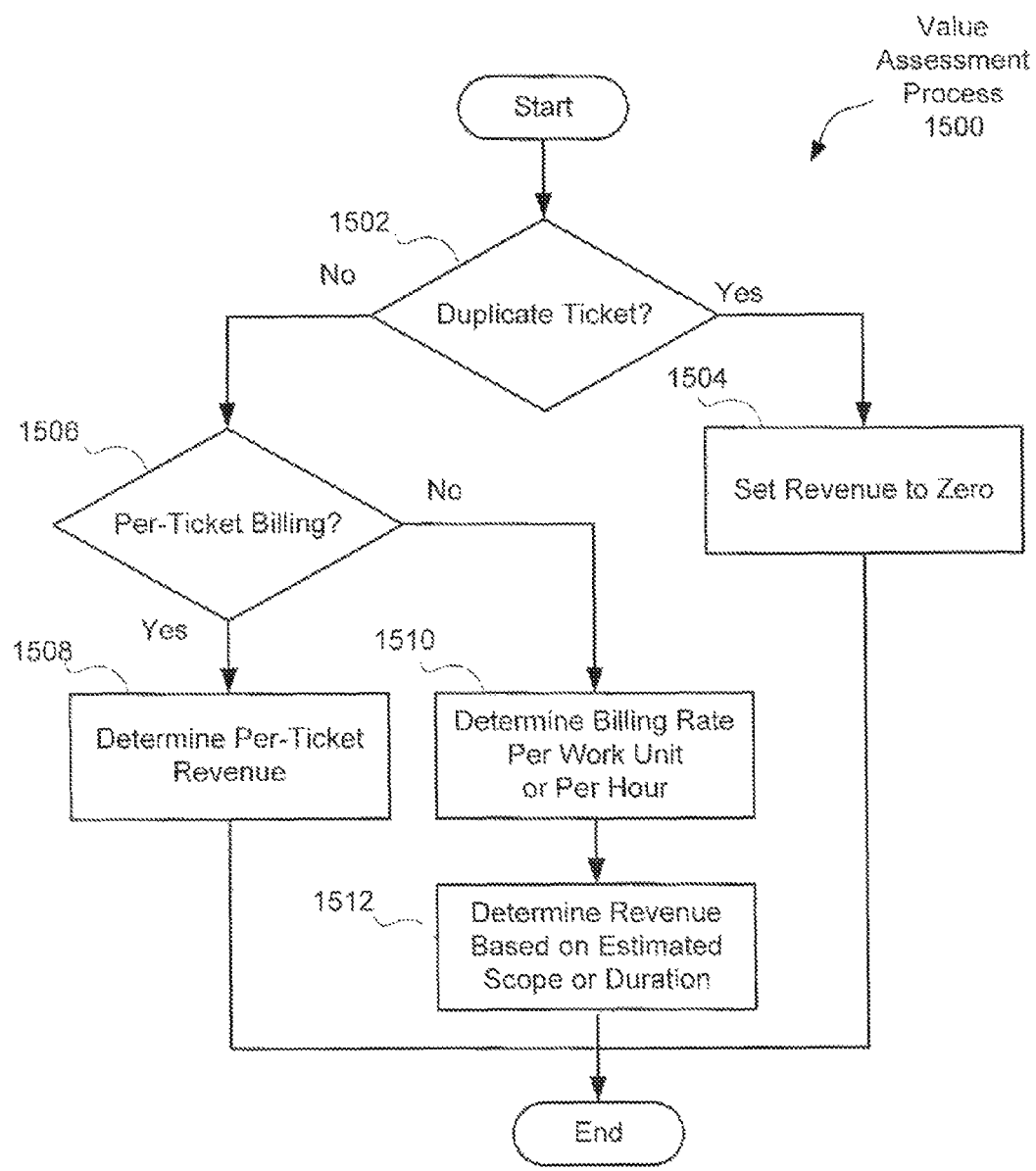
FIG. 15 shows an illustrative process that may be performed by a ticket assessment engine to compute an estimated value for a locate request ticket, according to some embodiments of the present disclosure.

FIG. 15 shows an illustrative process 1500 that may be performed by a ticket assessment engine to compute an estimated value (e.g., expected revenue) for a locate request ticket.

At act 1502, the ticket assessment engine may determine if the ticket is a duplicate ticket, such as a re-mark, re-stake or re-note ticket. Under some service contracts, such tickets may not be billed if the re-mark, re-stake or re-note is necessitated due to some action, or lack of action, by the locate service provider. Additionally, some service contracts may specify that two tickets transmitted on the same day are duplicate tickets if the corresponding work sites are sufficiently close to each other, and that only one of the duplicate tickets may be billed.

If the ticket is determined to be a duplicate ticket, then the ticket assessment engine sets the revenue to zero at act 1504. Otherwise, the ticket assessment engine may determined the applicable billing method at act 1506, for example, whether the ticket should be billed at a flat rate, per unit of work performed, or per hour worked.

If the ticket is to be billed at a flat rate, the ticket assessment engine may proceed to act 1508 and consult a billing rate table to select an appropriate flat rate, for example, based on the type of facility located and/or the identity of the facility owner. Otherwise, the ticket assessment engine may proceed to act 1510 and determine an appropriate billing rate, which may be either per unit of work performed (e.g., unit length of facility marked, unit area of dig area located, or some other custom-defined unit of work) or per hour worked. Then the ticket assessment engine may proceed to act 1512 to obtain an estimated scope of the ticket (e.g., as determined during the process 1100 shown in FIG. 11) or an estimated duration of the ticket (e.g., as determined during the process 1300 shown in FIG. 13). Based on the rate information and the scope or time information, the ticket assessment engine may compute an estimated revenue amount for the ticket.

It should be appreciated that the process 1500 may alternatively be performed on a per facility type basis. That is, a revenue estimate may be determined for each facility type to be located using a process similar to the process 1500. Then the separate revenue estimates may be summed to obtain a total estimate for the ticket.

Figure 17:
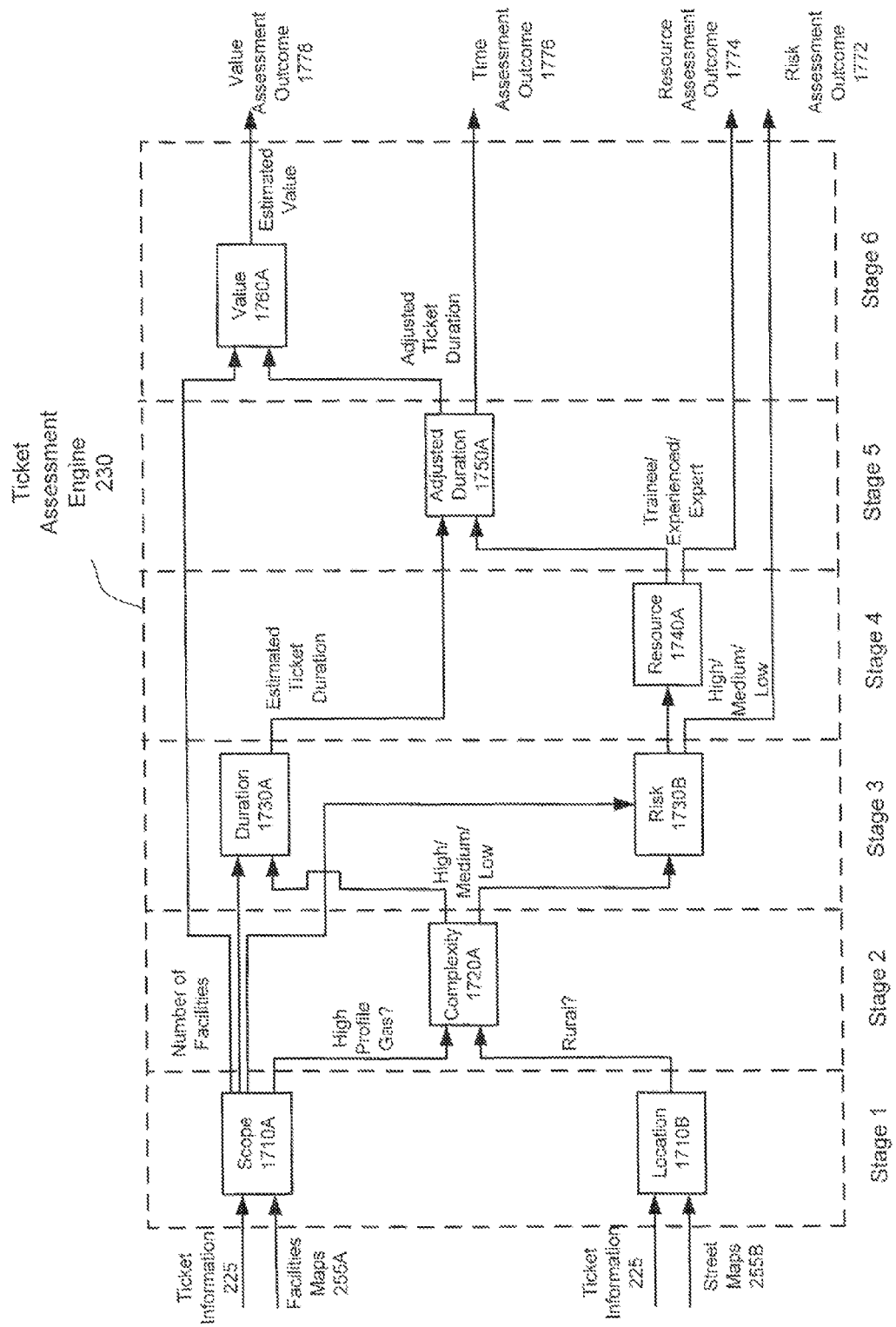
FIG. 17 shows an illustrative example of a multi-stage ticket assessment engine having a network of assessment modules.

Furthermore, value assessment may take into account one or more other assessment outcomes in addition to, or instead of, estimated scope or duration. For example, as illustrated in FIG. 17 and discussed in greater detail below, value assessment may, directly or indirectly, be informed by assessment outcomes relating to location, complexity, risk, and resource.

As with other types of assessment, some of the above-described functionalities relating to value assessment may be expressed via a set of business rules (e.g., one or more of business rules 240 shown in FIG. 2). An exemplary set of value assessment business rules is summarized in Table 2 below (BR-019 through BR-022) and described in greater detail in Tables 20-23.

IX. Resource Assessment

As discussed above, resource assessment may include identifying one or more resources (e.g., equipment and/or personnel) needed and/or recommended to adequately perform a requested locate operation. For instance, ticket information, auxiliary information and/or outcomes from other types of assessment (e.g., scope and/or complexity) may be analyzed to determine whether any resource requirements and/or recommendations exist for the requested locate operation.

Figure 16A:
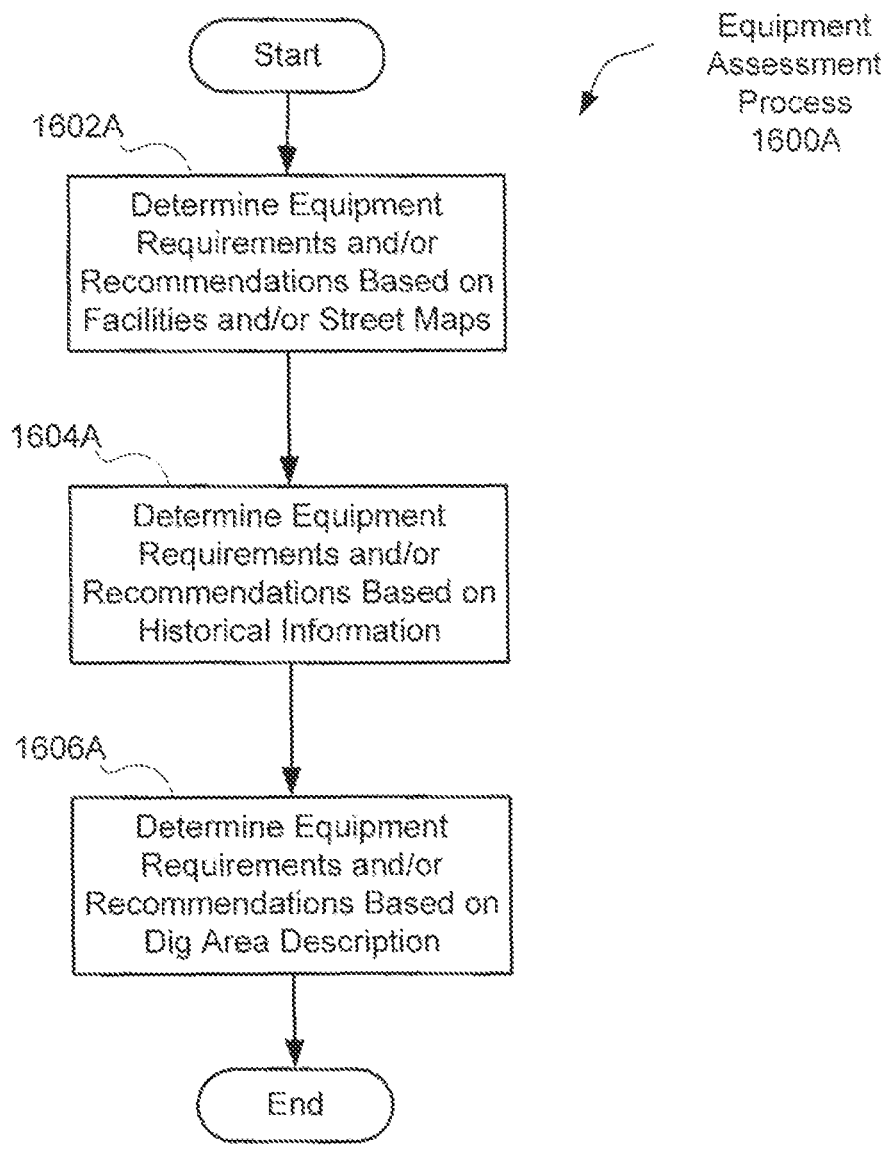
FIG. 16A shows an illustrative process that may be performed by a ticket assessment engine to identify one or more required and/or recommended pieces of equipment for performing a requested locate operation, according to some embodiments of the present disclosure.

FIG. 16A shows an illustrative process 1600A that may be performed by a ticket assessment engine to identify one or more pieces of equipment that may be required and/or recommended for a locate operation but may not be available to a locate technician under ordinary circumstances (e.g., not included in a standard set of equipment carried by a locate technician).

At act 1602A, one or more maps may be retrieved based on a work site location that is obtained either from the ticket information or as an outcome of location assessment. The retrieved maps may be analyzed to identify any equipment that may be useful in performing the requested locate operation. For example, a facilities map may be retrieved and analyzed to determine whether one or more manholes are located at or near the work site and/or whether a locate technician would need to connect a locate transmitter to a connection point in a manhole.

If it is determined that the locate technician likely needs to remove one or more manhole covers during the course of the locate operation, a "sissy hook" (or "sissy bar"), or a similar device for facilitating manhole recover removal, may be recommended. In some situations, such safety devices may be required by a worker's safety organization such as the Occupational Safety and Health Administration (OSHA). An insurance company may also require the use of certain safety devices as a precondition to payment of damage or injury claims. Furthermore, if it is determined that a locate technician would need to connect a locate transmitter to a connection point in the manhole, a hot stick may be recommended, which could be used to secure the connection between the locate transmitter and the connection point without the locate technician physically entering the manhole.

As a further example, it may be determined, at act 1602A, based on work site location and one or more facilities maps, that the technician likely needs to open a telephone box on a pedestal, in which case the technician may be recommended to bring a pedestal wrench, or a similar tool, for facilitating the opening of a telephone box.

In addition to facilities maps, one or more street maps may also be retrieved and analyzed at act 1602A. For instance, it may be determined based on the work site location and one or more street maps that the work site is in an urban setting, in which case a less persistent marking material (e.g., washable paint) may be recommended so as to reduce the impact of the locate marks on the aesthetic appearance of the work site. On the other hand, if it is determined that the work site is in a high traffic area (e.g., on or near a highway), a more persistent marking material (e.g., oil-based paint) may be recommended so as to reduce the likelihood of the locate marks wearing off prior to excavation.

Continuing with FIG. 16A, the ticket assessment engine may, at act 1604A, retrieve and analyze historical information (e.g., one or more records of previously completed locate and/or marking operations). For example, it may be determined based on work site location and historical information that the work site likely has bad tracer wires, in which case a more advanced locate transmitter and/or receiver may be needed to obtain sufficient signal strength (e.g., locate transmitter and/or receiver with different frequency ranges). Alternatively, or additionally, a different type of locate device may be recommended, such as a sonar or ground penetrating radar device (e.g., the "Inspector 07" locator marketed by Subsurface Instruments, Inc.), which may be used to locate underground facilities without being hooked up to tracer wires.

As another example, it may be determined, at act 1604A, based on work site location and historical information, that the work site is likely to have such dry ground as to prevent adequate ground connection, in which case the technician may be recommended to bring a bottle of water to wet the ground before attempting to make a ground connection.

Continuing to act 1606A, the ticket assessment engine may examine a dig area description (e.g., as provided in a free text portion of the locate request ticket) to identify any special circumstances that may require addition equipment. For instance, the dig area description may indicate that the work site is within a construction zone, in which case the locate technician may be required to wear a hard hat while on site.

Although specific examples of equipment-related analyses are illustrated in FIG. 16A and described above, it should be appreciated that the inventive concepts disclosed herein are not limited to any specific implementations. For instance, the need to remove manhole covers may be inferred based on information other than facilities maps. As one example, if the work site is located in an urban or densely populated area, it is likely that the locate technician would encounter at least one manhole. As another example, an image of the work site (e.g., a VWL image based on an aerial image of the work site) may be consulted to determine whether one or more manholes are present. As yet another example, the need to remove manhole covers may be explicitly indicated in a free text portion of the locate request ticket (e.g., in a locate instructions section). Furthermore, one or more contracts established between a locate service provider and a facilities owner (or some other entity contracting with the locate service provider to perform locate operations) may specify particular tools/equipment requirements for some types of locate operations, in which case the ticket assessment engine would consult auxiliary information such as contract information and any particular contractual obligations therein relating to tool and/or equipment requirements.

Additionally, the ticket assessment engine may recommend or require certain equipment without analyzing any auxiliary information. For instance, a locate technician may be required or recommended to review one or more facilities maps upon arrival at a work site to familiarize himself with the layout of underground facilities at the work site (e.g., general directions of various facilities lines, locations of connection points, etc.) and to plan his work accordingly. Therefore, the ticket assessment engine may identify one or more relevant facilities maps (e.g., based on the work site location) as being recommended or required for the locate operation.

In some further embodiments, resource assessment may identify a personnel skill level or certification required and/or recommended to perform a locate operation. For example, in some jurisdictions, only a technician with gas certification may be dispatched to perform a locate operation involving gas pipes. In another example, one or more assessment outcomes (e.g., scope, location, complexity, time and/or risk) may be used to determine a minimum skill level requirement for the locate operation. As a more specific example, a ticket may be assigned a high complexity level due to complex layout of underground facilities at or near the work site, in which case it may be desirable to dispatch a technician with knowledge and/or familiarity of the geographical area encompassing the work site.

In some embodiments, personnel skill level may include both long term measurements (e.g., years of experience and/or cumulative training) and short term measurements (e.g., recent performance evaluations). Furthermore, statistics may be collected regarding each technician's performance patterns. For instance, a technician may consistent perform at a higher level during certain hours of day (e.g., in the morning or in the afternoon), and may be assigned different skill levels depending on the time of day of dispatch.

Figure 16B:
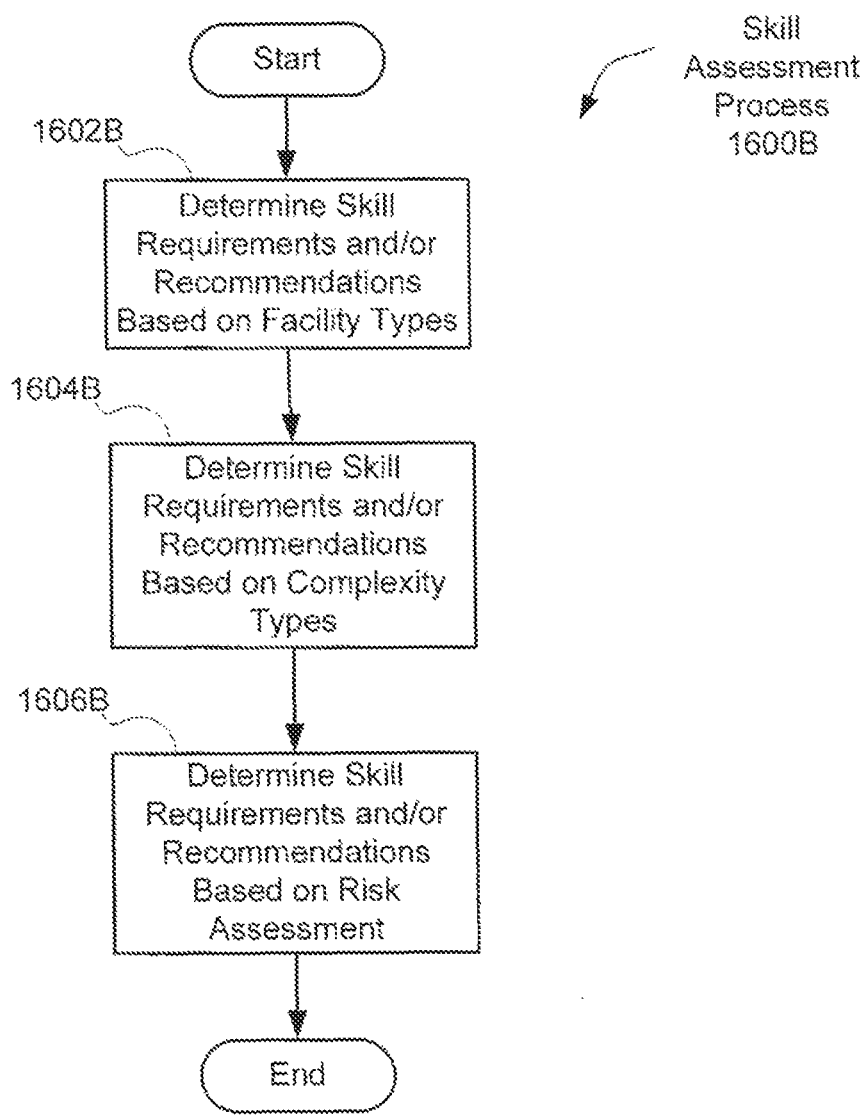
FIG. 16B shows an illustrative process that may be performed by a ticket assessment engine to identify one or more requirements and/or recommendations for selecting a suitable technician to perform a requested locate operation, according to some embodiments of the present disclosure.

FIG. 16B shows an illustrative process 1600B that may be performed by a ticket assessment engine to identify one or more requirements and/or recommendations for selecting a suitable technician to perform a requested locate operation. As discussed above, skill requirements and/or recommendations may refer broadly to any suitable attributes of a technician, including experience level, past performance level (e.g., both long term and short term), certifications, and/or security clearance.

At act 1602B, the ticket assessment engine may determine skill requirements based on the types of facilities to be located. For example, a contract with a facility owner (e.g., gas) may require that only technicians with the appropriate certification (e.g., gas certification) be dispatched to locate facilities owned by that facility owner. This may be done by consulting a lookup table that maps facility types to skill requirements (e.g., the lookup table 850 shown in FIG. 8).

At act 1604B, the ticket assessment engine may determine whether the ticket is associated with any complexity types (e.g., as determined during the process 1200 shown in FIG. 12). If so, the ticket assessment engine may look up any skill requirements associated with the identified complexity types. For example, a complexity reason code "Military Base" may indicate that only technicians with certain levels of security clearance may gain access to the work site. As another example, for a high profile ticket (e.g., by reason of high profile facilities types and/or proximity to historical damages), a high level of experience and/or good performance may be recommended.

At act 1606B, the ticket assessment engine may obtain a risk score for the ticket (e.g., as determined during the process 1400 shown in FIG. 14) and look up any applicable skill requirements. For example, a technician with a high level of experience and/or good performance may be recommended and/or required for a high risk ticket.

Although detailed examples of resource assessment are described above in connection with FIGS. 16A-B, it should be appreciated that the inventive concepts disclosed herein are not limited to any specific implementations. For example, to the extent that the resource-related analyses are independent from each other, they may be performed in any suitable order (e.g., not necessarily in the orders presented in FIGS. 16A-B).

As with other types of assessment, some of the above-described functionalities relating to skill requirements assessment may be expressed via a set of business rules (e.g., one or more of business rules 240 shown in FIG. 2). An exemplary skill requirements assessment business rule is described in Table 26 below.

X. Detailed Example of Ticket Assessment

FIG. 17 shows an illustrative example of a ticket assessment process executed by a multi-stage ticket assessment engine (e.g., the ticket assessment engine 230 shown in FIGS. 2 and 2A), having a network of assessment modules or subprocesses. The assessment modules may be arranged in multiple stages (e.g., six stages), where an assessment module at each stage may receive as input one or more intermediate outcomes of assessment from one or more previous stages. For instance, in the embodiment shown in FIG. 17, a first stage may include a scope assessment module 1710A and a location assessment module 1710B, a second stage may include a complexity assessment module 1820A, a third stage may include a duration assessment module 1730A and a risk assessment module 1730B, a fourth stage may include a resource assessment module 1740A, a fifth stage may include an adjusted duration assessment module 1750A, and a sixth stage may include a value assessment module 1760A.

In the example shown in FIG. 17, the ticket assessment process may receive as initial input a locate request ticket (e.g., the ticket 300 shown in FIG. 3) as part of ticket information 225. Various information elements may be extracted from the input ticket (e.g., using a ticket parsing process such as the one shown in FIG. 5 and described above) and provided to various assessment modules. For example, scope-related information such as polygon and/or dig area indicator coordinates and/or member codes identifying one or more notified facilities owners may be extracted and provided to the scope assessment module 1710A. Additionally, one or more relevant facilities maps 255A may be accessed (e.g., from the auxiliary information storage 250 shown in FIG. 2) and provided to the scope assessment module 1710A. Based on these pieces of information, the scope assessment module 1710A may output the number of facilities to be located pursuant to the input ticket, as well as an indication of whether the facilities to be located include one or more high profile gas facilities.

As a more specific example, with reference to FIG. 3, the member codes shown at 314 (e.g., "FP=W&SA," "KD=TWNSND WRTR," "KC=PECO PLMG," and "XZ=COMCAST CABLE B") may indicate a total of four facilities types to be located (e.g., sewer, water, gas, and cable). The scope assessment module 1710A may further determine that a high profile gas facilities type is present (e.g., as indicated by the member code "KC=PECO PLMG").

As another example, location-related information such as work site address and/or GPS coordinates may be extracted from the input ticket and provided to the location assessment module 1710B. Additionally, one or more relevant street maps 255B may be accessed (e.g., from the auxiliary information storage 250 shown in FIG. 2) and provided to the location assessment module 1710B, which may analyze the street maps 255B to determine whether the work site is likely to be in a rural area (e.g., as distinguished from an urban or suburban area). The outcome of that determination may be output by the location assessment module 1710B.

As a more specific example, with reference to FIG. 3, the work site address shown at 304A (e.g., "100 St. Francis Ln" in "Bensalem Twp") may be extracted from the ticket 300 and provided to the locate assessment module 1710B, which may determine that the work site is not located in a rural area.

Proceeding to the second stage of assessment, one or more outputs of the first stage, such as the indication of whether one or more high profile gas facilities are to be located and the indication of whether the work site is located in a rural area, may be provided to the complexity assessment module 1720A, which may analyze those intermediate assessment outcomes and assign a complexity category to the input ticket. For example, the complexity assessment module 1720A may implement the following decision table.

TABLE 1A

| | | Location | |
|---|---|---|---|
| | Complexity | Rural | Not Rural |
| Scope | High Profile Gas | Medium | High |
| | Not High Profile Gas | Low | Medium |

As a more specific example, the scope assessment module 1710A may determine that the input ticket does request that one or more high profile gas facilities be located, and the location assessment module 1710B may determine that the work site is not located in a rural area. As a result, the complexity assessment module 1720A may assign a complexity level of "High" to the input ticket.

Proceeding to the third stage of assessment, one or more outputs of the first and second stages, such as the number of facilities to be located and the complexity category, may be provided to the duration assessment module 1730A, which may analyze those intermediate assessment outcomes and output an estimated duration for completing the input ticket. For example, the duration assessment module 1730A may assume that a certain amount of time (e.g., 10 minutes) may be needed to locate each type of facilities, and that the total duration may be scaled according to the complexity category (e.g., scaling factors of 1, 1.2 and 1.5 may be applied, respectively, to the complexity categories low, medium and high).

As a more specific example, the scope assessment module 1710A may determine that the input ticket requests a total of four facilities to be located. Because the complexity assessment module 1720A has assigned a complexity level of "High" to the input ticket. the duration assessment module 1730A may compute an estimated duration for the input ticket as follows:

4 facilities types*10 minutes per facilityes type*scaling factor 1.5=60 minutes.

Additionally, the number of facilities to be located and the complexity category may be provided to the risk assessment module 1730B, which may analyze those intermediate assessment outcomes and assign a risk category to the input ticket. For example, the risk assessment module 1730B may implement the following decision table.

TABLE 1B

| | | Number of Facilities | | | | |
|---|---|---|---|---|---|---|
| Risk | | 1 | 2 | 3 | 4 | 5 |
| Complexity | High | Medium | Medium | High | High | High |
| | Medium | Low | Low | Medium | Medium | High |
| | Low | Low | Low | Low | Medium | Medium |

In this example, because the scope assessment module 1710A has determined that the input ticket requests a total of four facilities to be located, and the complexity assessment module 1720A has assigned a complexity level of "High" to the input ticket, the risk assessment module 1730B may assign a risk level of "High" to the input ticket. This outcome may be output by the overall assessment process as a final outcome, Risk Assessment Outcome 1772, which may be used by other ticket manage system components, such as the scheduling and dispatch application 260 shown in FIG. 2.

The output of the risk assessment module 1730B may also be an intermediate outcome consumed by an assessment module at a subsequent stage, such as the resource assessment module 1740A at the fourth stage, which may determine an appropriate technician skill level according to the risk category assigned to the input ticket. For instance, the resource assessment module 1740A may determine that a high risk ticket may require a technician skill level of "expert," a medium risk ticket may require a technician skill level of "experienced" or higher, and a low risk ticket may be dispatched to any technician, including those at a "trainee" level. In this example, because the risk assessment module 1730B has assigned a risk level of "High" to the input ticket, the resource assessment module 1740A may determine that an expert technician may be required. As for the risk assessment outcome, the resource assessment outcome may be output as a final outcome, Resource Assessment Outcome 1774, for use by other ticket manage system components.

Proceeding to the fifth stage of assessment, one or more outputs of the previous stages, such as the estimated duration and the technician skill requirement, may be provided to the adjusted duration assessment module 1750A, which may adjust the estimated duration based on technician skill level. For example, the adjusted duration assessment module 1750A may apply scaling factors of 1, 1.1 and 1.3, respectively, to tickets with technician skill levels of expert, experienced and trainee. As another example, the adjusted duration assessment module 1750A may apply one or more scaling factors to the estimated duration based on a resource assessment outcome relating to required or recommended equipment. For instance, the estimated duration may be adjusted upward if a piece of additional or more advanced equipment (e.g., an "Innspector 07" locator) is required or recommended.

In the example illustrated in FIG. 17, because the duration assessment module 1730A has output 60 minutes as the estimated duration, and the resource assessment module 1740A has determined that an expert technician may be required, the adjusted duration assessment module 1750A may compute an adjusted duration for the input ticket as follows:

60 minutes*scaling factor 1=60 minutes.

As for risk and resource, the adjusted duration may be output as a final outcome, Time Assessment Outcome 1776, for use by other ticket manage system components.

Proceeding to the sixth stage of assessment, one or more outputs of the previous stages, such as the number of facilities to be located and the adjusted duration, may be provided to the value assessment module 1760A, which may analyze those pieces of information and estimate the amount of profit to be gained by completing the input ticket. For example, the value assessment module 1760A may access contractual information from one or more databases to determine an amount of revenue that the locate service provider can expect to collect for completing the input ticket. The value assessment module 1760A may also access employee and/or company information from one or more databases to determine an estimated cost for completing the ticket, which may include technician compensation, materials costs and/or overhead costs. As a more specific example, the value assessment module 1760A may determine that the expected revenue rate is $10 per type of facilities located and the expected cost is $0.5 per minute worked.

In this example, because the scope assessment module 1710A has determined that a total of four facilities types are to be located and the adjusted duration assessment module 1730A has output 60 minutes as the adjusted duration, the value assessment module 1760A may compute the estimated profit as follows:

4 facilities types*$10 per facilities type−60 minutes*$0.5 per minute=$10.

As for risk, resource and adjusted duration, the estimated profit may be output as a final outcome, Value Assessment Outcome 1778, for use by other ticket manage system components.

Although various implementation details are shown in FIG. 17 and described above, it should be appreciated that such details are provided merely for purposes of illustration, and that the present disclosure is not limited to these specific examples. For example, various assessment modules need not be arranged in linearly ordered stages. Rather, the network of assessment modules can have any suitable configuration (e.g., including one or more loops). Additionally, the businesses rules implemented by the assessment modules of FIG. 17 are provided solely for purposes of illustration, as other business rules may also be suitable (e.g., the business rules shown in Tables 2-26 below).

XI. Example of Work Order

Figure 18B:
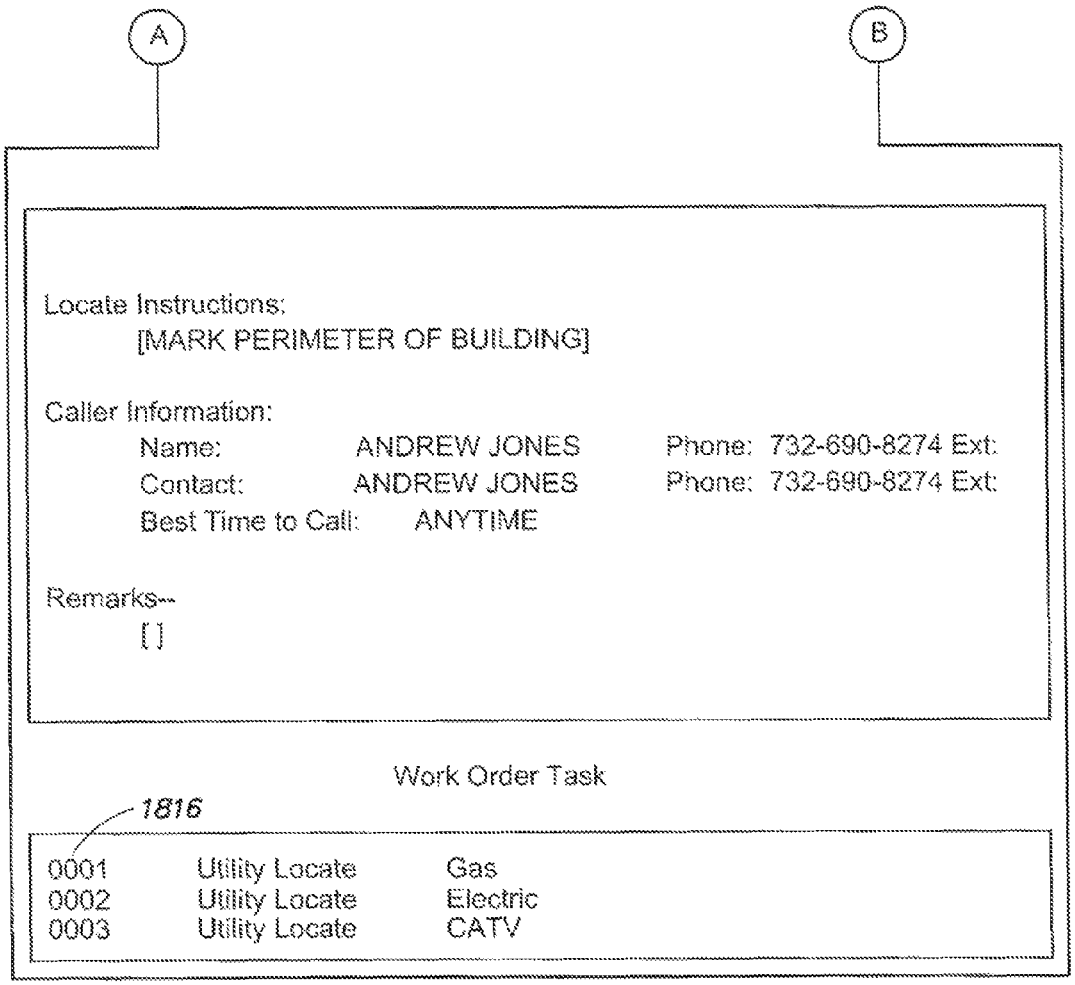

FIG. 18 shows an example of a work order 1800 that may be created from an incoming locate request ticket (e.g., the ticket 300 shown in FIG. 3). As shown, the work order 1800 may include a plurality of information elements extracted from the ticket 300, such as ticket number 1802, address of work site 1804, excavation information 1806, due date information 1808, excavator information 1810, etc. These information elements may be presented in the work order 1800 in a different format compared to the ticket 300. The work order 1800 may also include additional information elements, such as a work order number 1812 different from the ticket number (e.g., multiple different work orders may be created based on the same ticket), an expected duration 1814 (e.g., as determined during the process 1300 shown in FIG. 13) and work order task information 1816 listing the facility types to be located within this work order.

The work order 1800 may be forwarded by the ticket assessment engine to other software applications for further processing. For example, the scheduling and dispatch application 260 (as shown in FIG. 2) may schedule the work order to commence at a certain date and time (e.g., Jan. 4, 2009 at 9:00 AM, as shown in FIG. 18).

XII. Backend and On-Going Assessments

As discussed above, a feedback mechanism (e.g., the backend assessment module 290 shown in FIG. 2) may be provided in accordance with some embodiments to review completed tickets and perform various information updates. For example, the various processes carried out by the ticket assessment engine 230 may rely on historical information, such as statistical information regarding previously completed tickets. For improved performance and reliability, it may be desirable to update the historical and/or statistical information on an on-going basis, as more completed tickets are accumulated over time.

Accordingly, in some embodiments, the backend assessment module 290 may be programmed to make adjustments to the assessment business rules 240 shown in FIG. 2. For example, any historical averages used in the assessment business rules 240 may be updated on a regular basis. As a more specific example, an illustrative business rule BR-007 is shown in Table 9 below, which is based on historical average durations of locate operations. As shown in Table 9, the duration of a 3-locate ticket for which sewer is one of the facility types to be located may be, on average, three minutes shorter than that of a 3-locate ticket without a sewer locate. Such an adjustment in duration may be adjusted regularly (e.g., daily, weekly, monthly, annually, etc.), or according to any other suitable schedule, based on data collected from recently completed locate operations.

It should be appreciated that the analysis of a previously completed locate operation may be informed by an outcome of the excavation activities that took place subsequent to the locate operation. In one illustrative scenario, it may be observed that the duration of the locate operation was two minutes shorter than average. However, it may be further observed that an accident occurred during subsequent excavation and a probable cause of the accident was misplacement of locate marks. In that case, the duration of the locate operation may be considered an anomaly and may not be used to adjust the historical average duration used for assessing future tickets.

In addition to making adjustments to existing business rules, new rules may be added as new patterns are observed from newly accumulated information. For example, a pattern may emerge that locate operations within 2 miles of central Manhattan, N.Y. are, on average, four minutes longer than locate operations conducted elsewhere. Accordingly, a new rule may be defined to adjust the estimated duration upward by four minutes for all locate request tickets within 2 miles of central Manhattan, N.Y. Alternatively, a new complexity type may be created (e.g., "high density urban") and all locate operations within 2 miles of central Manhattan, N.Y. may be assigned the new complexity type. New business rules may then be defined to adjust the estimated duration upward for all locate operations having the new complexity type.

Additionally, the facilities maps available from one-call centers and/or facility owners may not always contain sufficient and accurate information. For example, for some historic urban neighborhoods, the only available facilities maps may have been created many years ago and may not contain absolute location information such as lat/long coordinates. Some of the street-level landmarks shown on the maps may have been moved or no longer exist. In such a situation, it may be difficult to determine the exact location of some of the facilities shown on the maps.

Thus, in accordance with some embodiments of the present disclosure, the GIS 610 shown in FIG. 6 may be used as part of a system for continually improving the quality of available facilities maps. For example, the GIS 610 may be used to digitize existing maps printed on paper or cloth and augment the digitized maps with geospatial metadata.

In some instances, the geospatial metadata added to facilities maps may be generated at least partially based on previously completed locate request tickets. For example, the backend assessment module 290 shown in FIG. 2 may be adapted to recognize some geographic areas as areas with insufficient information and may forward to the GIS 610 the results of completed location operations in those areas, which may include technician logs and/or geotagged images with technician annotations indicating marked facilities. Using this information, the GIS 610 may be able to derive accurate location information for the marked facilities and augment the facilities maps accordingly with some appropriate geospatial metadata.

As another example, the backend assessment module 290 may be programmed to discover inconsistencies between existing facilities maps and the actual result of a completed locate operation, and to notify the GIS 610 of the discovered inconsistencies. Alternatively, the GIS 610 may be adapted to receive from a human user an indication that there is an error on an existing facilities map. In either situation, the GIS 610 may respond by verifying the report of inconsistency and correcting the facilities map accordingly.

In some further embodiments, the backend assessment module 290 may be programmed to perform time-related analyses based on completed tickets. The types of time-related analyses of interest may vary according the entity from whose perspective the analyses are performed. For instance, from the perspective of a locate service provider, it may be desirable to analyze not only total on-site time (e.g., the length of time between a technician arriving at a work site and the technician departing from the work site upon completion of the requested locate operation), but also a breakdown of the total duration into individual tasks, such as equipment preparation, locating, marking final documentation and/or personal breaks. Each task may be further broken down, for example, into subtasks each pertaining to a particular type of facilities. The locate service provider may also analyze travel time, for example, between successive locate operations and/or daily, weekly or monthly totals. These types of fine-grained analyses (e.g., analyzing durations of smaller units of work) may help the locate service provider identify potential quality and/or efficiency issues.

For instance, in some embodiments, the backend assessment module may compare each technician's record against fleet-wide and/or historical records and may, as a result, identify a technician who consistently spends too much (or too little) time when locating a particular type of facilities. This may suggest further training for the technician with respect to the particular facilities type to ensure that the technician correctly follows the recommended procedures. As another example, the backend assessment module may identify a technician whose patterns of personal breaks negatively impact his work efficiency, in which case coaching may be appropriate.

Time-related analyses may also be performed from the perspective of an entity other than a locate service provider, such as a regulatory body, a one-call center and/or an insurance company. For instance, a regulatory body or one-call center may be more interested in timely completion of tickets (e.g., reporting percentage of tickets that are completed on time and/or identifying tickets that are completed late) and less interested in work duration (e.g., length of time taken to complete the requested locate operation or a task within the requested locate operation). Statistics on response time (e.g., length of time between receiving a ticket from a one-call center and completing the requested locate operation) may also be of interest.

In yet some further embodiments, the backend assessment module 290 may be programmed to review completed tickets and identify suitable candidates for human review. For instance, a regulatory body may used the backend assessment module to identify high risk and/or high value tickets to be audited. A quality control application (e.g., the quality control application 270 shown in FIG. 2) may be employed in conjunction with the backend assessment module to further filter the identified high risk and/or high value tickets. For instance, the quality control application may flag those tickets with potential quality issues (e.g., technician unable to gain access to dig area, insufficient locate signals, inclement weather during operation, etc.) Alternatively, the backend assessment module may itself be programmed to perform some or all of the quality control analysis. In either manner, backend assessment may be employed to reduce the volume of completed tickets that require human review, without unacceptable degradation in safety. Examples of manual, semi-automated and automated quality assessment techniques that may be implemented as part of backend assessment can be found in one or more of the following references, each of which is incorporated herein by reference:

U.S. patent application Ser. No. 12/493,109, filed on Jun. 26, 2009, entitled "Methods and Apparatus for Quality Assessment of a Field Service Operation;"

U.S. patent application Ser. No. 12/557,732, filed on Aug. 7, 2009, entitled "Methods and Apparatus for Quality Assessment of a Field Service Operation Based on Geographic Information;"

U.S. patent application Ser. No. 12/571,356, filed on Sep. 30, 2009, entitled "Methods and Apparatus for Analyzing Locate and Marking Operations with Respect to Facilities Maps;"

U.S. patent application Ser. No. 12/572,202, filed on Oct. 1, 2009, entitled "Methods and Apparatus for Analyzing Locate and Marking Operations with Respect to Historical Information;"

U.S. patent application Ser. No. 12/568,087, filed on Sep. 28, 2009, entitled "Methods and Apparatus for Generating an Electronic Record of Environmental Landmarks Based on Marking Device Actuations;"

U.S. patent application Ser. No. 12/572,260, filed on Oct. 1, 2009, entitled "Methods and Apparatus for Analyzing Locate and Marking Operations with Respect to Environmental Landmarks;" and U.S. patent application Ser. No. 12/703,809, filed on Apr. 14, 2010, entitled "Marking Apparatus Equipped with Ticket Processing Software for Facilitating Marking Operations, and Associated Methods."

TABLE 2

Example rules of assessment business rules 240

| Number | Category | Impacts | Name | Description |
| --- | --- | --- | --- | --- |
| BR-001 | Complexity | Time, Risk, Resource | Keywords - Complexity | Use keywords to predict complexity potential and/or high profile potential |
| BR-002 | Complexity | Time, Risk, Resource | Complexity Region - Complexity | Determine whether excavation notice is within a Complexity Region |
| BR-003 | Complexity | Time, Risk, Resource | Proximity to Historical High Profile - High Profile | Use proximity to historical high profile tickets to estimate high profile potential |
| BR-004 | Complexity | Time, Risk, Resource, Revenue | Project/Hourly Scope - Complexity | Determine if a project/hourly scope applies to the excavation notice |
| BR-005 | Complexity | Time, Risk, Resource | Emergency/Short Notice Type - Complexity | Determine if an emergency/short notice type applies to the excavation notice |
| BR-006 | Time | Time | Locate Count - Time | Use number of locates to set initial estimate of ticket duration |
| BR-007 | Time | Time | Facility Type - Time | Use facility types to be located to adjust estimated ticket duration |
| BR-008 | Time | Time | High Profile - Time | Use high profile certainty to adjust estimated ticket duration |
| BR-009 | Time | Time | High Profile Potential - Time | Use high profile potential to adjust estimated ticket duration |
| BR-010 | Time | Time | Complexity Regions - Time | Use complexity regions to adjust estimated ticket duration |
| BR-011 | Time | Time | Service Type - Time | Use the service type (emergency or short notice) to adjust estimated ticket duration |
| BR-012 | Time | Time | Project/Hourly Scope - Time | Adjust duration for project/hourly scope excavation notice |
| BR-013 | Risk | Risk | Facility Types - Risk | Use facility types to estimate risk |
| BR-014 | Risk | Risk | Proximity to Historical High Profile - Risk | Use proximity to historical damage reports to adjust estimated risk |
| BR-015 | Risk | Risk | Excavator Damage History - Risk | Use excavator damage history to adjust estimated risk |
| BR-016 | Risk | Risk | High Profile Potential - Risk | Use high profile potential to adjust estimated risk |

TABLE 2-continued

Example rules of assessment business rules 240

| Number | Category | Impacts | Name | Description |
|---|---|---|---|---|
| BR-017 | Risk | Risk | Service Type - Risk | Use the service type (emergency or short notice) to adjust estimated risk |
| BR-018 | Risk | Risk | Project/Hourly Scope - Risk | Adjust risk for project/hourly scope excavation notice |
| BR-019 | Value | Value | Billing Rules Per Ticket - Value | Apply applicable Per Ticket billing business rates and rules to determine value |
| BR-020 | Value | Value | Duplicate Ticket Rules - Value | Apply duplicate ticket rules to determine if billing value is zero |
| BR-021 | Value | Value | Billing Rates By Unit - Value | Apply applicable By Unit billing business rates and rules to determine value |
| BR-022 | Value | Value | Project/Hourly Scope - Value | Adjust value for project/hourly scope excavation notice |
| BR-023 | Resource | Resource | Determine Resource Requirements - Skill | Determine skill requirements for the excavation notice |

TABLE 3

First example complexity determination of assessment business rules 240

| | |
|---|---|
| Business Rule ID | BR-001 (of Table 2) |
| Business Rule Name | Keywords - Complexity          BR Category: CPL |
| Business Rule Description | Use keywords to predict complexity potential and/or high profile potential |
| Fields Required | Excavation Notice ID, Work Order Number, Task ID, locate instruction text, comment text, excavation type description |
| Rule Operation Example | IF excavation type description contains FiOS<br>    THEN complexity type = High Profile Potential |
| Implementation | The keywords will be stored in a decision table as an input column, with corresponding values for complexity type and high potential reason description. For example:<br><br>KEYWORD   COMPLEXITY TYPE   HIGH PROFILE REASON DESCRIPTION<br>FiOS                                High Profile Potential Fiber Optic<br>Gated                               Gated<br>AFB                                 Military Base<br>Aerial                              Aerial Power Lines |

TABLE 4

Second example complexity determination of assessment business rules 240

| | |
|---|---|
| Business Rule ID | BR-002 (of Table 2) |
| Business Rule Name | Complexity Region - Complexity          BR Category: CPL |
| Business Rule Description | Determine whether excavation notice is within a Complexity Region |
| Fields Required | Excavation Notice ID, Work Order Number, Task ID, latitude number, longitude number |
| Rule Operation Example | IF work location is inside a gated community<br>    THEN Complexity Type = Gated |
| Implementation | The complexity regions will be defined by Supervisors using the Scheduling interface. The complexity region is defined by a complexity type, high profile reason description (if applicable), and a series of latitude/longitude coordinates which define a complexity region polygon. |

TABLE 5

Third example complexity determination of assessment business rules 240

| | | |
|---|---|---|
| Business Rule ID | BR-003 (of Table 2) | |
| Business Rule Name | Proximity to Historical High Profile - High Profile | BR Category: CPL |
| Business Rule Description | Use proximity to historical high profile tickets to estimate high profile potential | |
| Fields Required | Excavation Notice ID, Work Order Number, Task ID, lat number, long number, Facility Type Code, Facility Type Description | |
| Rule Operation Example | IF work location is within a 100 yard radius of a high profile historical location<br>    THEN Complexity Type = High Profile Potential<br>    High Profile Potential Reason =<br>    Historical High Profile Reason | |
| Implementation | Historical high profile tickets will be retained with high profile reason description and latitude/longitude coordinates which define the work location. | |

TABLE 6

Fourth example complexity determination of assessment business rules 240

| | | |
|---|---|---|
| Business Rule ID | BR-004 (of Table 2) | |
| Business Rule Name | Project/Hourly Scope - Complexity | BR Category: CPL |
| Business Rule Description | Determine if a project/hourly scope applies to the excavation notice | |
| Fields Required | Excavation Notice ID, Work Order Number, Task ID, Size of Locate Area, Footage, Miles, Bounded By, locate instruction text, comment text, excavation type description | |
| Rule Operation Example | IF size of locate area in miles is greater than 0.5<br>    THEN Hourly Status Indicator = True | |
| Implementation | The decision factors leading to hourly status designation center upon the complexity and size of the locate task, and travel considerations such as whether the worksite is a remote/rural/desert location. Decisions will be based upon dimensional fields (Size of Locate Area, Footage, Miles, Bounded By) and keyword fields (locate instruction text, comment text, excavation type description).<br>Business rules such as this one, which are derived based upon billing tables, will need to undergo definition and validation prior to rollout in any given location. This is due to the fact that the rules can differ from contract-to-contract, and by area to area within a state. | |

TABLE 7

Fifth example complexity determination of assessment business rules 240

| | | |
|---|---|---|
| Business Rule ID | BR-005 (of Table 2) | |
| Business Rule Name | Emergency/Short Notice Type - Complexity | BR Category: CPL |
| Business Rule Description | Determine if an emergency/short notice type applies to the excavation notice | |
| Fields Required | Excavation Notice ID, Work Order Number, Task ID, Service Type, locate instruction text, comment text, excavation type description | |
| Rule Operation Example | IF excavation type description contains Emergency<br>    THEN service type = Emergency | |
| Implementation | For tickets with a routine ticket type, keywords will be searched for to determine if a short notice or emergency ticket type should in fact be applied to the excavation notice. | |

TABLE 8

First example time estimation of assessment business rules 240

| | | |
|---|---|---|
| Business Rule ID | BR-006 (of Table 2) | |
| Business Rule Name | Locate Count - Time | BR Category: TME |
| Business Rule Description | Use number of locates to set an initial estimate of ticket duration. | |
| Fields Required | work_order.work_order_id,<br>work_order_locate_task.work_order_locate_task_id | |

TABLE 8-continued

First example time estimation of assessment business rules 240

| | |
|---|---|
| Rule Operation Example Implementation | IF count(tasks) > 3<br>    THEN duration = 19<br>The locate count values and corresponding ticket duration values are stored in locate_assess_cond. For example:<br>    LOCATE COUNT    AVG DURATION<br>    1    7<br>    2    13<br>    3    19 |

TABLE 9

Second example time estimation of assessment business rules 240

| | |
|---|---|
| Business Rule ID | BR-007 (of Table 2) |
| Business Rule Name | Facility Type - Time     BR Category: TME |
| Business Rule Description | Use facility types to be located to adjust estimated ticket duration |
| Fields Required | util_type_code.displ_type_code, util_locate_request.util_type_code, util_locate_request.util_locate_request_id, work_order_locate_task.util_locate_request_id, work_order_locate_task.work_order_id |
| Rule Operation Example | IF Facility Type Codes include Gas<br>    THEN duration = duration + 4 |
| Implementation | The facility type values with associated adjustment values are stored in locate_assess_cond. Note that the reason that, for example, the sewer number might be a negative adjustment, is that statistics might tell us that 3-locate tickets with sewer are, on average, 3 minutes shorter in duration than 3-locate tickets without a sewer locate. For example:<br>FACILITY TYPE<br>ADJUSTMENT    DURATION<br>Gas    4<br>Sewer    −3<br>Water    −2 |

TABLE 10

Third example time estimation of assessment business rules 240

| | | | |
|---|---|---|---|
| Business Rule ID | BR-008 (of Table 2) | | |
| Business Rule Name | High Profile - Time | | BR Category: TME |
| Business Rule Description | Use high profile certainty to adjust estimated ticket duration | | |
| Fields Required | high_profile_reason_code.displ_reason_code,<br>util_locate_high_profile_reason.high_profile_reason_code,<br>util_locate_high_profile_reason.util_locate_request_id,<br>util_locate_request.util_locate_request_id,<br>work_order_locate_task.util_locate_request_id,<br>work_order_locate_task.work_order_id | | |
| Rule Operation Example | IF High Profile Reason Code = HCPHONE<br>    THEN duration = duration * 1.23 | | |
| Implementation | The high profile reason codes will be stored in a decision table as an input column, with corresponding multiplier values for ticket duration. For example: | | |
| | HIGH PROFILE REASON CODE | HP REASON DESCRIPTION | DURATION MULTIPLIER |
| | None | no reason | 1.15 |
| | FiOS | Fiber Optic | 1.38 |
| | HCPHONE | High Capacity Phone Line | 1.23 |

TABLE 11

Fourth example time estimation of assessment business rules 240

| | |
|---|---|
| Business Rule ID | BR-009 (of Table 2) |
| Business Rule Name | High Profile Potential - Time     BR Category: TME |
| Business Rule Description | Use proximity to historical high profile areas to adjust estimated ticket duration |
| Fields Required | work_order.lat_nbr, work_order.long_nbr, high_profile_service_area.high_profile_reason_code, high_profile_reason_code.high_profile_reason_code, util_locate_request.util_locate_request_id, util_locate_high_profile_reason.util_locate_request_id, work_order_locate_task.work_order_id, work_order_locate_task.util_locate_request_id |
| Rule Operation Example | IF High Profile Potential Reason Code = HCPHONE<br>   THEN duration = duration * 1.18 |
| Implementation | The high profile reason codes will be stored in a decision table as an input column, with corresponding multiplier values for ticket duration. For example: |

| REASON CODE | HP POTENTIAL REASON DESCRIPTION | HI PROFILE DURATION MULTIPLIER |
|---|---|---|
| None | no reason | 1.08 |
| FiOS | Fiber Optic | 1.30 |
| HCPHONE | High Capacity Phone Line | 1.18 |

TABLE 12

Fifth example time estimation of assessment business rules 240

| | |
|---|---|
| Business Rule ID | BR-010 (of Table 2) |
| Business Rule Name | Complexity Regions - Time     BR Category: TME |
| Business Rule Description | Use complexity regions to adjust estimated ticket duration. Determine if work order is in a complexity region by determining whether the work order location is inside a defined complexity area. |
| Fields Required | complexity_reason_code.displ_reason_code, complexity_service_area.service_area_id, service_area_coordnat.seq_nbr, service_area_coordnat.lat_nbr, service_area_coordnat.long_nbr, service_area_coordnat.spatial_type_code, service_area.service_area_id, work_order.lat_nbr, work_order.long_nbr |
| Rule Operation Example | IF Complexity Region Type = Military Base<br>   THEN duration = duration + 35 |
| Implementation | The complexity region type codes will be stored in a decision table as an input column, with corresponding multiplier values for ticket duration. For example: |

| COMPLEXITY REGION TYPE | DURATION ADJUSTMENT |
|---|---|
| Gated | 15 |
| Military Base | 35 |
| Aerial | −10 |

TABLE 13

Sixth example time estimation of assessment business rules 240

| | |
|---|---|
| Business Rule ID | BR-011 (of Table 2) |
| Business Rule Name | Service Type - Time     BR Category: TME |
| Business Rule Description | Use the service type (emergency or short notice) to adjust estimated ticket duration |
| Fields Required | work_order_locate_task.work_order_id, excavatn_notice.ticket_type_code, client_locate_request.excavatn_notice_id, excavatn_notice.excavatn_notice_id, util_locate_request.util_locate_request_id, work_order_locate_task.util_locate_request_id, ticket_type_code.displ_type_code |

TABLE 13-continued

Sixth example time estimation of assessment business rules 240

| | |
|---|---|
| Rule Operation Example Implementation | IF Service Type = Emergency<br>   THEN duration = duration * 1.43<br>The service types will be stored in a decision table as an input column, with corresponding multiplier values for ticket duration. For example:<br>   SERVICE TYPE    DURATION MULTIPLIER<br>   Emergency             1.23<br>   Short Notice          1.82 |

TABLE 14

Seventh example time estimation of assessment business rules 240

| | |
|---|---|
| Business Rule ID | BR-012 (of Table 2) |
| Business Rule Name | Project/Hourly Scope - Time   BR Category: TME |
| Business Rule Description | Adjust duration for project/hourly scope excavation notice |
| Fields Required | excavatn_notice.site_dig_length, excavatn_notice.site_dig_width, excavatn_notice.site_dig_depth, excavatn_notice.site_dig_length_uom_code, excavatn_notice.site_dig_width_uom_code, excavatn_notice.site_dig_depth_uom_code, excavatn_notice.excavatn_notice_id, client_locate_request.client_locate_request_id, util_locate_request.client_locate_request_id, work_order_locate_task.util_locate_request_id, work_order_locate_task.work_order_id, |
| Rule Operation Example Implementation | IF excavation size greater than minimum for project scope status<br>   THEN duration = duration * (size of locate area in miles)/0.5<br>The duration adjustment will be proportional to the appropriate locate size field, divided by the baseline appropriate to that field.<br>   1. If the dig dimension fields are not populated, ignore this rule.<br>   2. If the dig dimension fields are populated, and if the dig square footage is over the stored lookup value for square feet (e.g., 10,000), adjust the duration upwards in proportion to the ratio for square footage.<br>   3. If the dig dimension fields are populated, and item 2 does not apply, and if the dig length is above the stored lookup value for length in miles, adjust the duration upwards in proportion to the ratio for linear miles.<br>For example:<br>   SCOPE MEASURABLE   BASELINE<br>   Length of Locate Area   0.5 miles<br>   Footage                    10000 sq ft |

45

TABLE 15

First example risk estimation of assessment business rules 240

| | |
|---|---|
| Business Rule ID | BR-013 (of Table 2) |
| Business Rule Name | Facility Types - Risk   BR Category: RSK |
| Business Rule Description | Use facility types to estimate risk |
| Fields Required | Excavation Notice ID, Work Order Number, Task ID, Facility Type |
| Rule Operation Example Implementation | IF facility type descriptions contain gas and water<br>   THEN Risk = 2.5 + 0.2 = 2.7<br>The facility types will be stored in a decision table as an input column, with corresponding values for additive facility type risk values. For example:<br>                                                  FACILITY TYPE RISK<br>   FACILITY TYPE DESCRIPTION        VALUE<br>   Gas                                               2.5<br>   Electric                                       0.7<br>   Water                                         0.2 |

TABLE 16

Second example risk estimation of assessment business rules 240

| | |
|---|---|
| Business Rule ID | BR-014 (of Table 2) |
| Business Rule Name | Proximity to Historical High Profile - Risk     BR Category: RSK |
| Business Rule Description | Use proximity to historical damage reports to adjust estimated risk |
| Fields Required | Excavation Notice ID, Work Order Number, Task ID, lat number, long number, damage latitude, damage longitude, damage amount |
| Rule Operation Example | IF work location is within a 500 yard radius of one or more damage report historical locations totaling $15,000<br>    THEN Risk = Risk * 2.0 |
| Implementation | The $15,000 figure cited above is only an example, the actual criteria will be defined by Risk Management based upon historical statistics, and will be specific to an individual area. Historical damage reports will be retained along with excavator, damage cost, facility type, and latitude/longitude coordinates which define the damage location. For example:<br><br>  MIN DAMAGE   MAX DAMAGE   RISK MULTIPLIER<br>  1                        1000                    1.1<br>  1000                  10000                1.3<br>  10000              100000             2.0<br>  100000           1000000           4.0 |

TABLE 17

Third example risk estimation of assessment business rules 240

| | |
|---|---|
| Business Rule ID | BR-015 (of Table 2) |
| Business Rule Name | Excavator Damage History - Risk     BR Category: RSK |
| Business Rule Description | Use excavator damage history to adjust estimated risk |
| Fields Required | Excavation Notice ID, Work Order Number, Task ID, lat number, long number, excavator, excavator damage amount, excavator damage count, excavator locate count |
| Rule Operation Example | IF High Profile Potential Reason Code Is Between 100 and 300<br>THEN risk = risk * 2.0 |
| Implementation | Historical damage reports will be retained along with excavator, damage cost, facility type, and latitude/longitude coordinates which define the damage location. For example:<br><br>MAXIMUM EXCAVATOR DAMAGE   AMOUNT PER LOCATE AS PERCENTAGE OF MEAN   RISK MULTIPLIER<br>  0                       50                   0.5<br>  50                     100                 1.0<br>  100                  300                 2.0<br>  300                  600                 4.0<br><br>Additionally, risk multipliers will be applied for excavator damage count:<br><br>MAXIMUM EXCAVATOR DAMAGE   COUNT PER LOCATE AS PERCENTAGE OF MEAN   RISK MULTIPLIER<br>  0                       50                   0.5<br>  50                     100                 1.0<br>  100                  300                 1.3<br>  300                  600                 1.8 |

TABLE 18

Fourth example risk estimation of assessment business rules 240

| | |
|---|---|
| Business Rule ID | BR-016 (of Table 2) |
| Business Rule Name | High Profile Potential - Risk     BR Category: RSK |
| Business Rule Description | Use high profile potential to adjust estimated risk |
| Fields Required | Excavation Notice ID, Work Order Number, Task ID, High Profile Potential (derived), High Profile Potential Reason (derived) |

TABLE 18-continued

Fourth example risk estimation of assessment business rules 240

| | | |
|---|---|---|
| Rule Operation Example | IF High Profile Potential Reason Description = Fiber Optic<br>    THEN risk = risk * 4.0 | |
| Implementation | The high profile reason codes will be stored in a decision table as an input column, with corresponding multiplier values for risk. For example: | |
| | HP POTENTIAL REASON DESCRIPTION | RISK MULTIPLIER |
| 581 | no reason | 1.8 |
| 585 | Fiber Optic | 4.0 |
| 586 | High Capacity Phone Line | 2.5 |

TABLE 19

Fifth example risk estimation of assessment business rules 240

| | |
|---|---|
| Business Rule ID | BR-017 (of Table 2) |
| Business Rule Name | Service Type - Risk     BR Category: RSK |
| Business Rule Description | Use the service type (emergency or short notice) to adjust estimated risk |
| Fields Required | Excavation Notice ID, Work Order Number, Task ID, Service Type |
| Rule Operation Example | IF Service Type = Emergency<br>    THEN risk = risk * 2.85 |
| Implementation | The service types will be stored in a decision table as an input column, with corresponding multiplier values for ticket duration. For example:<br>SERVICE TYPE      RISK MULTIPLIER<br>Emergency      2.85<br>Short Notice - 2 hours      3.46<br>Short Notice - 3 hours      3.11 |

TABLE 20

Sixth example risk estimation of assessment business rules 240

| | |
|---|---|
| Business Rule ID | BR-018 (of Table 2) |
| Business Rule Name | Project/Hourly Scope - Risk     BR Category: RSK |
| Business Rule Description | Adjust risk for project/hourly scope excavation notice |
| Fields Required | Excavation Notice ID, Work Order Number, Task ID, Hourly Status Indicator, Size of Locate Area, Footage, Miles, Bounded By |
| Rule Operation Example | IF Hourly Status Indicator = True<br>    THEN risk = risk * (size of locate area in miles)/0.5 |
| Implementation | The risk adjustment will be proportional to the appropriate locate size field, divided by the baseline appropriate to that field. For example:<br>SCOPE MEASURABLE      BASELINE<br>Size of Locate Area      0.5 miles<br>Footage      10000 sq ft |

TABLE 21

First example value estimation of assessment business rules 240

| | |
|---|---|
| Business Rule ID | BR-019 (of Table 2) |
| Business Rule Name | Billing Rules Per Ticket - Value     BR Category: VAL |
| Business Rule Description | Use estimated located value to estimate ticket value |
| Fields Required | Excavation Notice ID, Work Order Number, Task ID, Member Code, Estimated Located Value (Derived from Billing Rate Tables) |

TABLE 21-continued

First example value estimation of assessment business rules 240

| | |
|---|---|
| Rule Operation Example Implementation | IF estimated located value equals $35.50<br>    THEN Value = $35.50<br>If the billing method associated with the client is "Per Ticket" or "Per Transmission", then assume a located, normal, closed ticket. Then lookup the billing rate value associated with the member code associated with the facility locate request and a located, normal, closed ticket. |

TABLE 22

Second example value estimation of assessment business rules 240

| | | |
|---|---|---|
| Business Rule ID | BR-020 (of Table 2) | |
| Business Rule Name | Duplicate Ticket Rules - Value | BR Category: VAL |
| Business Rule Description | Apply duplicate ticket rules to determine if date worked affects value | |
| Fields Required | Excavation Notice ID, Work Order Number, Task ID, Duplicate Rule Applicability (Derived) | |
| Rule Operation Example | IF duplicate rule is true<br>    THEN Value = 0 | |
| Implementation | A subset of the billing subsystem business rules deal with the application of duplicate ticket rules applicable to many service contracts. Many client contracts stipulate that the locating company cannot charge for services performed on a duplicate ticket. These contracts also stipulate what conditions define a duplicate ticket. For example, a contract may define a duplicate ticket as two or more tickets transmitted on the same business day with identical excavation sites.<br>Business Rule ID: BR-21.0<br>Business Rule Name: Duplicate Address on Same Day<br>Business Rule Description Cannot bill for subsequent unique Tickets on the same day with the same address<br>Fields Required    Ticket#, AddressID, Date<br>Rule Operation    Find = [Ticket#, AddressID, Date]<br>If Found > "true"<br>Then No Charge<br>    Status on found record = NC<br>END<br>A variant of this rule involves tickets that must be re-worked. For example, the locator may mark facilities on an excavation site; the excavator subsequently damages or destroys the markings. In this scenario, the locating company is considered "not at fault" for the re-work, and according to the terms of the contract may charge the facility for this re-work. | |

TABLE 22

Second example value estimation of assessment business rules 240

| | | |
|---|---|---|
| Business Rule ID | BR-020 (of Table 2) | |
| Business Rule Name | Duplicate Ticket Rules - Value | BR Category: VAL |
| | Business Rule ID: BR-21.1<br>Business Rule Name: Duplicate Ticket, re-work<br>Business Rule Description Cannot bill for duplicate tickets if at fault<br>Fields Required    Ticket Number, Ticket Type<br>Rule Operation    If Ticket = "Dup" And "At Fault" = True<br>Then No Charge<br>    Status = NC<br>END<br>Another variant of this rule involves a more stringent definition of what constitutes a duplicate ticket. A contract may stipulate that the locating company cannot charge the facility for two tickets transmitted on the same day<br>within a certain proximity to each other (although at different addresses).<br>Business Rule ID: BR-21.2<br>Business Rule Name: Duplicate Ticket, Contract-specific attributes<br>Business Rule Description    Cannot bill for duplicate tickets defined by contract-specific attributes | |

TABLE 22-continued

Second example value estimation of assessment business rules 240

| | |
|---|---|
| Fields Required | Ticket Number, Ticket Type, Contract-specific attributes |
| Rule Operation | If Ticket = "Dup" |
| Then No Charge | |
| Status = NC | |
| END | |

TABLE 23

| | | |
|---|---|---|
| Business Rule ID | BR-AE-021 | |
| Business Rule Name | Billing Rates By Unit - Value | BR Category: VAL |
| Business Rule Description | Apply applicable By Unit billing business rates and rules to determine value | |
| Fields Required | Excavation Notice ID, Work Order Number, Task ID, Member Code, Billing Rate Table Criteria and Values | |
| Rule Operation Example | IF member code equals 74538 and quantity equals 1<br>    THEN Value = 25.75 | |
| Implementation | If the billing method associated with the client is "By Unit", then assume a quantity of 1 (this would mean that the lowest lineal feet in the billing table would be applied). Then lookup the billing rate value associated with the member code associated with the utility locate request and a quantity of one. | |

TABLE 24

| | | |
|---|---|---|
| Business Rule ID | BR-AE-022 | |
| Business Rule Name | Project/Hourly Scope - Value | BR Category: VAL |
| Business Rule Description | Adjust value for project/hourly scope excavation notice | |
| Fields Required | Excavation Notice ID, Work Order Number, Task ID, Hourly Status Indicator, Size of Locate Area, Footage, Miles, Bounded By | |
| Rule Operation Example | IF Hourly Status Indicator = True<br>    THEN value = 4 * (size of locate area in miles)/0.5 | |
| Implementation | Value for hourly projects is governed by the billing tables (per contractual terms). Most contracts pay on unit pay rather than hourly. If the contract allows for per hour billing, then the value adjustment will be proportional to the appropriate locate size field, multiplied by the baseline hours for that field, divided by the baseline appropriate to that field. For example: | |

| SCOPE MEASURABLE | BASELINE SIZE | BASELINE HOURS |
|---|---|---|
| Size of Locate Area | 0.5 miles | 4 |
| Footage | 10000 sq ft | 3 |

TABLE 25

| | | | |
|---|---|---|---|
| Business Rule ID | BR-AE-022 | | |
| Business Rule Name | Project/Hourly Scope -- Value | | BR Category: VAL |
| | SCOPE MEASURABLE | BASELINE SIZE | BASELINE HOURS |
| | Size of Locate Area | 0.5 miles | 4 |
| | Footage | 10000 sq ft | 3 |

TABLE 26

| | | |
|---|---|---|
| Business Rule ID | BR-AE-023 | |
| Business Rule Name | Determine Resource Requirements - Skill | BR Category: SKL |
| Business Rule Description | Determine skill requirements for the excavation notice | |
| Fields Required | Excavation Notice ID, Work Order Number, Task ID, Service Type, Utility Type, locate instruction text, comment text, excavation type description | |

TABLE 26-continued

| | |
|---|---|
| Rule Operation Example | IF Utility Type equals Gas AND High Profile equals True THEN Add Resource Requirement for Gas Add Resource Requirement for Expert Add Resource Requirement for High Profile |
| Implementation | Examples of skill levels include novice locator, experienced locator, and expert locator. Examples of skill areas include gas qualification, military base eligibility, high profile qualified, and downtown qualified. |

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Figure 19:
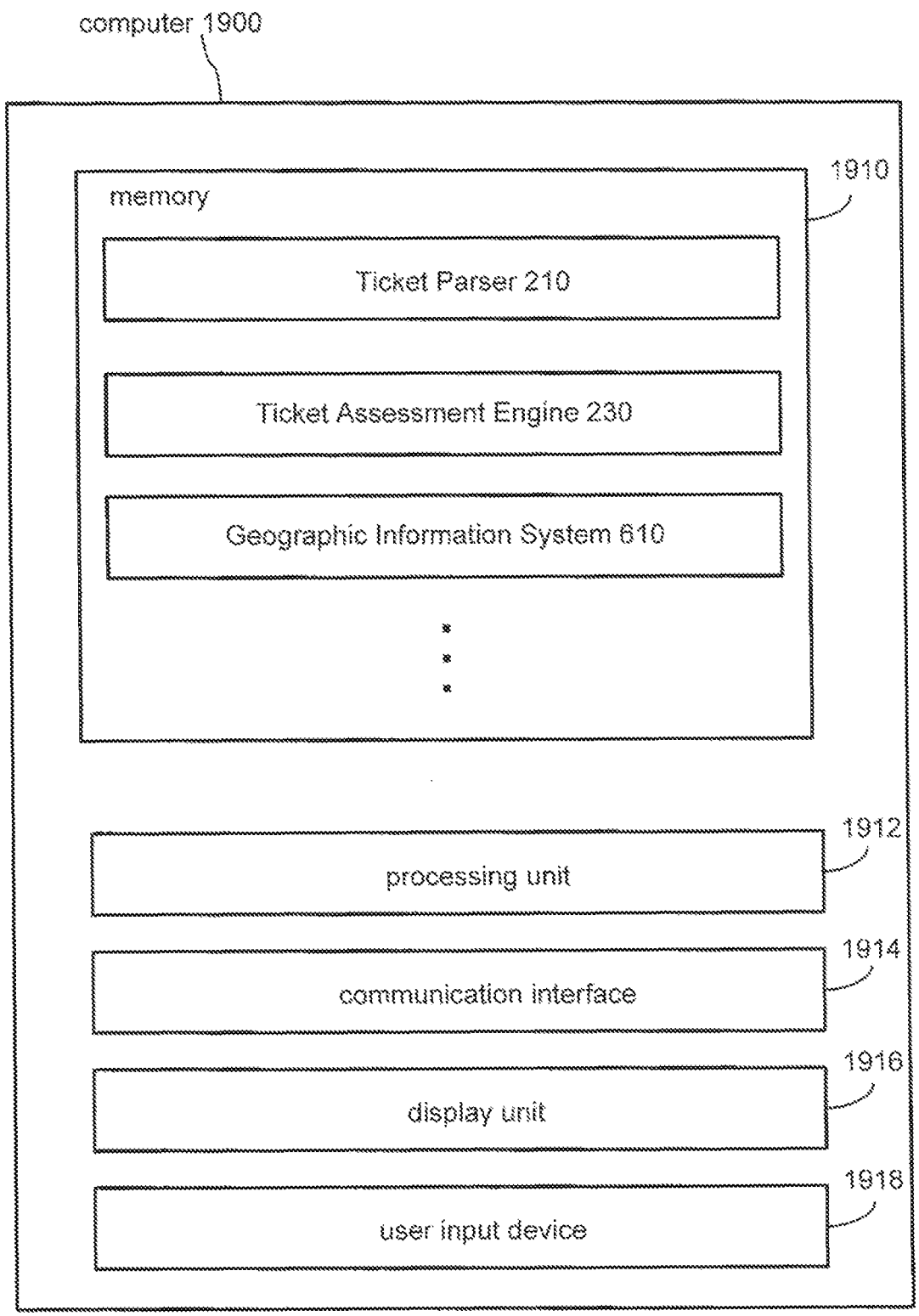
FIG. 19 shows an illustrative computer that may be used for improving information management, dissemination, and utilization in the locate industry and other field service industries, according to some embodiments of the present disclosure.

FIG. 19 shows an illustrative computer 1900 that may be used for improving information management, dissemination, and utilization in the locate industry and other field service industries, in accordance with some embodiments. For example, the computer 1900 comprises a memory 1910, a processing unit 1912 (which may include one or more processors), one or more communication interfaces 1914, one or more display units 1916, and one or more user input devices 1918. The memory 1910 may comprise any tangible computer-readable media, and may store computer instructions for implementing various components of a ticket management system, such as the ticket parser 210 and the ticket assessment engine 230 shown in FIG. 2 and the geographic information system 610 shown in FIG. 6. The processing unit 1912 may be used to execute the instructions implementing these software components. The communication interface(s) 1914 may be coupled to a wired or wireless network, bus, or other communication means and may therefore allow the computer 1900 to transmit communications to and/or receive communications from other devices. The display unit(s) 1916 may be provided, for example, to allow a human user to view assessment outcomes produced by the ticket assessment engine 230. The user input device(s) 1918 may be provided, for example, to allow the human user to make any desired manual adjustments to the assessment outcomes.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for automatically providing at least one dispatch schedule and at least one resource requirement to perform a locate and/or marking operation, the apparatus comprising:
   at least one communication interface;
   at least one memory to store processor-executable instructions to implement at least a ticket parser, a geographic information system, a ticket assessment engine, and a technician scheduling and dispatch application; and
   at least one processor communicatively coupled to the at least one memory and the at least one communication interface, wherein upon execution of the processor-executable instructions by the at least one processor, the at least one processor:
   A) controls the at least one communication interface and/or the at least one memory to acquire a locate request ticket generated by a one-call center and specifying the locate and/or marking operation, wherein:
      the locate and/or marking operation comprises detecting and/or marking a presence or an absence of at least one underground facility within a dig area at a work site;
      at least a portion of the dig area is planned to be excavated or disturbed during excavation activities by an excavator at the work site; and
      the locate request ticket includes:
         geographic coordinates identifying the dig area;
         type information indicating at least one facility type of the at least one underground facility; and
         excavator information identifying the excavator;
   B) implements the ticket parser to:
      B1) electronically parse at least some content of the locate request ticket acquired in A) so as to automatically extract ticket information obtained from the locate request ticket; and
      B2) generate an Extensible Markup Language (XML) format file comprising the extracted ticket information, wherein the extracted ticket information includes the geographic coordinates identifying the dig area, the at least one facility type of the at least one underground facility, and the excavator information;
   C) implements the geographic information system to:
      C1) control the at least one communication interface to electronically access at least one auxiliary information source electronically storing a plurality of facilities maps illustrating installed underground facilities, wherein each facilities map includes geospatial metadata associated with at least some of the underground facilities shown in the facilities map;

C2) based at least in part on the geographic coordinates identifying the dig area and the at least one facility type of the at least one underground facility in the XML format file, obtains a relevant facilities map of the plurality of facilities maps; and C3) renders at least one dig area indicator as an overlay on the relevant facilities map based on the geospatial metadata and the geographic coordinates identifying the dig area in the XML format file;

D) implements the ticket assessment engine to:

D1) control the at least one communication interface to electronically access a risk lookup table stored in the at least one auxiliary information source, and electronically map, using the risk lookup table, the at least one facility type of the at least one underground facility to at least one risk score;

D2) control the at least one communication interface and/or the at least one memory to electronically access at least one electronic source of historical information, the historical information including at least one of:
- historical damage reports for underground facility infrastructure; and
- historical records of previously completed locate request tickets;

D3) search the historical information to select at least some historical information based at least in part on at least one of the geographic coordinates identifying the dig area, the at least one facility type of the at least one underground facility, and the excavator information in the XML format file;

D4) perform at least one statistical analysis of the selected at least some historical information to determine at least one of:
- at least one frequency of damages associated with at least one of the dig area, the at least one facility type, and the excavator;
- at least one damage cost associated with the at least one of the dig area, the at least one facility type, and the excavator; and
- at least one distance between a first location of at least one previous accident and the dig area; and D5) automatically assign at least one risk designation to the locate request ticket, the at least one risk designation indicating the level of risk associated with the performance of the locate and/or marking operation based at least in part on the at least one risk score in D1), and the at least one of the at least one frequency of damages, the at least one damage cost, and the at least one distance as determined in D4), wherein the level of risk associated with the performance of the locate and/or marking operation relates to physical damage to the at least one underground facility, property damage, economic loss, environmental damage, and/or personal injury during the excavation activities; and E) implements the technician scheduling and dispatch application to:

E1) determine the at least one dispatch schedule for a technician to perform the locate and/or marking operation, based at least in part on the at least one risk designation automatically assigned in D5); and E2) determine the at least one resource requirement for the locate and/or marking operation, based at least in part on the at least one risk designation automatically assigned in D5), wherein the at least one resource requirement comprises at least one of:
- a technician skill requirement of the technician to perform the locate and/or marking operation; and
- an equipment requirement for at least one piece of equipment to be used by the dispatched technician during the locate and/or marking operation.

2. The apparatus of claim 1, wherein the at least one risk designation comprises a numerical score.

3. The apparatus of claim 1, wherein the at least one processor further:

F) determines at least one billing rule for billing the locate and/or marking operation to a customer based at least in part on the at least one risk designation.

4. The apparatus of claim 1, wherein:
in D3), the at least some historical information is selected for the at least one statistical analysis based at least in part on the at least one facility type of the at least one underground facility in the XML format file.

5. The apparatus of claim 4, wherein:
the historical information includes the historical damage reports;
in D4), the at least one processor performs the at least one statistical analysis of the selected at least some historical information from the historical damage reports to determine the at least one frequency of damages relating to the at least one facility type of the at least one underground facility and/or the at least one damage cost associated with the at least one facility type of the at least one underground facility; and
in D5), the at least one processor automatically assigns the at least one risk designation to the locate request ticket based at least in part on the at least one frequency of damages and/or the at least one damage cost.

6. The apparatus of claim 1, wherein:
in D3), the at least some historical information is selected for the at least one statistical analysis based at least in part on the excavator information identifying the excavator in the XML format file.

7. The apparatus of claim 6, wherein:
the historical information includes the historical damage reports; and
the historical damage reports include an excavator damage history for the at least one excavator specified in the locate request ticket.

8. The apparatus of claim 7, wherein:
the excavator damage history includes excavator damage costs and/or excavator damage counts; and
in D5), the at least one processor automatically assigns the at least one risk designation to the locate request ticket based at least in part on the excavator damage costs and/or excavator damage counts.

9. The apparatus of claim 6, wherein:
the historical information includes at least some of the historical reports of previously completed locate request tickets that indicate the at least one excavator.

10. The apparatus of claim 1, wherein:
in D3), the at least some historical information is selected for the at least one statistical analysis based at least in part on geographic information relating to the work site and/or the dig area in the XML format file.

11. The apparatus of claim 10, wherein:
the historical information includes the historical damage reports;
in D4), the at least one processor performs the at least one statistical analysis of the selected at least some historical information from the historical damage reports to determine the at least one distance between a first location of at least one previous accident indicated in the historical damage reports and the dig area; and
in D5), the at least one processor automatically assigns the at least one risk designation to the locate request ticket based at least in part on the at least one distance determined in D4).

12. The apparatus of claim 11, wherein:
the historical damage reports include at least one damage cost associated with the at least one previous accident; and
in D5), the at least one processor automatically assigns the at least one risk designation to the locate request ticket based at least in part on the at least one distance determined in D4) and the at least one damage cost associated with the at least one previous accident.

13. The apparatus of claim 10, wherein:
the historical information includes the historical records of previously completed locate request tickets; and
in D3), at least one of the historical records of previously completed locate request tickets is selected based at least in part on a proximity between a first location of a historical work site and/or historical dig area specified by the at least one of the historical records of previously completed locate request tickets and the dig area identified by the geographic coordinates.

14. The apparatus of claim 13, wherein:
the at least one of the historical records of previously completed locate request tickets relates to a previous mis-locate or trouble ticket;
in D4), the at least one processor performs the at least one statistical analysis of the selected at least some historical information from the at least one of the historical records relating to the previous mis-locate or trouble ticket to determine at least one distance between the first location of the previous mis-locate or trouble ticket and the dig area identified by the geographic coordinates; and
in D5), the at least one processor automatically assigns the at least one risk designation to the locate request ticket based at least in part on the at least one distance determined in D4).

15. The apparatus of claim 13, wherein:
the at least one of the historical records of previously completed locate request tickets relates to a high profile ticket;
in D4), the at least one processor performs the at least one statistical analysis of the selected at least some historical information from the at least one of the historical records relating to the high profile ticket to determine at least one distance between the first location of the high profile ticket and the second location of the dig area identified by the geographic coordinates; and
in D5), the at least one processor automatically assigns the at least one risk designation to the locate request ticket based at least in part on the at least one distance determined in D4).

16. An apparatus for automatically providing at least one dispatch schedule and at least one resource requirement to perform a locate and/or marking operation, the apparatus comprising:
at least one communication interface;
at least one memory to store processor-executable instructions; and
at least one processor communicatively coupled to the at least one memory and the at least one communication interface, wherein upon execution of the processor-executable instructions by the at least one processor, the at least one processor:
A) controls the at least one communication interface and/or the at least one memory to acquire a locate request ticket generated by a one-call center and specifying the locate and/or marking operation, wherein:
the locate and/or marking operation comprises detecting and/or marking a presence or an absence of at least one underground facility within a dig area at a work site; and
at least a portion of the dig area is planned to be excavated or disturbed during excavation activities at the work site;
B) electronically parses at least some content of the locate request ticket acquired in A) so as to automatically extract ticket information obtained from the locate request ticket and generate an Extensible Markup Language (XML) format file comprising the extracted ticket information, the extracted ticket information including:
a first identifier for an excavator performing the excavation activities at the work site; and
a second identifier for the work site and/or the dig area;
C) automatically assigns at least one risk designation to the locate request ticket based at least in part on historical information, the at least one risk designation indicating the level of risk associated with the performance of the locate and/or marking operation, wherein the level of risk associated with the performance of the locate and/or marking operation relates to physical damage to the at least one underground facility, property damage, economic loss, environmental damage, and/or personal injury during the excavation activities, the historical information including:
an excavator damage history for the excavator identified by the first identifier in the XML format file;
historical damage reports for at least one location of at least one previous accident in sufficient proximity to the work site and/or the dig area identified by the second identifier in the XML format file; and
historical records of previously completed locate request tickets for a geographic area encompassing and/or in sufficient proximity to the work site and/or the dig area identified by the second identifier in the XML format file, and/or including excavator information relating to the excavator identified by the first identifier in the XML format file;
D) controls the at least one communication interface to transmit, and/or controls the at least one memory to store, the at least one risk designation so as to facilitate the determination of the at least one dispatch schedule, the at least one billing rule, and/or the at least one resource requirement, based at least in part on the at least one risk designation assigned in C);

E) determines the at least one dispatch schedule for a technician to perform the locate and/or marking operation, based at least in part on the at least one risk designation; and F) determines the at least one resource requirement for the locate and/or marking operation, based at least in part on the at least one risk designation, wherein the at least one resource requirement comprises at least one of:
a technician skill requirement of the technician to perform the locate and/or marking operation; and
an equipment requirement for at least one piece of equipment to be used by the technician during the locate and/or marking operation.

17. In a system comprising at least one processor, at least one memory, and at least one communication interface, a method for automatically providing at least one dispatch schedule and at least one resource requirement to perform a locate and/or marking operation, the method comprising:

A) obtaining, via the at least one communication interface and/or the at least one memory, a locate request ticket generated by a one-call center and specifying the locate and/or marking operation, wherein:
the locate and/or marking operation comprises detecting and/or marking a presence or an absence of at least one underground facility within a dig area at a work site;
at least a portion of the dig area is planned to be excavated or disturbed during excavation activities at the work site; and
the locate request ticket includes:
geographic coordinates identifying the dig area;
type information indicating at least one facility type of the at least one underground facility; and
excavator information identifying the excavator;

B) implementing, via the at least one processor, a ticket parser to:
B1) electronically parse at least some content of the locate request ticket obtained in A) so as to automatically extract ticket information obtained from the locate request ticket; and
B2) generate an Extensible Markup Language (XML) format file comprising the extracted ticket information, wherein the extracted ticket information includes the geographic coordinates identifying the dig area, the at least one facility type of the at least one underground facility, and the excavator information;

C) implementing, via the at least one processor, a geographic information system to:
C1) control the at least one communication interface to electronically access at least one auxiliary information source electronically storing a plurality of facilities maps illustrating installed underground facilities, wherein each facilities map includes geospatial metadata associated with at least some of the underground facilities shown in the facilities map;
C2) based at least in part on the geographic coordinates identifying the dig area and the at least one facility type in the XML format file, obtains a relevant facilities map of the plurality of facilities maps; and
C3) renders at least one dig area indicator as an overlay on the relevant facilities map based on the geospatial metadata and the geographic coordinates identifying the dig area in the XML format file;

D) implementing, via the at least one processor, a ticket assessment engine to:
D1) control the at least one communication interface to electronically access a risk lookup table stored in the at least one auxiliary information source, and electronically map, using the risk lookup table, the at least one facility type of the at least one underground facility to at least one risk score;
D2) control the at least one communication interface and/or the at least one memory to electronically access at least one electronic source of historical information, the historical information including at least one of:
historical damage reports for underground facility infrastructure; and
historical records of previously completed locate request tickets;
D3) search the historical information to select at least some historical information based at least in part on at least one of the geographic coordinates identifying the dig area, the at least one facility type of the at least one underground facility, and the excavator information in the XML format file;
D4) perform at least one statistical analysis of the selected at least some historical information to determine at least one of:
at least one frequency of damages associated with at least one of the dig area, the at least one facility type, and the excavator;
at least one damage cost associated with the at least one of the dig area, the at least one facility type, and the excavator; and
at least one distance between a first location of at least one previous accident and the dig area; and
D5) automatically assign at least one risk designation to the locate request ticket, the at least one risk designation indicating the level of risk associated with the performance of the locate and/or marking operation based at least in part on the at least one risk score in D1), and the at least one of the at least one frequency of damages, the at least one damage cost, and the at least one distance as determined in D4), wherein the level of risk associated with the performance of the locate and/or marking operation relates to physical damage to the at least one underground facility, property damage, economic loss, environmental damage, and/or personal injury during the excavation activities; and E) implementing a technician scheduling and dispatch application to:
E1) determine the at least one dispatch schedule for a technician to perform the locate and/or marking operation, based at least in part on the at least one risk designation automatically assigned in D5); and
E2) determine the at least one resource requirement for the locate and/or marking operation, based at least in part on the at least one risk designation automatically assigned in D5), wherein the at least one resource requirement comprises at least one of:
a technician skill requirement of the technician to perform the locate and/or marking operation; and
an equipment requirement for at least one piece of equipment to be used by the dispatched technician during the locate and/or marking operation.

18. At least one non-transitory computer-readable storage medium encoded with at least one program including processor-executable instructions that, when executed by a processor, performs a method for automatically providing at least one dispatch schedule and at least one resource requirement to perform a locate and/or marking operation, the method comprising:

A) obtaining, via the at least one communication interface and/or the at least one memory, a locate request ticket generated by a one-call center and specifying the locate and/or marking operation, wherein:
   the locate and/or marking operation comprises detecting and/or marking a presence or an absence of at least one underground facility within a dig area at a work site;
   at least a portion of the dig area is planned to be excavated or disturbed during excavation activities at the work site; and
   the locate request ticket includes:
      geographic coordinates identifying the dig area;
      type information indicating at least one facility type of the at least one underground facility; and
      excavator information identifying the excavator;
B) electronically parsing, via the at least one processor, at least some content of the locate request ticket obtained in A) so as to automatically extract ticket information obtained from the locate request ticket and generate an Extensible Markup Language (XML) format file comprising the extracted ticket information, wherein the extracted ticket information includes the geographic coordinates identifying the dig area, the at least one facility type of the at least one underground facility, and the excavator information;
C) implementing, via the at least one processor, a geographic information system to:
   C1) control the at least one communication interface to electronically access at least one auxiliary information source electronically storing a plurality of facilities maps illustrating installed underground facilities, wherein each facilities map includes geospatial metadata associated with at least some of the underground facilities shown in the facilities map;
   C2) based at least in part on the geographic coordinates identifying the dig area and the at least one facility type in the XML format file, obtains a relevant facilities map of the plurality of facilities maps; and
   C3) renders at least one dig area indicator as an overlay on the relevant facilities map based on the geospatial metadata and the geographic coordinates identifying the dig area;
D) implementing, via the at least one processor, a ticket assessment engine to:
   D1) control the at least one communication interface to electronically access a risk lookup table stored in the at least one auxiliary information source, and electronically map, using the risk lookup table, the at least one facility type of the at least one underground facility to at least one risk score;
   D2) control the at least one communication interface and/or the at least one memory to electronically access at least one electronic source of historical information, the historical information including at least one of:
      historical damage reports for underground facility infrastructure; and
      historical records of previously completed locate request tickets;
   D3) search the historical information to select at least some historical information based at least in part on at least one of the geographic coordinates identifying the dig area, the at least one facility type of the at least one underground facility, and the excavator information in the XML, format file;
   D4) perform at least one statistical analysis of the selected at least some historical information to determine at least one of:
      at least one frequency of damages associated with at least one of the dig area, the at least one facility type, and the excavator;
      at least one damage cost associated with the at least one of the dig area, the at least one facility type, and the excavator; and
      at least one distance between a first location of at least one previous accident and the dig area; and
   D5) automatically assign at least one risk designation to the locate request ticket, the at least one risk designation indicating the level of risk associated with the performance of the locate and/or marking operation based at least in part on the at least one risk score in D1), and the at least one of the at least one frequency of damages, the at least one damage cost, and the at least one distance as determined in D4), wherein the level of risk associated with the performance of the locate and/or marking operation relates to physical damage to the at least one underground facility, property damage, economic loss, environmental damage, and/or personal injury during the excavation activities; and
E) implementing a technician scheduling and dispatch application to:
   E1) determine the at least one dispatch schedule for a technician to perform the locate and/or marking operation, based at least in part on the at least one risk designation automatically assigned in D5); and
   E2) determine the at least one resource requirement for the locate and/or marking operation, based at least in part on the at least one risk designation automatically assigned in D5), wherein the at least one resource requirement comprises at least one of:
      a technician skill requirement of the technician to perform the locate and/or marking operation; and
      an equipment requirement for at least one piece of equipment to be used by the dispatched technician during the locate and/or marking operation.

19. The at least one computer-readable storage medium of claim 18, wherein the at least one risk designation comprises a numerical score.

20. The at least one computer-readable storage medium of claim 18, wherein:
   in D3), the at least some historical information is selected for the at least one statistical analysis based at least in part on the type information relating to the at least one facility type of the at least one underground facility in the XML format file.

21. The at least one computer-readable storage medium of claim 20, wherein:
   the historical information includes the historical damage reports;
   in D4), the at least one statistical analysis of the selected at least some historical information from the historical damage reports is performed to determine the at least one frequency of damages relating to the at least one facility type of the at least one underground facility and/or the at least one damage cost associated with the at least one facility type of the at least one underground facility; and in D5), the at least one risk designation is automatically assigned to the locate request ticket based at least in part on the at least one frequency of damages and/or the at least one damage cost.

22. The at least one computer-readable storage medium of claim 18, wherein:
in D3), the at least some historical information is selected for the at least one statistical analysis based at least in part on the excavator information relating to the at least one identifying the excavator in the XML format file.

23. The at least one computer-readable storage medium of claim 22, wherein:
the historical information includes the historical damage reports;
the historical damage reports include an excavator damage history for the at least one excavator in the XML format file;
the excavator damage history includes excavator damage costs and/or excavator damage counts; and
in D5), the at least one risk designation is automatically assigned to the locate request ticket based at least in part on the excavator damage costs and/or excavator damage counts.

24. The at least one computer-readable storage medium of claim 18, wherein:
the extracted ticket information includes geographic information relating to the work site and/or the dig area; and
in D3), the at least some historical information is selected for the at least one statistical analysis based at least in part on geographic information relating to the work site and/or the dig area in the XML format file.

25. The at least one computer-readable storage medium of claim 24, wherein:
the historical information includes the historical damage reports;
in D4), the at least one statistical analysis of the selected at least some historical information from the historical damage reports is performed to determine at least one distance between a first location of at least one previous accident indicated in the historical damage reports and the dig area identified by the geographic coordinates in the XML format file; and
in D5), the at least one risk designation is automatically assigned to the locate request ticket based at least in part on the at least one distance determined in D4).

26. The at least one computer-readable storage medium of claim 25, wherein:
the historical damage reports include at least one damage cost associated with the at least one previous accident; and
in D5), the at least one risk designation is automatically assigned to the locate request ticket based at least in part on the at least one distance determined in D4) and the at least one damage cost associated with the at least one previous accident.

27. The at least one computer-readable storage medium of claim 24, wherein:
the historical information includes the historical records of previously completed locate request tickets; and
in D3), at least one of the historical records of previously completed locate request tickets is selected based at least in part of a proximity between a first location of a historical work site and/or historical dig area specified by the at least one of the historical records of previously completed locate request tickets and the dig area identified by the geographic coordinates in the XML format file.

28. The at least one computer-readable storage medium of claim 27, wherein:
the at least one of the historical records of previously completed locate request tickets relates to a previous mis-locate, a trouble ticket, or a high-profile ticket;
in D4), the at least one statistical analysis of the selected at least some historical information from at least one of the historical records is performed to determine at least one distance between the first location of the previous mis-locate or trouble ticket and the dig area identified by the geographic coordinates in the XML format file; and
in D5), the at least one processor automatically assigns the at least one risk designation to the locate request ticket based at least in part on the at least one distance determined in D4).

* * * * *